(12) United States Patent
Sumihara et al.

(10) Patent No.: US 8,202,642 B2
(45) Date of Patent: Jun. 19, 2012

(54) CURRENT COLLECTOR FOR NON-AQUEOUS SECONDARY BATTERY, ELECTRODE PLATE FOR NON-AQUEOUS SECONDARY BATTERY USING THE SAME, AND NON-AQUEOUS SECONDARY BATTERY

(75) Inventors: Masanori Sumihara, Osaka (JP); Kunihiko Bessho, Osaka (JP); Takuhiro Nishimura, Osaka (JP)

(73) Assignee: Panasonic Corporation, Osaka (JP)

( * ) Notice: Subject to any disclaimer, the term of this patent is extended or adjusted under 35 U.S.C. 154(b) by 693 days.

(21) Appl. No.: 12/376,418

(22) PCT Filed: Nov. 15, 2007

(86) PCT No.: PCT/JP2007/072220
§ 371 (c)(1),
(2), (4) Date: Feb. 4, 2009

(87) PCT Pub. No.: WO2008/059936
PCT Pub. Date: May 22, 2008

(65) Prior Publication Data
US 2010/0167111 A1    Jul. 1, 2010

(30) Foreign Application Priority Data

Nov. 15, 2006 (JP) ................. 2006-308773
Nov. 20, 2006 (JP) ................. 2006-312600
Nov. 21, 2006 (JP) ................. 2006-313790
Mar. 9, 2007 (JP) ................. 2007-059444
Nov. 15, 2007 (JP) ................. 2007-296871

(51) Int. Cl.
*H01M 6/00* (2006.01)
*H01M 10/50* (2006.01)
*H01M 2/26* (2006.01)
*H01M 2/28* (2006.01)
*H01M 6/40* (2006.01)
*H01M 2/14* (2006.01)
*H01M 4/02* (2006.01)
*H01M 4/13* (2010.01)
*H01M 4/64* (2006.01)

(52) U.S. Cl. ........ 429/122; 429/120; 429/121; 429/124; 429/129; 429/209; 429/517

(58) Field of Classification Search .................. 429/120, 429/121, 122, 124, 129, 209, 517
See application file for complete search history.

(56) References Cited

U.S. PATENT DOCUMENTS
5,478,668 A * 12/1995 Gozdz et al. .................. 429/127
(Continued)

FOREIGN PATENT DOCUMENTS
JP    07-024913    1/1995
(Continued)

OTHER PUBLICATIONS

WyzeAnt Properties of Rectangles, Rhombuses, and Squares Printed Sep. 29, 2011. {http://www.wyzant.com/Help/Math/Geometry/Quadrilaterals/Rectangles_Rhombuses_Squares.aspx}.*

(Continued)

*Primary Examiner* — Patrick Joseph Ryan
*Assistant Examiner* — Aaron Greso
(74) *Attorney, Agent, or Firm* — McDermott Will & Emery LLP

(57) ABSTRACT

An object of the invention is to provide a current collector for a non-aqueous secondary battery in which the strength of the current collector is sufficient in forming an electrode plate and an active material can be efficiently disposed on the protrusions of the current collector, and to provide an electrode plate for a non-aqueous secondary battery and a non-aqueous secondary battery using the same. The invention relates to a current collector for a non-aqueous secondary battery, including a metal foil for carrying at least a positive electrode active material or negative electrode active material. Protrusions are formed in a predetermined arrangement pattern on at least one face of the metal foil and at least tops of the protrusions are not compressed. The arrangement pattern includes: a row direction in which the protrusions are aligned linearly at an equal pitch; and a column direction in which row units comprising a group of the protrusions aligned in the row direction are aligned in parallel at a predetermined interval. The respective protrusions of any one of the row units are displaced in the row direction from the protrusions of another row unit that is adjacent in the column direction. The invention also pertains to an electrode plate for a non-aqueous secondary battery and a non-aqueous secondary battery using the same.

20 Claims, 25 Drawing Sheets

U.S. PATENT DOCUMENTS

| | | | |
|---|---|---|---|
| 2002/0142211 A1* | 10/2002 | Nakanishi et al. | 429/94 |
| 2005/0058906 A1* | 3/2005 | Sugiyama et al. | 429/231.95 |
| 2005/0074671 A1* | 4/2005 | Sugiyama et al. | 429/231.95 |
| 2007/0059584 A1 | 3/2007 | Nakano et al. | |
| 2008/0102359 A1* | 5/2008 | Kogetsu et al. | 429/129 |

FOREIGN PATENT DOCUMENTS

| | | | |
|---|---|---|---|
| JP | 07-335208 | | 12/1995 |
| JP | 08-195202 | | 7/1996 |
| JP | H10064514 | * | 8/1996 |
| JP | 2000268826 | * | 9/2000 |
| JP | 2002-079466 | | 3/2002 |
| JP | 2002-270186 | | 9/2002 |
| JP | 2002-279972 | | 9/2002 |
| JP | 2003-258182 | | 9/2003 |
| JP | 2005-032642 | | 2/2005 |
| JP | 2006-172773 | | 6/2006 |
| JP | 2007-080609 | | 3/2007 |

OTHER PUBLICATIONS

Webster's 9th Collegiate Dictionary 1985 p. 671 Laminate.*
Korean Office Action issued in Korean Patent Application No. 10-2009-7006921, dated Apr. 18, 2011.

* cited by examiner

F I G. 1
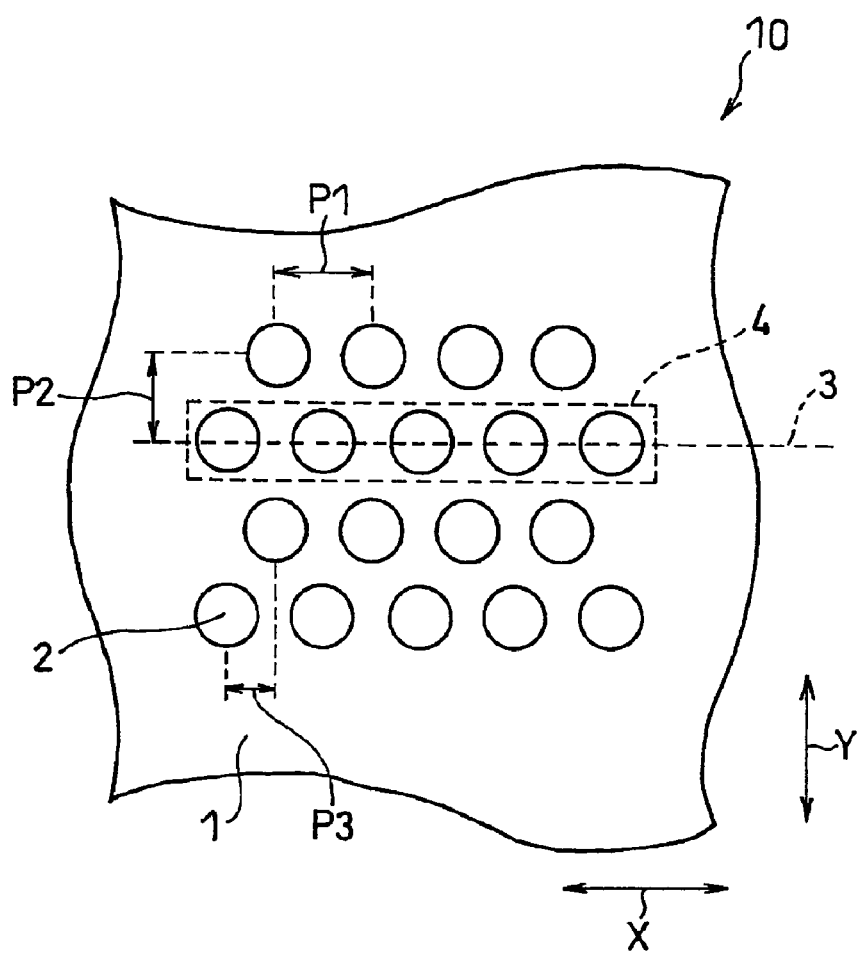

FIG. 2
(a)
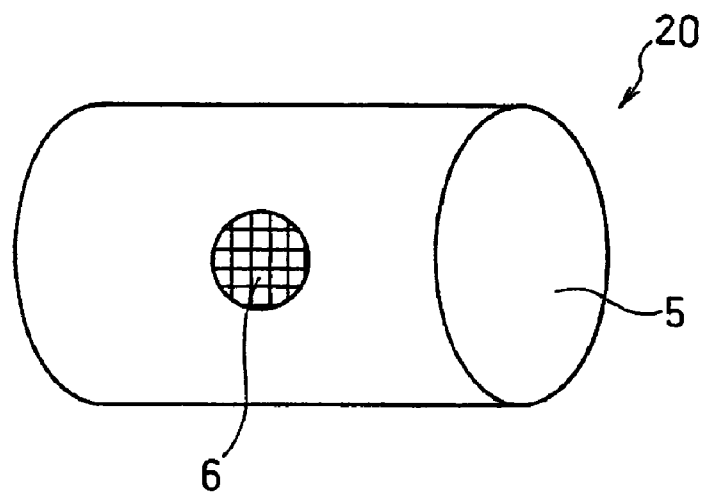
(b)
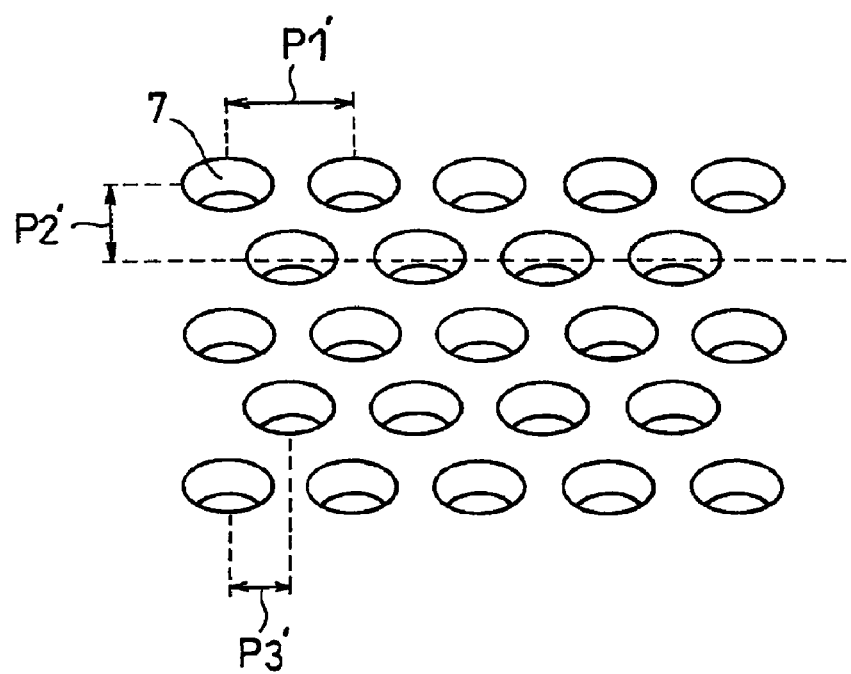

F I G. 3
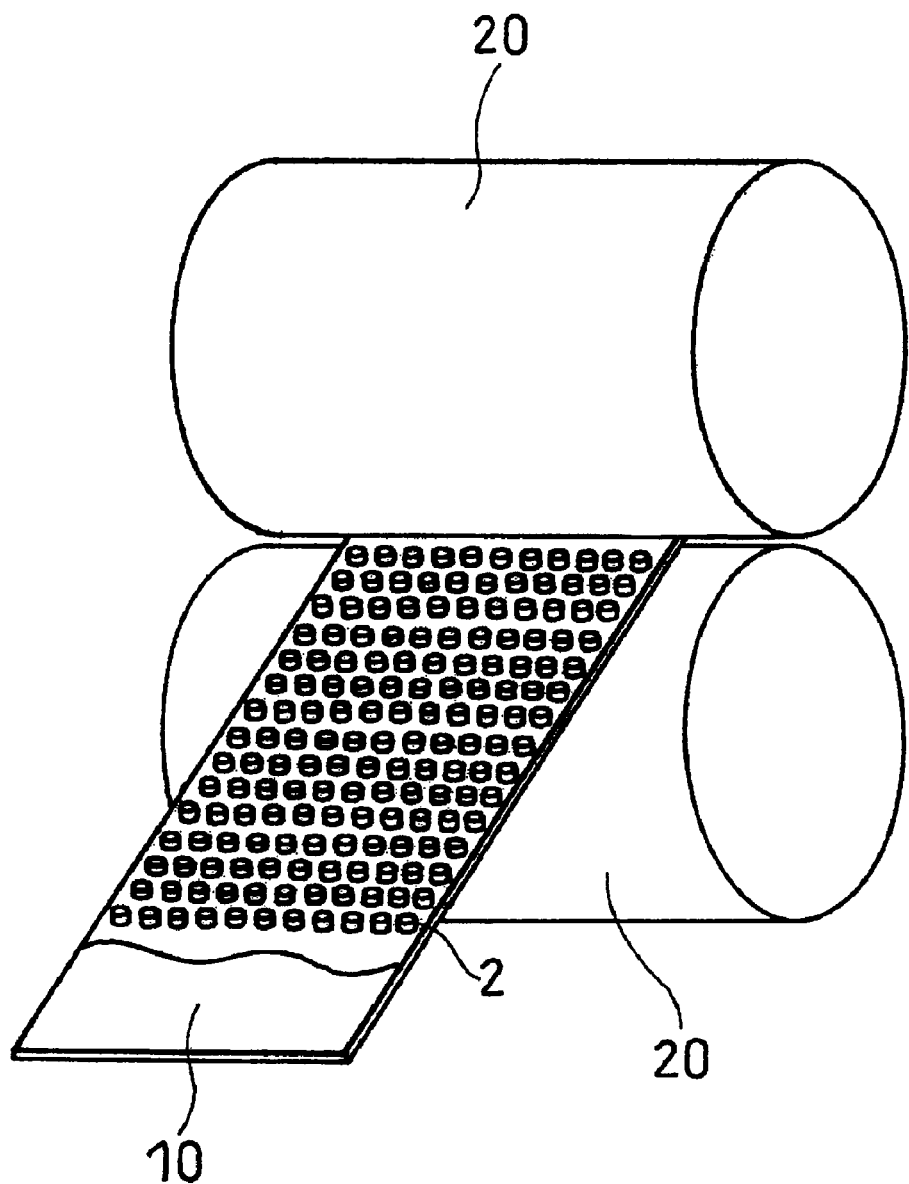

F I G. 1 3
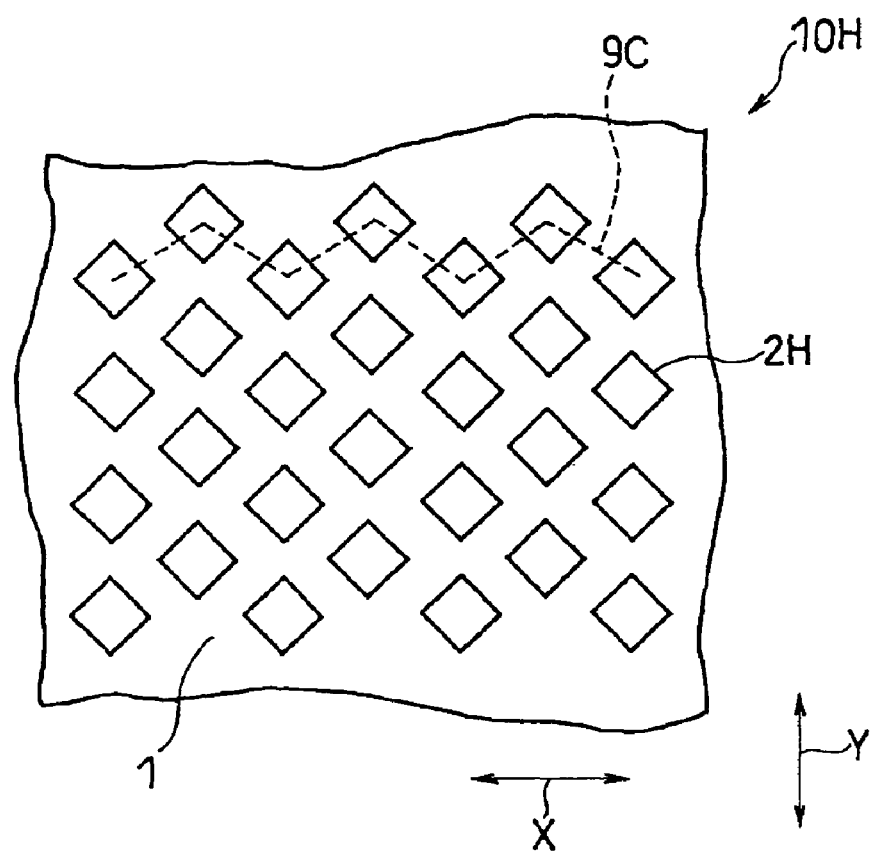

FIG. 16
(a)
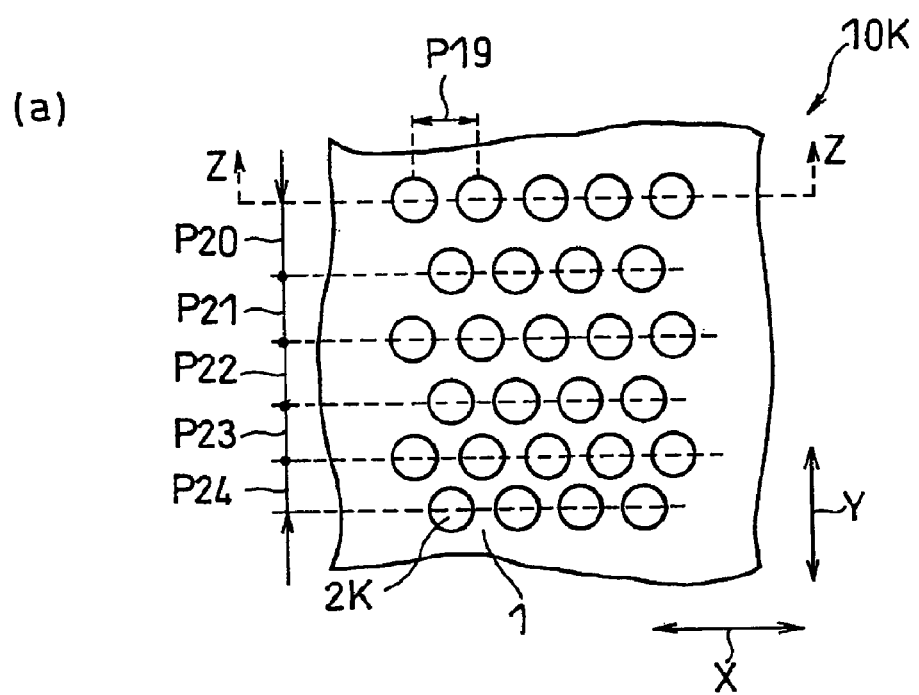
(b)
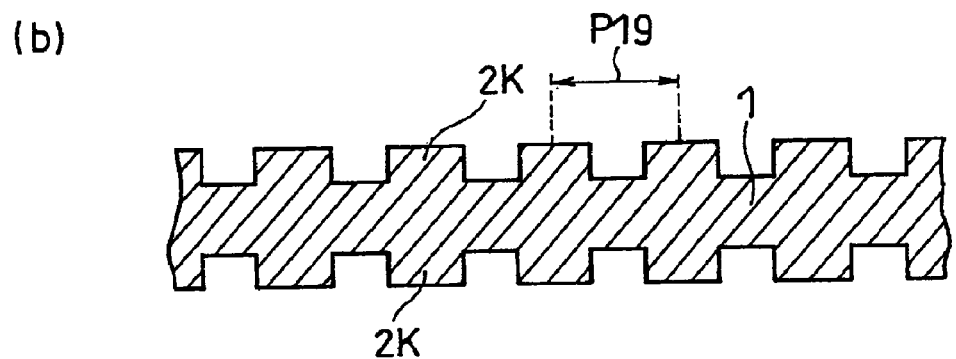

F I G. 1 7
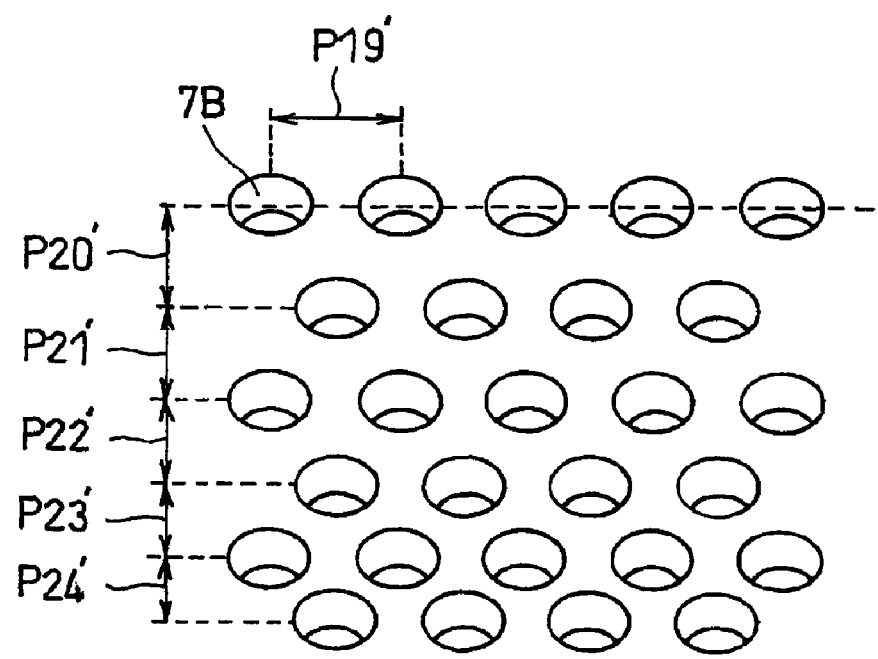

FIG. 18
(a)
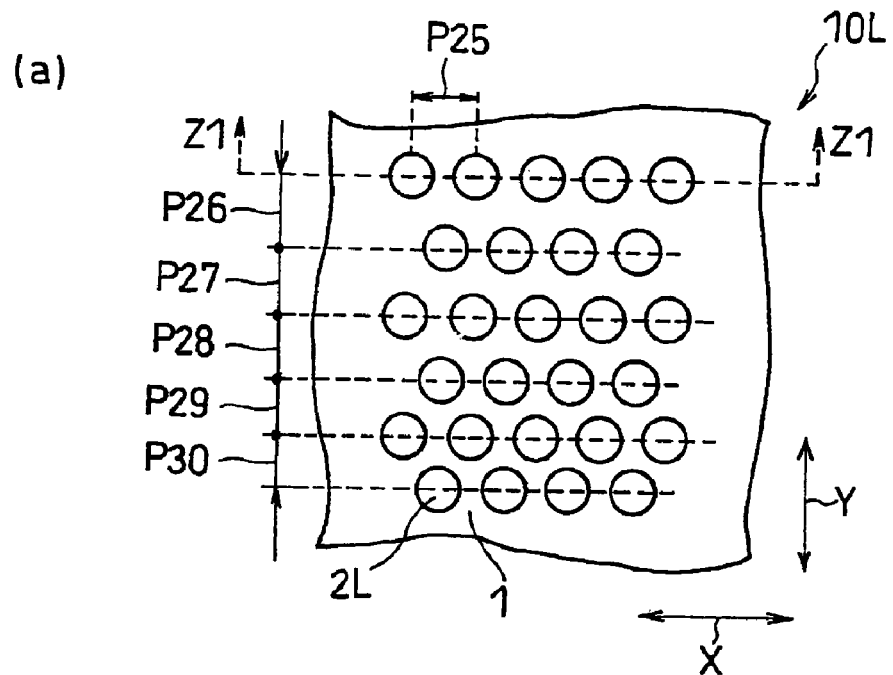
(b)
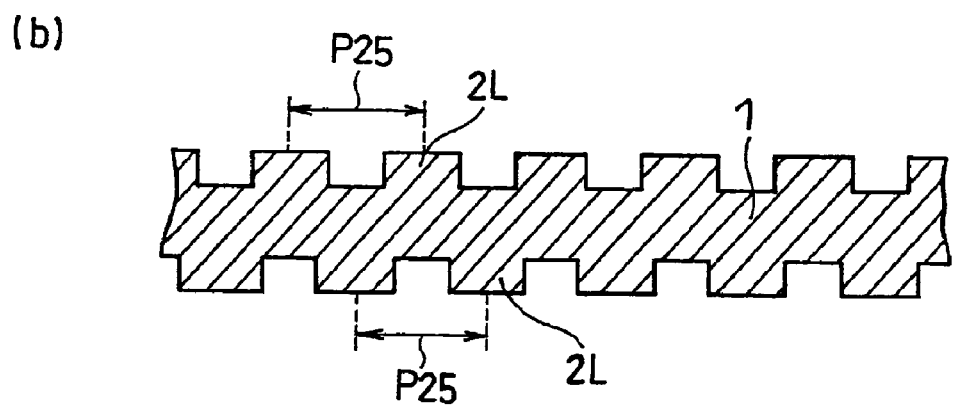

FIG. 19
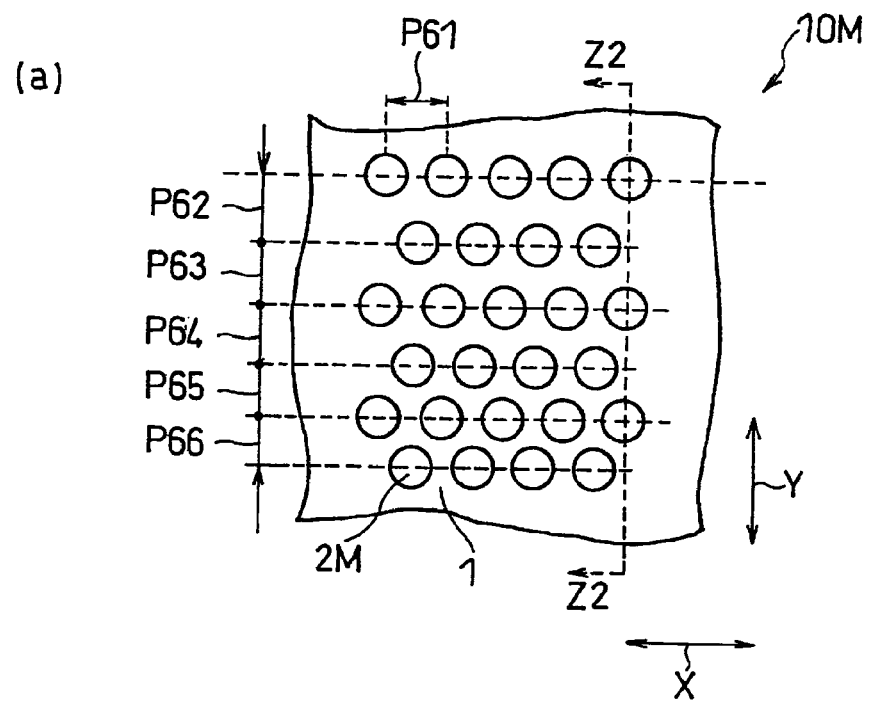
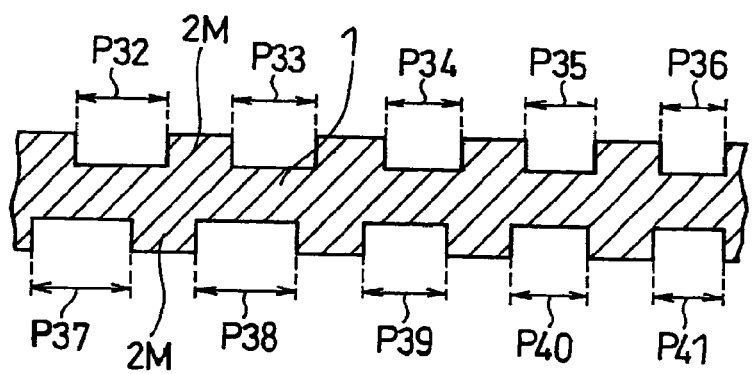

FIG. 20
(a)
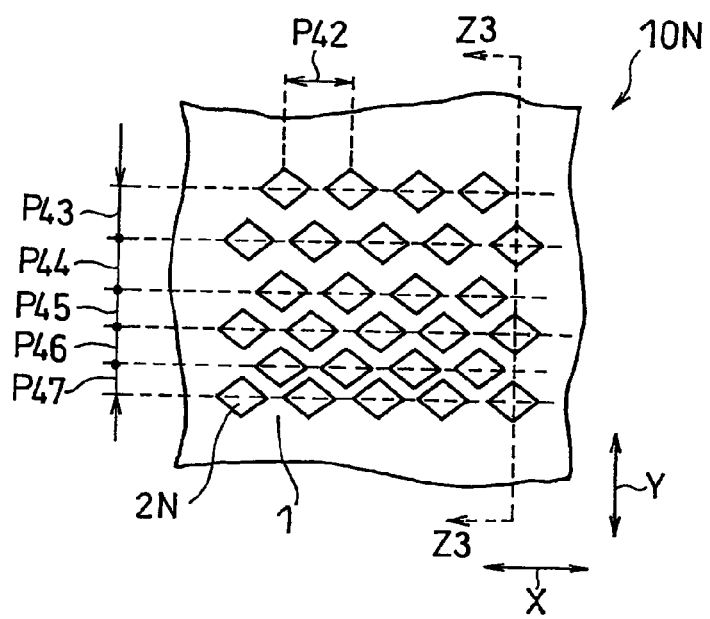
(b)
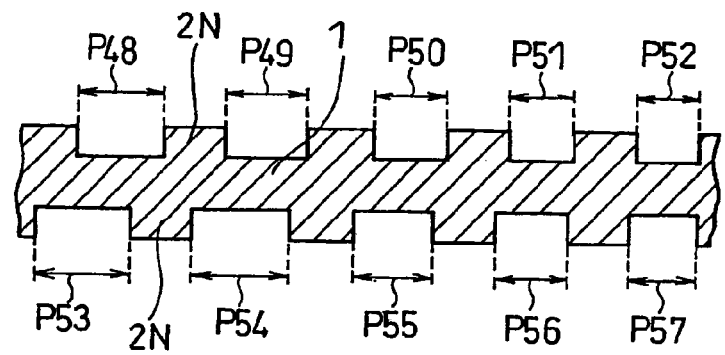

FIG. 23
(a)
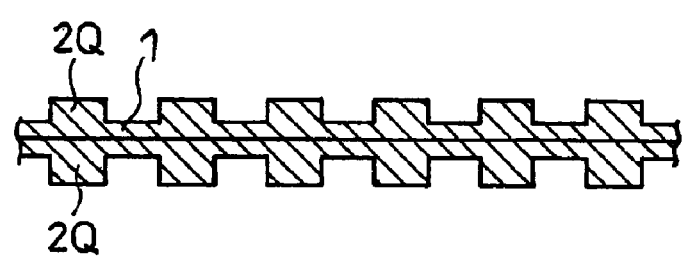
(b)
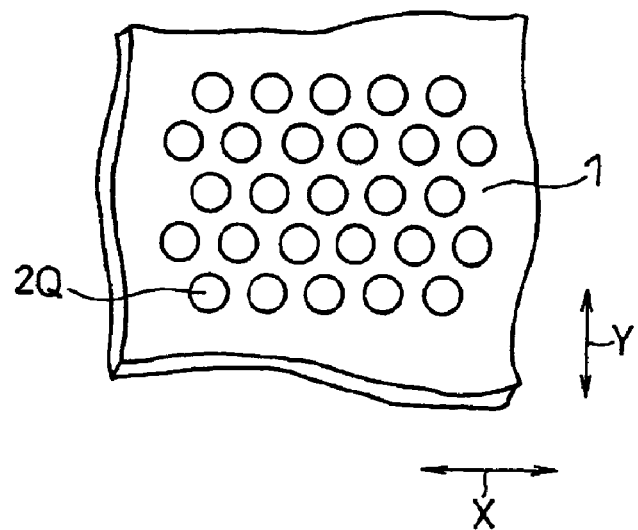

FIG. 24
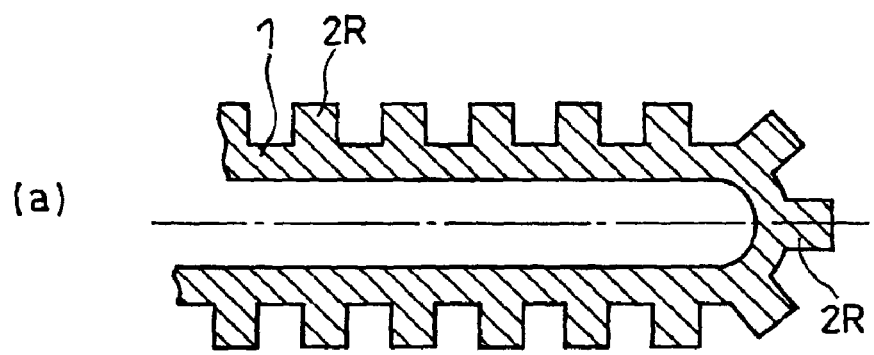
(a)
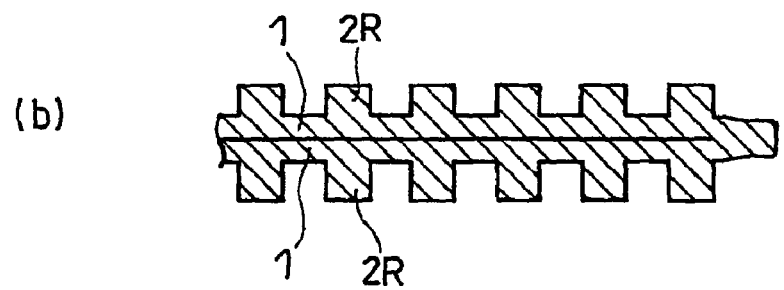
(b)

ium ion secondary batteries (hereinafter referred to as simply "lithium secondary batteries") have been increasingly used as the power source for portable electronic devices. They use, for example, a carbonaceous material capable of absorbing and desorbing lithium as the negative electrode active material, and use a composite oxide containing transition metal and lithium, such as LiCoO2 (lithium cobaltate), as the positive electrode active material. By this, secondary batteries with high potential and high discharge capacity are realized.

CURRENT COLLECTOR FOR NON-AQUEOUS SECONDARY BATTERY, ELECTRODE PLATE FOR NON-AQUEOUS SECONDARY BATTERY USING THE SAME, AND NON-AQUEOUS SECONDARY BATTERY

RELATED APPLICATIONS

This application is the U.S. National Phase under 35 U.S.C. §371 of International Application No. PCT/JP2007/072220, filed on Nov. 15, 2007, which in turn claims the benefit of Japanese Application No. 2006-308773, filed on Nov. 15, 2006, Japanese Application No. 2006-312600, filed on Nov. 20, 2006, Japanese Application No. 2006-313790, filed on Nov. 21, 2006, Japanese Application No. 2007-059444, filed on Mar. 9, 2007, and Japanese Application No. 2007-296871, filed on Nov. 15, 2007, the disclosures of which Applications are incorporated by reference herein.

TECHNICAL FIELD

The invention relates to a current collector for a non-aqueous secondary battery such as a lithium ion secondary battery, and to an electrode plate for a non-aqueous secondary battery and a non-aqueous secondary battery using the same.

BACKGROUND ART

Recently, lithium ion secondary batteries (hereinafter referred to as simply "lithium secondary batteries") have been increasingly used as the power source for portable electronic devices. They use, for example, a carbonaceous material capable of absorbing and desorbing lithium as the negative electrode active material, and use a composite oxide containing transition metal and lithium, such as LiCoO2 (lithium cobaltate), as the positive electrode active material. By this, secondary batteries with high potential and high discharge capacity are realized.

However, with the recent increase in functionality of electronic devices and communications devices, it is desired to further improve the performance of lithium secondary batteries, in particular, to reduce performance degradation due to charge/discharge cycles.

Generally, an electrode plate, which is a power generating element of a lithium secondary battery, is produced by mixing and dispersing a positive electrode active material or negative electrode active material, a binder as a binding agent, and optionally a conductive agent in a dispersion medium, applying the resulting paint mixture onto one face or both faces of a current collector, drying it, and pressing it to form a positive electrode mixture layer or negative electrode mixture layer.

One cause of performance degradation due to charge/discharge cycles is a decrease in the adhesion between the positive electrode mixture layer or negative electrode mixture layer applied onto the current collector and the current collector. This occurs because the expansion and contraction of the electrode plate due to charge/discharge decreases the adhesion of the positive electrode mixture layer or negative electrode mixture layer at the interface of the current collector, thereby causing it to separate therefrom.

To increase the adhesion between the positive electrode mixture layer or negative electrode mixture layer and the current collector, attempts have been made to increase the interfacial contact area of the current collector. In this case, the surface of a current collector is usually roughened by a method of etching the surface of a current collector by electrolysis or a method of depositing constituent metal on the surface by electrodeposition.

As another method to roughen the surface of a current collector, there has been proposed, for example, a method of causing fine particles to collide with the surface of a rolled copper foil, which is the material to be processed, at a high speed to form minute protrusions and depressions on the surface (see, for example, Patent Document 1). There has also been proposed a method of irradiating a metal foil with a laser beam to form protrusions and depressions whose surface roughness is 0.5 to 10 μm in 10-point average roughness (see, for example, Patent Document 2).

Also, reducing the thickness of the applied electrode mixture layer to enhance power density results in a decrease in energy density. To avoid this dilemma, it has been proposed to increase the surface area of a current collector in order to increase the contact area of the electrode mixture layer and the current collector, as illustrated in FIG. 27. In the example illustrated in this figure, a metal foil current collector 61 is sandwiched between a pair of guide rollers 62 and 63 to form protrusions and depressions on the surface thereof (see, for example, Patent Document 3).

Also, to obtain a current collector for a lithium secondary battery that can firmly retain an active material and has good electrical conductivity, it has been proposed, for example, to form a metal foil into the shape of a corrugated sheet having ridges and grooves, so that one face of the metal foil is recessed while the other face is raised, as illustrated in FIG. 28 (see, for example, Patent Document 4).

Further, to obtain an inexpensive, long-life lithium secondary battery having good power characteristics and little variations in capacity, power, etc., there has been proposed a method of forming depressions and protrusions by embossing, filling the depressions with an active material, and making the surfaces of the protrusions exposed or covered with the active material, as illustrated in FIG. 29 (see, for example, Patent Document 5).

Another known method for producing an electrode plate for a lithium secondary battery is a method of forming a thin film of an active material on a current collector by electrolytic plating, vacuum deposition, or the like. In this method, the adhesion between the current collector and the active material is also essential to obtaining a stable battery. For example, with the aim of obtaining an electrode plate for a lithium secondary battery having a large discharge capacity and excellent charge/discharge cycle characteristics, a method of forming an active material thin film on a current collector made of a metal not alloyable with lithium has been proposed. In this method, the value: (the surface roughness Ra of the active material thin film)−(the surface roughness Ra of the current collector) is set to 0.1 μm or less (see, for example, Patent Document 6).

Patent Document 1: Japanese Laid-Open Patent Publication No. 2002-79466
Patent Document 2: Japanese Laid-Open Patent Publication No. 2003-258182
Patent Document 3: Japanese Laid-Open Patent Publication No. Hei 8-195202
Patent Document 4: Japanese Laid-Open Patent Publication No. 2002-270186
Patent Document 5: Japanese Laid-Open Patent Publication No. 2005-32642
Patent Document 6: Japanese Laid-Open Patent Publication No. 2002-279972

DISCLOSURE OF THE INVENTION

Problem to be Solved by the Invention

According to the surface roughening method described in Patent Document 1, a current collector having random protrusions and depressions locally can be formed. However, it is difficult to form uniform protrusions and depressions in the width direction and longitudinal direction of the current collector, since there are variations in the speed of the fine particles sprayed from the nozzle.

According to the metal foil roughening method described in Patent Document 2, depressions can be formed by irradiating the metal foil with a laser beam to locally heat and evaporate the metal, and protrusions and depressions can be formed throughout the metal foil by continuous irradiation. However, since the laser is applied linearly, the metal foil is locally subjected to heat equal to or higher than the melting point of the metal. It is thus difficult to prevent the metal foil from becoming corrugated, wrinkled, or warped due to the heat. Further, when a metal foil with a thickness of 20 μm or less such as a current collector for a lithium secondary battery is subjected to a laser process, the metal foil may be undesirably perforated due to laser power variation.

In the case of the current collector production methods of Patent Document 3 and Patent Document 4, the metal foil is so structured that the backside of a depression on the surface side is inevitably a protrusion, and it is thus difficult to prevent the metal foil from becoming corrugated, wrinkled, warped, etc., during the formation of the protrusions and depressions.

According to the electrode production method described in Patent Document 5, since a punched metal with an open area ratio of 20% or less is embossed to form protrusions and depressions, the strength of the current collector lowers, which may cause a problem of breakage of the electrode plate.

In the case of the electrode for a secondary battery described in Patent Document 6, the value: (the surface roughness Ra of the active material thin film)−(the surface roughness Ra of the current collector) is set to 0.1 μm or less. As a result, the adhesion between the current collector and the active material thin film becomes stable. However, if the active material thin film contains a metal which expands significantly upon lithium intercalation, the adhesion between the current collector and the active material thin film becomes weak. Thus, the electrode plate may become wrinkled and a problem of degradation of charge/discharge cycle characteristics may occur.

Also, Patent Documents 1 to 6 are silent as to any problem which may arise when electrode plates (a positive electrode plate and a negative electrode plate) are prepared by using current collectors with protrusions formed thereon and these electrode plates are wound with separators interposed therebetween to form an electrode assembly. However, as illustrated in FIG. 30, a positive electrode plate 70 and a negative electrode plate 72 are spirally wound with separators 74 and 75 interposed therebetween to form an electrode assembly. Between the inner side and the outer side of this electrode assembly, there is a difference in the curvatures of the positive electrode plate 70 and the negative electrode plate 72. Thus, when protrusions are formed on the surface of a positive electrode current collector 69 or a negative electrode current collector 71 at an equal pitch, the pitch at the end of the protrusions is wide on the inner side and narrow on the outer side.

Further, in an electrode assembly formed as described above, the positive electrode plate and the negative electrode plate are curved, and the pitch at the end of protrusions 76 is wide on the outer face of a current collector 75 and narrow on the inner face, as illustrated in FIG. 31.

The invention has been made in view of the problems described above, and an object of the invention is to provide a current collector for a non-aqueous secondary battery in which the strength of the current collector is sufficient in forming an electrode plate and an active material can be efficiently disposed on the protrusions of the current collector, and to provide an electrode plate for a non-aqueous secondary battery and a non-aqueous secondary battery using the same.

Also, another object of the invention is to provide a current collector for a non-aqueous secondary battery in which the strength of the current collector is not adversely affected by the difference in curvature between the outer side and the inner side of an electrode assembly and the difference in curvature between the outer face and the inner face of the electrode plate when the electrode assembly is formed by spirally winding positive and negative electrode plates, and in which an active material can be efficiently disposed on the current collector, and to provide an electrode plate for a non-aqueous secondary battery and a non-aqueous secondary battery using the same.

Also, still another object of the invention is to provide a highly reliable current collector for a non-aqueous secondary battery in which when protrusions are formed on both faces of a metal foil current collector, the arrangement of the protrusions at corresponding positions can be adjusted so that the current collector is prevented from becoming corrugated, wrinkled, warped, etc., during the formation of the protrusions thereon, and to provide an electrode plate for a non-aqueous secondary battery and a non-aqueous secondary battery using the same.

Means for Solving the Problem

In order to achieve the aforementioned objects, a current collector for a non-aqueous secondary battery of the invention includes a metal foil for carrying at least a positive electrode active material or negative electrode active material. Protrusions are formed in a predetermined arrangement pattern on at least one face of the metal foil, and at least tops of the protrusions are not compressed. The arrangement pattern includes: a row direction in which the protrusions are aligned linearly at an equal pitch; and a column direction in which row units comprising a group of the protrusions aligned in the row direction are aligned in parallel at a predetermined interval. The respective protrusions of any one of the row units are displaced in the row direction from the protrusions of another row unit that is adjacent in the column direction.

Also, a current collector for a non-aqueous secondary battery of the invention includes a metal foil for carrying at least a positive electrode active material or negative electrode active material. Protrusions are formed in a predetermined arrangement pattern on at least one face of the metal foil, and at least tops of the protrusions are not compressed. The arrangement pattern includes: a row direction in which the protrusions are aligned in a zigzag at an equal pitch; and a column direction in which row units comprising a group of the protrusions aligned in the row direction are aligned in parallel at a predetermined interval. The intervals between each of the protrusions and all the protrusions adjacent to each of the protrusions are equal.

Preferably, the current collector is shaped like a long strip, the longitudinal direction of the current collector agrees with the column direction while the width direction of the current collector agrees with the row direction, and the interval at which the row units are aligned decreases gradually from one end of the current collector in the longitudinal direction thereof toward the other end.

Also, preferably, the protrusions are formed on both faces of the metal foil, and the protrusions on one face of the metal foil are out of phase with the protrusions on the other face of the metal foil in the row direction.

Preferably, the protrusions are formed on both faces of the metal foil, and the interval at which the row units are aligned in the column direction on one face of the metal foil is greater than the interval at which the row units are aligned on the other face of the metal foil.

Preferably, one face of the metal foil has the protrusions in the arrangement pattern while the other face is a flat surface, and the flat surfaces of two or more such metal foils are bonded together.

Preferably, one face of the metal foil has the protrusions in the arrangement pattern while the other face is a flat surface, the metal foil is folded at a predetermined position, and the flat surfaces of the folded metal foil are bonded together.

Effect of the Invention

According to the current collector for a non-aqueous secondary battery of the invention, protrusions are formed in a predetermined arrangement pattern in such a manner that at least the tops thereof are not compressed. Thus, produced current collector is highly durable. Also, in the step of forming the protrusions on the surface of the current collector and the step of disposing an active material on the protrusions, the current collector is prevented from becoming locally deformed or distorted. At the same time, in the step of disposing an active material on the protrusions of the current collector and the subsequent step such as slitting to a predetermined width, the separation of the active material can be suppressed. Therefore, by using this, it is possible to produce a highly reliable non-aqueous secondary battery.

Also, according to the non-aqueous secondary battery of the invention, when an electrode assembly of a non-aqueous secondary battery is produced, it is possible to reduce the difference in bending stress exerted on the electrode plate resulting from the difference in curvature of the electrode plate between the inner side and the outer side of the electrode assembly. It is also possible to reduce the difference in bending stress exerted on the electrode plate resulting from the difference in curvature of the electrode plate between the outer face and the inner face of the electrode plate. By this, in the step of spirally winding the electrode plates to form an electrode assembly, the misalignment of the wound electrode plates and separation of the active material can be suppressed. Therefore, by using such electrode plates, it is possible to produce a highly reliable non-aqueous secondary battery.

Also, according to the electrode plate for a non-aqueous secondary battery of the invention, a current collector, which is a constituent element of the electrode plate, is produced by forming a large number of uncompressed protrusions on one face of the current collector while making the other face a flat surface, and bonding the flat surfaces together. By this, the phase of the protrusions on one face and the other face of the current collector can be freely adjusted. It is therefore possible to match the strength characteristics of the electrode plate to the characteristics of the active material. Also, by making the protrusions on one face and the other face of the current collector out of phase with one another, a large resistance to stress can be obtained. Hence, in the step of forming the protrusions on the surface side of the current collector and the step of disposing an active material on the protrusions of the current collector, it is possible to prevent the current collector from becoming locally corrugated, wrinkled, warped, etc. Also, by making the protrusions on one face and the other face of the current collector in phase with one another, the flexibility of the electrode plate can be heightened. Thus, when such electrode plates are wound to form a battery assembly, the separation of an active material can be prevented.

BRIEF DESCRIPTION OF THE DRAWINGS

FIG. 1 is a plane view schematically showing the structure of a current collector according to Embodiment 1 of the invention;

FIG. 2(a) is a perspective view of a roller used to produce the current collector of FIG. 1 and FIG. 2(b) is an enlarged perspective view of the surface;

FIG. 3 is a perspective view showing an exemplary method of processing a current collector by using the rollers of FIG. 2;

FIG. 13 is a plane view schematically showing the structure of a current collector according to Embodiment 9 of the invention;

FIG. 16 is plane views schematically showing the structure of a current collector according to Embodiment 12 of the invention;

FIG. 17 is an enlarged perspective view of the surface of a roller used to produce the current collector of FIG. 16;

FIG. 18 is plane views schematically showing the structure of a current collector according to Embodiment 13 of the invention;

FIG. 19 is plane views schematically showing the structure of a current collector according to Embodiment 14 of the invention;

FIG. 20 is plane views schematically showing the structure of a current collector according to Embodiment 15 of the invention;

FIG. 23 is plane views schematically showing the structure of a current collector according to Embodiment 17 of the invention;

FIG. 24 is plane views schematically showing the structure of a current collector according to Embodiment 18 of the invention;

BEST MODE FOR CARRYING OUT THE INVENTION

Figure 4:
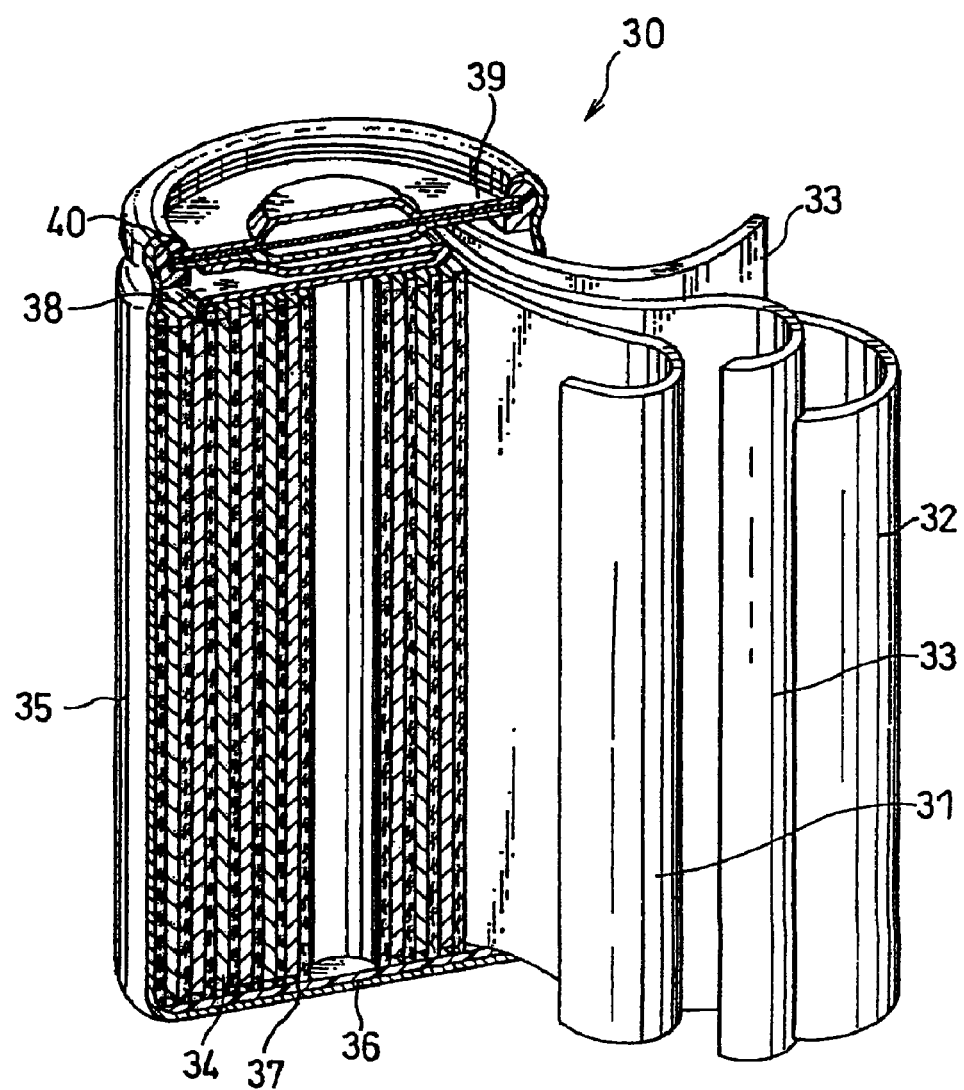
FIG. 4 is a partially cutaway view showing the structure of a non-aqueous secondary battery produced using the current collector of FIG. 1.

The invention is directed to a current collector for a non-aqueous secondary battery, including a metal foil for carrying at least a positive electrode active material or negative electrode active material. Protrusions are formed in a predetermined arrangement pattern on at least one face of the metal foil, and at least tops of the protrusions are not compressed. The arrangement pattern includes: a row direction in which the protrusions are aligned linearly at an equal pitch; and a column direction in which row units comprising a group of the protrusions aligned in the row direction are aligned in parallel at a predetermined interval. The respective protrusions of any one of the row units are displaced in the row direction from the protrusions of another row unit that is adjacent in the column direction. With respect to the shape of the protrusions, at least the tops thereof can be substantially circular.

Also, as described later, the protrusions are formed by applying a compression process to a metal foil by using a roller or die having corresponding depressions. At this time, the portion of the metal foil facing the portion having no depressions is compressed, so that the portions of the metal foil facing the portions having the depressions are raised. In this way, plastic deformation occurs. As a result, the protrusions are formed. It should be noted that when the protrusions are formed, their edges (tops) are not in contact with the bottom faces of the depressions, and thus at least their tops are not compressed.

The aforementioned arrangement pattern of the protrusions exhibits a large resistance to stress. Thus, in the step of forming the protrusions on the surface of the current collector and the step of disposing the electrode active material on the protrusions of the current collector, it is possible to prevent the current collector from becoming locally deformed or distorted. At the same time, in the step of disposing the electrode active material on the protrusions of the current collector and the subsequent step such as slitting to a predetermined width, it is also possible to suppress separation of the electrode active material.

The current collector can be shaped like a long strip, and the longitudinal direction of the current collector can agree with the column direction while the width direction of the current collector can agree with the row direction. The tops of the protrusions can be in the shape of a substantial oval, and the major axis of the oval can agree with the width direction of the current collector. As a result, the arrangement pattern of the protrusions exhibits a large resistance to stress. Thus, in the step of forming the protrusions on the surface of the current collector and the step of disposing the electrode active material on the protrusions of the current collector, it is possible to prevent the current collector from becoming locally deformed or distorted. Also, the major axis of the oval is caused to agree with the width direction of the current collector. Thus, when the electrode active material is disposed on the protrusions of the current collector toward the longitudinal direction of the current collector, it can be efficiently disposed. Further, in the step of disposing the electrode active material on the protrusions of the current collector and the subsequent step such as slitting to a predetermined width, it is also possible to suppress separation of the electrode active material.

Also, the current collector can be shaped like a long strip, and the longitudinal direction of the current collector can agree with the column direction while the width direction of the current collector can agree with the row direction. The tops of the protrusions can be in the shape of a substantial rectangle, and the longitudinal direction of the rectangle can agree with the width direction of the current collector. As a result, the arrangement pattern of the protrusions exhibits a large resistance to stress. Thus, in the step of forming the protrusions on the surface of the current collector and the step of disposing the electrode active material on the protrusions of the current collector, it is possible to prevent the current collector from becoming locally deformed or distorted. At the same time, the longitudinal direction of the rectangle is caused to agree with the width direction of the current collector. Thus, when the electrode active material is disposed on the protrusions of the current collector toward the longitudinal direction of the current collector, it can be efficiently disposed. Further, in the step of disposing the electrode active material on the protrusions of the current collector and the subsequent step such as slitting to a predetermined width, it is also possible to suppress separation of the electrode active material.

Also, the current collector can be shaped like a long strip, and the longitudinal direction of the current collector can agree with the column direction while the width direction of the current collector can agree with the row direction. The tops of the protrusions can be in the shape of a substantial rhombus, and the direction of the longer diagonal line of the rhombus can agree with the width direction of the current collector. As a result, the arrangement pattern of the protrusions exhibits a large resistance to stress. Thus, in the step of forming the protrusions on the surface of the current collector and the step of disposing the electrode active material on the protrusions of the current collector, it is possible to prevent the current collector from becoming locally deformed or distorted. At the same time, the direction of the major axis of the rhombus is caused to agree with the width direction of the current collector. Thus, when the electrode active material is disposed on the protrusions of the current collector toward the longitudinal direction of the current collector, it can be efficiently disposed. Further, in the step of disposing the electrode active material on the protrusions of the current collector and the subsequent step such as slitting to a predetermined width, it is also possible to suppress separation of the electrode active material.

Also, the current collector can be shaped like a long strip, and the longitudinal direction of the current collector can agree with the column direction while the width direction of the current collector can agree with the row direction. The tops of the protrusions can be in the shape of a substantial square, and the direction of one diagonal line of the square can agree with the width direction of the current collector. As a result, the arrangement pattern of the protrusions exhibits a large resistance to stress. Thus, in the step of forming the protrusions on the surface of the current collector and the step of disposing the electrode active material on the protrusions of the current collector, it is possible to prevent the current collector from becoming locally deformed or distorted. At the same time, the direction of one diagonal line of the square is caused to agree with the width direction of the current collector. Thus, when the electrode active material is disposed on the protrusions of the current collector toward the longitudinal direction of the current collector, it can be efficiently disposed. Further, in the step of disposing the electrode active material on the protrusions of the current collector and the subsequent step such as slitting to a predetermined width, it is also possible to suppress separation of the electrode active material.

Also, the current collector can be shaped like a long strip, and the longitudinal direction of the current collector can agree with the column direction while the width direction of the current collector can agree with the row direction. The tops of the protrusions can be in the shape of a substantial equilateral hexagon, and a pair of opposite sides of the equilateral hexagon can be perpendicular to the width direction of the current collector. As a result, the arrangement pattern of the protrusions becomes a honeycomb arrangement in which substantially equilateral hexagons are closely packed. Hence, the strength of the current collector can be improved, and the current collector can exhibit a large resistance to deformation. Thus, in the step of forming the protrusions on the surface of the current collector and the step of depositing an active material thin film on the protrusions of the current collector, it is possible to prevent the current collector from becoming locally deformed or distorted. At the same time, the direction of one diagonal line of the square is caused to agree with the width direction of the current collector. Thus, when the electrode active material is disposed on the protrusions of the current collector toward the longitudinal direction of the current collector, it can be efficiently disposed. Further, in the step of disposing the electrode active material on the protrusions of the current collector and the subsequent step such as slitting to a predetermined width, it is also possible to suppress separation of the electrode active material.

Also, the invention relates to an electrode plate for a non-aqueous secondary battery including at least a positive electrode active material or negative electrode active material disposed on the above-described current collectors for a non-aqueous secondary battery. With this configuration, the arrangement pattern of the protrusions exhibits a large resistance to stress. Thus, in the step of disposing the electrode active material on the protrusions of the current collector, it is possible to prevent the current collector from becoming locally deformed or distorted. At the same time, in the step of disposing the electrode active material on the protrusions of the current collector and the subsequent step such as slitting to a predetermined width, it is also possible to suppress separation of the electrode active material.

Also, the invention pertains to a current collector for a non-aqueous secondary battery, including a metal foil for carrying at least a positive electrode active material or negative electrode active material. Protrusions are formed in a predetermined arrangement pattern on at least one face of the metal foil, and at least the tops of the protrusions are not compressed. The arrangement pattern includes: a row direction in which the protrusions are aligned in a zigzag at an equal pitch; and a column direction in which row units comprising a group of the protrusions aligned in the row direction are aligned in parallel at a predetermined interval. The intervals between each of the protrusions and all the protrusions adjacent to each of the protrusions are equal. With respect to the shape of the protrusions, at least the tops thereof can be substantially circular.

Due to the aforementioned arrangement pattern of the protrusions, when a tensile stress is applied in the column direction, the stress is exerted on the respective protrusions aligned in a zigzag. Also, since the distances between each of the protrusions and all the adjacent protrusions are equal, an equal stress is exerted on the respective protrusions. Hence, for example, when the current collector is shaped like a long strip and is produced so that the longitudinal direction thereof and the column direction agree with each other, the shearing force exerted on the current collector is reduced and the strength of the current collector can be improved. Thus, in the step of forming the protrusions on the surface of the current collector and the step of disposing the electrode active material on the protrusions of the current collector, it is possible to prevent the current collector from becoming locally deformed or distorted. At the same time, in the step of disposing the electrode active material on the protrusions of the current collector and the subsequent step such as slitting to a predetermined width, it is also possible to suppress separation of the electrode active material.

Also, the current collector can be shaped like a long strip, and the longitudinal direction of the current collector can agree with the column direction while the width direction of the current collector can agree with the row direction. The tops of the protrusions can be in the shape of a substantial square, and a pair of opposite sides of the square can be perpendicular to the width direction of the current collector. As a result, when a tensile stress is applied to the longitudinal direction of the current collector, the stress is exerted on the respective protrusions aligned in a zigzag, and the stress exerted on the respective protrusions is scattered in comparison with the arrangement in which the protrusions are aligned in a row in the width direction of the current collector. Hence, the shearing force exerted on the current collector is reduced and the strength of the current collector can be improved. Thus, in the step of forming the protrusions on the surface of the current collector and the step of disposing the electrode active material on the protrusions of the current collector, it is possible to prevent the current collector from becoming locally deformed or distorted. At the same time, in the step of disposing the electrode active material on the protrusions of the current collector and the subsequent step such as slitting to a predetermined width, it is also possible to suppress separation of the electrode active material.

Also, the current collector can be shaped like a long strip, and the longitudinal direction of the current collector can agree with the column direction while the width direction of the current collector can agree with the row direction. The tops of the protrusions can be in the shape of a substantial square, and the direction of one diagonal line of the square can agree with the width direction of the current collector. As a result, when a tensile stress is applied to the longitudinal direction of the current collector, the stress is exerted on the respective protrusions aligned in a zigzag, and the stress exerted on the respective protrusions is scattered in comparison with the arrangement in which the protrusions are aligned in a row in the width direction of the current collector. Hence, the shearing force exerted on the current collector is reduced and the strength of the current collector can be improved. Thus, in the step of forming the protrusions on the surfaces of the current collector and the step of disposing the electrode active material on the protrusions of the current collector, it is possible to prevent the current collector from becoming locally deformed or distorted. At the same time, in the step of disposing the electrode active material on the protrusions of the current collector and the subsequent step such as slitting to a predetermined width, it is also possible to suppress separation of the electrode active material.

Also, the current collector can be shaped like a long strip, and the longitudinal direction of the current collector can agree with the column direction while the width direction of the current collector can agree with the row direction. The tops of the protrusions can be in the shape of a substantially equilateral hexagon, and the direction of one of the longest diagonal lines of the equilateral hexagon can agree with the width direction of the current collector. Also, the current collector can be shaped like a long strip, and the longitudinal direction of the current collector can agree with the column direction while the width direction of the current collector can agree with the row direction. The tops of the protrusions can be in the shape of a substantially equilateral polygon having an even number of eight or more angles, and the direction of one of the longest diagonal lines of the equilateral polygon can agree with the width direction of the current collector.

With this configuration, when a tensile stress is applied in the longitudinal direction of the current collector, the stress is exerted on the respective protrusions aligned in a zigzag. Also, since the distances between each of the protrusions and all the adjacent protrusions are equal, an equal stress is exerted on the respective protrusions. Hence, the shearing force exerted on the current collector is reduced and the strength of the current collector can be improved. Thus, in the step of forming the protrusions on the surface of the current collector and the step of disposing the electrode active material on the protrusions of the current collector, it is possible to prevent the current collector from becoming locally deformed or distorted. At the same time, in the step of disposing the electrode active material on the protrusions of the current collector and the subsequent step such as slitting to a predetermined width, it is also possible to suppress separation of the electrode active material.

Also, the current collector can be shaped like a long strip, and the longitudinal direction of the current collector can agree with the column direction while the width direction of the current collector can agree with the row direction. The tops of the protrusions can be in the shape of a substantially equilateral hexagon, and a pair of opposite sides of the equilateral hexagon can be perpendicular to the width direction of the current collector. Also, the current collector can be shaped like a long strip, and the longitudinal direction of the current collector can agree with the column direction while the width direction of the current collector can agree with the row direction. At least the tops of the protrusions can be in the shape of a substantially equilateral polygon having an even number of eight or more angles, and a pair of opposite sides of the equilateral polygon can be perpendicular to the width direction of the current collector.

With this configuration, when a tensile stress is applied in the longitudinal direction of the current collector, the stress is exerted on the respective protrusions aligned in a zigzag. Also, since the distances between each of the protrusions and all the adjacent protrusions are equal, an equal stress is exerted on the respective protrusions. Hence, the shearing force exerted on the current collector is reduced and the strength of the current collector can be improved. Thus, in the step of forming the protrusions on the surface of the current collector and the step of disposing the electrode active material on the protrusions of the current collector, it is possible to prevent the current collector from becoming locally deformed or distorted. At the same time, in the step of disposing the electrode active material on the protrusions of the current collector and the subsequent step such as slitting to a predetermined width, it is also possible to suppress separation of the electrode active material.

Also, the invention relates to an electrode plate for a non-aqueous secondary battery including at least a positive electrode active material or negative electrode active material disposed on any one of the above-described current collectors for a non-aqueous secondary battery. With this configuration, the arrangement pattern of the protrusions exhibits a large resistance to stress. Thus, in the step of disposing the electrode active material on the protrusions of the current collector, it is possible to prevent the current collector from becoming locally deformed or distorted. At the same time, in the step of disposing the electrode active material on the protrusions of the current collector and the subsequent step such as slitting to a predetermined width, it is also possible to suppress separation of the electrode active material.

Also, the invention relates to a non-aqueous secondary battery that is produced by winding or laminating a positive electrode plate and a negative electrode plate according to the above-described electrode plate for a non-aqueous secondary battery with a separator interposed therebetween to obtain an electrode assembly, and sealing the electrode assembly and a non-aqueous type electrolyte into a battery case. With this configuration, when the non-aqueous secondary battery is charged and discharged, the volume change due to expansion of the electrode active material upon lithium absorption and shrinkage of the electrode active material upon lithium desorption can be reduced. It is thus possible to obtain a high-capacity, high-reliability non-aqueous secondary battery that does not suffer such a problem as breakage of the electrode plate due to charge/discharge and separation of the electrode active material layer.

Also, the current collector can be shaped like a long strip, and the longitudinal direction of the current collector can agree with the column direction while the width direction of the current collector can agree with the row direction. The interval at which the row units are aligned can decrease gradually from one end of the current collector in the longitudinal direction thereof toward the other end. As a result, by spirally winding an electrode plate using the above-described current collector in such a manner that the interval of the row units is larger on the inner side, it is possible to reduce the adverse influence of the difference in curvature between the inner side and the outer side. That is, when the pitch of the tops of the protrusions is narrow on the inner side and wide on the outer side, there is a difference in bending stress exerted on the electrode plate, but such difference can be reduced. Thus, in the step of producing an electrode assembly from an electrode plate using the above-described current collector, the misalignment of the wound electrode plate and separation of the electrode active material can be suppressed.

Also, the protrusions can be formed on both faces of the metal foil, and the protrusions on one face of the metal foil can be in phase with the protrusions on the other face of the metal foil. As a result, the flexibility of this current collector can be heightened compared with a current collector of the same total thickness having protrusions on both faces. Thus, when an electrode plate using this current collector is wound to form an electrode assembly, a problem such as the misalignment of the wound electrode plate does not occur, and a uniform electrode assembly can be produced.

Also, the protrusions can be formed on both faces of the metal foil, and the protrusions on one face of the metal foil can be out of phase with the protrusions on the other face of the metal foil in the row direction. As a result, the strength of this current collector can be improved compared with a current collector of the same total thickness in which the protrusions on both faces are in phase with one another. In the step of forming the protrusions on the surface of the current collector and the step of disposing the electrode active material on the protrusions of the current collector, it is possible to more effectively prevent the current collector from becoming locally deformed or distorted.

Also, the protrusions can be formed on both faces of the metal foil, and the interval at which the row units are aligned in the column direction on one face of the metal foil can be greater than the interval at which the row units are aligned on the other face of the metal foil. As a result, when an electrode plate using this current collector is spirally wound to form an electrode assembly, it is possible to reduce the adverse influence of the difference in curvature between the inner face and the outer face of the electrode plate. That is, when the pitch of the tops of the protrusions is wide on the outer face and narrow on the inner face, there is a difference in bending stress exerted on the electrode plate, but such difference can be reduced. Thus, when the electrode plate is wound to form an electrode assembly, the misalignment of the wound electrode plate and separation of the electrode active material can be suppressed in a more reliable manner.

Also, one face of the metal foil can have the protrusions in the aforementioned arrangement pattern while the other face can be a flat surface, and the flat surfaces of two or more such metal foils can be bonded together to form a current collector. As a result, the protrusions on one face of the current collector and the protrusions on the other face can be provided so as to have a desired phase difference therebetween. When an electrode plate using the above-described current collector is wound with other battery components to form an electrode assembly, it is bent at various curvatures, but the stress created by bending at various curvatures can be easily addressed. That is, by adjusting the phase according to the curvature, the electrode plate can have a desired function while having strength characteristics and flexibility as the current collector. Also, the phase can be partially adjusted in one electrode assembly, and the portions of the current collector with a large curvature and under a large stress can be reinforced. Further, since the protrusions are formed on only one face of the metal foil, higher protrusions can be formed on a thinner metal foil, compared with the case where the protrusions are formed on both faces of the metal foil. Also, in an electrode plate for a non-aqueous secondary battery using the above-described current collector, the volume ratio of the positive electrode active material or negative electrode active material can be changed freely. When such electrode plates are wound to form an electrode assembly, the efficiency of the electrochemical reaction on the outer side and the inner side of the electrode assembly can be heightened, and the battery capacity can be increased.

Also, when two or more such metal foils are bonded together in such a manner that the protrusions on one face of the current collector are out of phase with the protrusions on the other face, the portions where the widths of the protrusions on both faces partially overlap can receive stress due to winding of the electrode plate while reducing it. On the other hand, when the portions where no protrusions are formed on both faces receive stress, they bend flexibly. Thus, the balance between stress resistance and flexibility can be changed freely. It is therefore possible to prevent the electrode plate and current collector from becoming cracked.

Also, when two or more such metal foils are bonded together in such a manner that the protrusions on one face of the current collector are in phase with the protrusions on the other face, the portions where the protrusions are formed on both faces can receive stress due to winding. On the other hand, when the portions where no protrusions are formed on both faces receive stress, they bend flexibly. Thus, in a battery having an electrode assembly whose electrode plate partially has a large curvature, such as a prismatic battery, the excellent flexibility of the electrode plate permits prevention of separation of the active material.

Also, since this current collector is produced by bonding the flat surfaces of two or more such metal foils together, the phase of the protrusions on one face and the protrusions on the other face can be freely adjusted. Also, the production process can also be simplified.

Also, one face of the metal foil can have the protrusions in the aforementioned arrangement pattern while the other face can be a flat surface. The metal foil can be folded at a predetermined position, and the flat surfaces of the folded metal foil can be bonded together to form a current collector. As a result, there is no need to cut the current collector, and occurrence of burrs due to cutting can be prevented. Also, by changing the folding position of one metal foil, the phase of the protrusions on both faces of the metal foil can be adjusted, and it is thus possible to simplify the process of cutting and adjusting the bonding position necessary when two or more metal foils are used. This makes it possible to reduce the production cost of the position adjustment process, increase the yield of the current collector, and improve the production capability.

Also, by winding or laminating the above-described positive electrode plate and negative electrode plate with a separator interposed therebetween to form an electrode assembly, and sealing the electrode assembly and a non-aqueous type electrolyte into a battery case to produce a non-aqueous secondary battery, the aforementioned arrangement pattern of the protrusions exhibits a large resistance to stress. Thus, in the step of forming the protrusions on the current collector surface and the step of disposing the electrode active material on the protrusions of the current collector, it is possible to prevent the current collector from becoming locally deformed or distorted. The following Embodiments and Examples will be described with reference to the application of the invention to current collectors for non-aqueous type secondary batteries, and electrode plates for secondary batteries and secondary batteries using the same, but they are not to be construed as limiting the invention. For example, the invention is applicable to current collectors for non-aqueous type primary batteries or other primary batteries than non-aqueous type, and electrode plates for primary batteries and primary batteries using the same. The invention is also applicable to current collectors for other secondary batteries than the non-aqueous type, and electrode plates for secondary batteries and secondary batteries using the same.

Embodiment 1

Referring now to FIG. 1 to FIG. 4, Embodiment 1 of the invention is described. FIG. 1 is a plane view schematically showing the structure of a current collector for a non-aqueous secondary battery according to Embodiment 1 of the invention.

In FIG. 1, a current collector 10 is a current collector for use in an electrode plate of a lithium ion secondary battery (hereinafter also referred to as simply a lithium secondary battery), which is an exemplary non-aqueous secondary battery. The current collector 10 is formed of a metal foil 1 at least one surface of which has a large number of columnar protrusions 2 in a predetermined arrangement pattern, and the tops and cross-sections of the columnar protrusions 2 are substantially circular. It should be noted that at least the tops of the protrusions 2 are not compressed.

In the arrangement pattern of FIG. 1, the protrusions 2 are aligned at an equal pitch P1 in the row direction X in such a manner that the centers of the respective protrusions 2 are positioned on a straight line represented by a broken line 3. A group of these protrusions 2 aligned in the row direction X constitute a row unit 4. The row units 4 are aligned in parallel at an equal pitch P2 in the column direction Y, which is a direction perpendicular to the row direction X. Also, the respective protrusions 2 of such a row unit 4 are displaced in the row direction X from the protrusions 2 of another row unit 4 that is adjacent in the column direction Y, and the amount of displacement is a pitch P3 which is ½ of the pitch P1. The amount of the pitch displaced is not limited to ½ of the pitch P1 and can be increased or decreased if necessary.

In FIG. 2, (a) is a perspective view of a roller used to form the protrusions 2 on the current collector 10, and (b) is an enlarged perspective view of the surface of this roller.

A roller 20 of FIG. 2 is prepared by coating a surface 6 of a metal roller material 5 with a ceramic such as CrO, WC, or TiN and then forming depressions 7 corresponding to the protrusions 2 in an arrangement pattern corresponding to the aforementioned arrangement pattern by laser machining or the like.

That is, the depressions 7 are aligned linearly in the axial direction of the roller 20 at a pitch P1' which is equal to the pitch P1, thereby forming a row unit, and such row units are aligned in parallel in the circumferential direction of the roller 20 at a pitch P2' which is equal to the pitch P2.

Also, the respective depressions 7 of the row units that are adjacent to one another in the circumferential direction of the roller 20 are displaced in the axial direction of the roller 20, and the amount of displacement is a pitch P3' which is equal to the pitch P3. The amount of the pitch displaced is not limited to ½ of the pitch P1' and can be increased or decreased if necessary.

FIG. 3 shows an example of a processing method for forming the protrusions 2 on the surfaces of the current collector 10 using the rollers 20.

In the example shown in the figure, a pair of the rollers 20 are disposed with a predetermined space therebetween, and the long metal foil 1 is passed through the space to press both faces of the metal foil 1 with the rollers 20, so that a large number of the protrusions 2 are formed on both faces of the metal foil 1 in the aforementioned arrangement pattern. By this, the portion of the metal foil 1 facing the portion of the surface of each of the rollers 20 having no depressions 7 is compressed, so that the portions of the metal foil 1 facing the portions having the depressions 7 are raised by plastic deformation. As a result, the protrusions 2 are formed. As shown in Examples that will be described later, when the protrusions 2 are formed, their edges (tops) are not in contact with the bottom faces of the depressions 7, and thus at least their tops are not compressed.

It should be noted that the method of forming the protrusions 2 on the surfaces of the metal foil 1 is not limited to the method described above. For example, dies may be used in place of the rollers 20, and the metal foil 1 may be sandwiched and compressed between an upper die and a lower die in order to form the protrusions 2 on both faces of the metal foil 1.

In the following, an electrode plate (which is the general term for a positive electrode plate and a negative electrode plate) using the current collector 10 is described. A positive electrode plate and a negative electrode plate are prepared by disposing an electrode active material (which is the general term for a positive electrode active material and a negative electrode active material and is hereinafter referred to as simply an active material) on the surface of the current collector 10 with the protrusions 2 formed thereon.

One method for disposing an active material on the surface of the current collector 10 is a method of applying a paint containing an active material (positive electrode mixture paint or negative electrode mixture paint) onto the current collector.

The positive electrode mixture paint is prepared by placing a positive electrode active material, a conductive agent, and a binder into a suitable dispersion medium, mixing and dispersing them with a dispersing device such as a planetary mixer, and kneading the mixture while adjusting its viscosity so that it becomes suited for application to the current collector 10.

Examples of the positive electrode active material which can be used include composite oxides, such as lithium cobaltate and modified materials thereof (e.g., solid solution of lithium cobaltate containing aluminum or magnesium), lithium nickelate and modified materials thereof (e.g., materials in which part of the nickel is replaced with cobalt), and lithium manganate and modified materials thereof.

Examples of the conductive agent for the positive electrode include carbon blacks such as acetylene black, ketjen black, channel black, furnace black, lamp black, and thermal black, and various graphites, and they can be used singly or in combination.

Examples of the binder which can be used for the positive electrode include polyvinylidene difluoride (PolyVinylidene DiFluoride, PVDF), modified PVDF, polytetrafluoroethylene (Poly Tetra Fluoro Ethylene, PTFE), and rubber particle binders having an acrylate unit. It is also possible to mix an acrylate monomer or acrylate oligomer containing a reactive functional group in the binder.

The positive electrode mixture paint prepared in the above manner is applied onto the metal foil 1 made of, for example, aluminum foil with a die coater, followed by drying. This is pressed to a predetermined thickness and then slit to a predetermined width and length to obtain a long-strip like positive electrode plate. The slitting is made so that the column direction Y agrees with the longitudinal direction of the long-strip like positive electrode plate.

Also, the negative electrode mixture paint is prepared by placing a negative electrode active material and a binder into a suitable dispersion medium, mixing and dispersing them with a dispersing device such as a planetary mixer, and kneading the mixture while adjusting its viscosity so that it becomes suited for application to the current collector 10.

Examples of the active material which can be used for the negative electrode include various natural graphites and artificial graphites, silicon-based composite materials such as silicide, and various alloy composition materials.

As the binder for the negative electrode, polyvinylidene difluoride and modified materials thereof can be used. However, in terms of improving lithium ion acceptance, it is preferable to use a particulate styrene-butadiene copolymer rubber (SBR) or a modified material thereof and a cellulose-type resin such as carboxymethylcellulose (CMC) in combination, or to use a mixture of particulate SBR or a modified material thereof and a small amount of such a cellulose type resin.

The negative electrode mixture paint prepared in the above manner is applied onto the metal foil 1 made of, for example, copper foil with a die coater, followed by drying. This is pressed to a predetermined thickness and then slit to a predetermined width and length to obtain a long-strip like negative electrode plate. The slitting is made so that the column direction Y agrees with the longitudinal direction of the long-strip like negative electrode plate.

Also, another method for disposing the positive electrode active material or negative electrode active material on the current collector 10 is a vacuum process in which the positive electrode active material or negative electrode active material can be selectively disposed on a specific position of the current collector. In the case of vacuum process, it is preferable to dispose the positive electrode active material or negative electrode active material mainly on the uncompressed tops of the protrusions 2 in columnar form.

This is for the following reason. Since the tops of the protrusions 2 are not compressed, they maintain the initial plane precision without being affected by processing strain or the like. Thus, an active material thin film can be formed thereon with good accuracy. In addition, when the active material is disposed on the tops of the respective protrusions 2 in columnar form in such a manner that these columnar active materials align continuously in a lateral direction to form a thin film, it is expected that the volume expansion of the active material thin film upon lithium absorption can be reduced. At this time, although the thickness of the active material thin film differs according to the characteristics the intended non-aqueous secondary battery is required to provide, it is preferably in the range of about 5 to 30 µm, and more preferably in the range of 10 to 25 µm, in terms of obtaining the greatest effect of reducing the volume expansion.

As the vacuum process, a dry process such as deposition, sputtering, or CVD (Chemical Vapor Deposition) can be used. In the case of a dry process, examples of the negative electrode active material which can be used include Si, Sn, Ge, and Al and alloys thereof, oxides such as $SiO_x$ and $SnO_x$, and $SiS_x$ and SnS. Also, in the case of a dry process, the negative electrode active material is preferably amorphous or low crystalline.

In the following, a non-aqueous secondary battery using the positive electrode plate and negative electrode plate is described. FIG. 4 is a longitudinal perspective view of a lithium secondary battery as an exemplary non-aqueous secondary battery.

In a lithium secondary battery 30 illustrated in FIG. 4, a positive electrode plate 31 including a composite lithium oxide as the active material and a negative electrode plate 32 including a material capable of retaining lithium as the active material are spirally wound with a separator 33 interposed therebetween, to form an electrode assembly 34.

The electrode assembly 34 is housed in a cylindrical battery case 35 with a bottom while being insulated from the battery case 35 by an insulator plate 36. Also, a negative electrode lead 37 attached to the lower part of the electrode assembly 34 is connected to the bottom of the battery case 35, while a positive electrode lead 38 attached to the upper part of the electrode assembly 34 is connected to a seal plate 39.

Also, after a predetermined amount of an electrolyte (not shown) comprising a non-aqueous solvent is injected into the battery case 35, the seal plate 39 the circumference of which is fitted with a seal gasket 40 is inserted in the opening of the battery case 35, and the opening of the battery case 35 is bent inward and crimped for sealing.

The separator 33 can be composed of any materials if only they have a composition capable of withstanding the use in the non-aqueous secondary battery. In particular, it is preferable to use microporous films made of an olefin resin such as polyethylene and polypropylene as single agent or in combination. The thickness of the separator is desirably 10 to 25 µm.

As for the electrolyte, various lithium compounds such as $LiPF_6$ and $LiBF_4$ can be used as the electrolyte salts. Also, as the solvent, ethylene carbonate (EC), dimethyl carbonate (DMC), diethyl carbonate (DEC), and methyl ethyl carbonate (MEC) can be used singly or in combination. In order to form a good coating film on the positive electrode plate or negative electrode plate and ensure stability under overcharged conditions, it is preferable to use vinylene carbonate (VC) and cyclohexyl benzene (CHB), and modified materials thereof.

Embodiment 2

Figure 5:
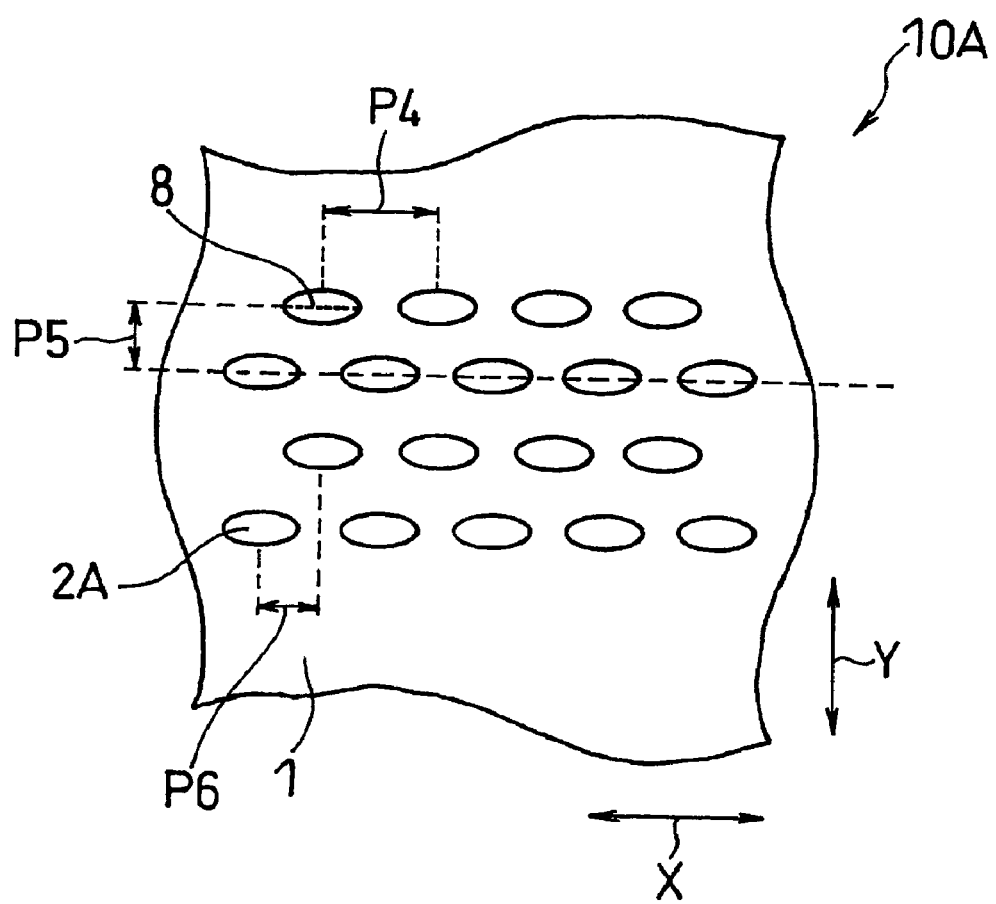
FIG. 5 is a plane view schematically showing the structure of a current collector according to Embodiment 2 of the invention.

Referring now to FIG. 5, Embodiment 2 of the invention is described. FIG. 5 is a plane view schematically showing the structure of a current collector for a non-aqueous secondary battery according to Embodiment 2 of the invention.

As illustrated in FIG. 5, a current collector 10A of Embodiment 2 is different from that of Embodiment 1 in the shape of protrusions 2A formed on a metal foil 1, and the tops and cross-sections thereof are substantially oval. The arrangement pattern of the protrusions 2A formed on the surface of the metal foil 1 is the same as that of Embodiment 1.

Specifically, the protrusions 2A are aligned linearly at an equal pitch P4 in the row direction X. A group of the protrusions 2A aligned in the row direction X constitute a row unit, and such row units are aligned in parallel at an equal pitch P5 in the column direction Y. Also, the respective protrusions 2A of such a row unit are displaced in the row direction X from the protrusions 2A of another row unit that is adjacent in the column direction Y, and the amount of displacement is a pitch P6 which is ½ of the pitch P4. The amount of the pitch displaced is not limited to ½ of the pitch P4 and can be increased or decreased if necessary.

In addition, in the arrangement pattern of this embodiment, the protrusions 2A whose tops and cross-sections are substantially oval are disposed so that the major axis of the oval agrees with the row direction X.

The processing method of forming the protrusions 2A on the surfaces of the current collector 10A is the same as that of Embodiment 1 shown in FIG. 3. Also, the protrusions 2A can be formed by using dies, etc. in place of the rollers in the same manner. The method of producing an electrode plate by using the current collector 10A is also the same as that of Embodiment 1. Further, the method of producing a non-aqueous secondary battery by using the electrode plate prepared in the above manner is also the same as that of Embodiment 1 shown in FIG. 4.

Embodiment 3

Figure 6:
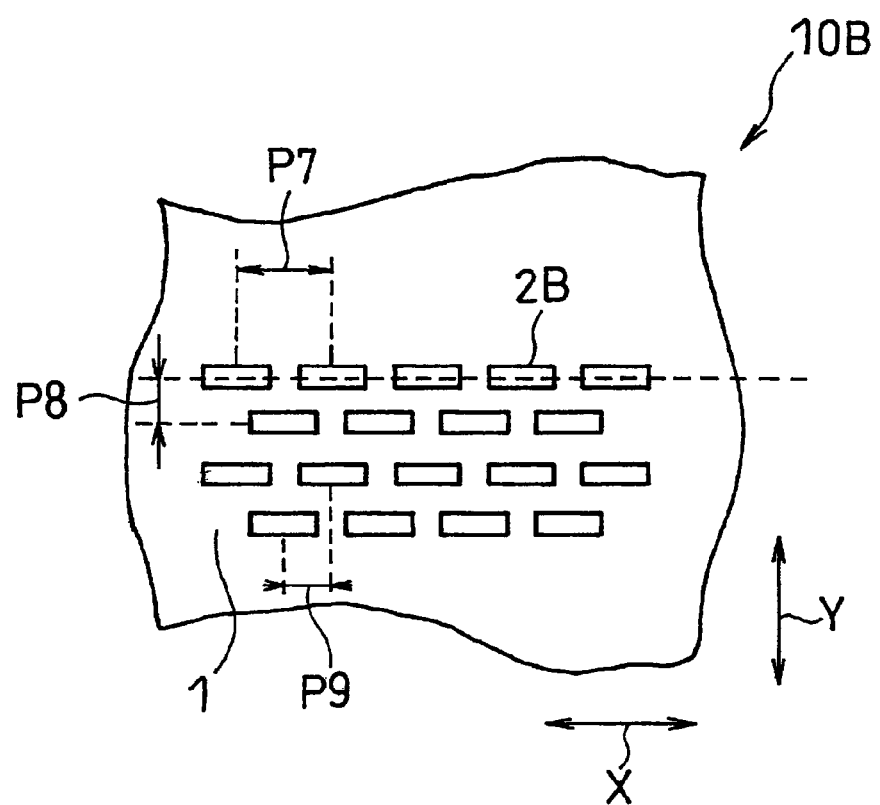
FIG. 6 is a plane view schematically showing the structure of a current collector according to Embodiment 3 of the invention.

Referring now to FIG. 6, Embodiment 3 of the invention is described. FIG. 6 is a plane view schematically showing the structure of a current collector for a non-aqueous secondary battery according to Embodiment 3 of the invention.

As illustrated in FIG. 6, a current collector 10B of Embodiment 3 is different from that of Embodiment 1 in the shape of protrusions 2B formed on a metal foil 1, and the tops and cross-sections thereof are substantially rectangular. The arrangement pattern of the protrusions 2B formed on the surface of the metal foil 1 is the same as that of Embodiment 1.

Specifically, the protrusions 2B are aligned linearly at an equal pitch P7 in the row direction X. A group of the protrusions 2B aligned in the row direction X constitute a row unit, and such row units are aligned in parallel at an equal pitch P8 in the column direction Y. Also, the respective protrusions 2B of such a row unit are displaced in the row direction X from the protrusions 2B of another row unit that is adjacent in the column direction Y, and the amount of displacement is a pitch P9 which is ½ of the pitch P7. The amount of the pitch displaced is not limited to ½ of the pitch P7 and can be increased or decreased if necessary.

In addition, in the arrangement pattern of this embodiment, the protrusions 2B whose tops and cross-sections are substantially rectangular are disposed so that the longitudinal direction of the rectangle agrees with the row direction X.

The processing method of forming the protrusions 2B on the surfaces of the current collector 10B is the same as that of Embodiment 1 shown in FIG. 3. Also, the protrusions 2B can be formed by using dies, etc. in place of the rollers in the same manner. The method of producing an electrode plate by using the current collector 10B is also the same as that of Embodiment 1. Further, the method of producing a non-aqueous secondary battery by using the electrode plate prepared in the above manner is also the same as that of Embodiment 1 shown in FIG. 4.

Embodiment 4

Figure 7:
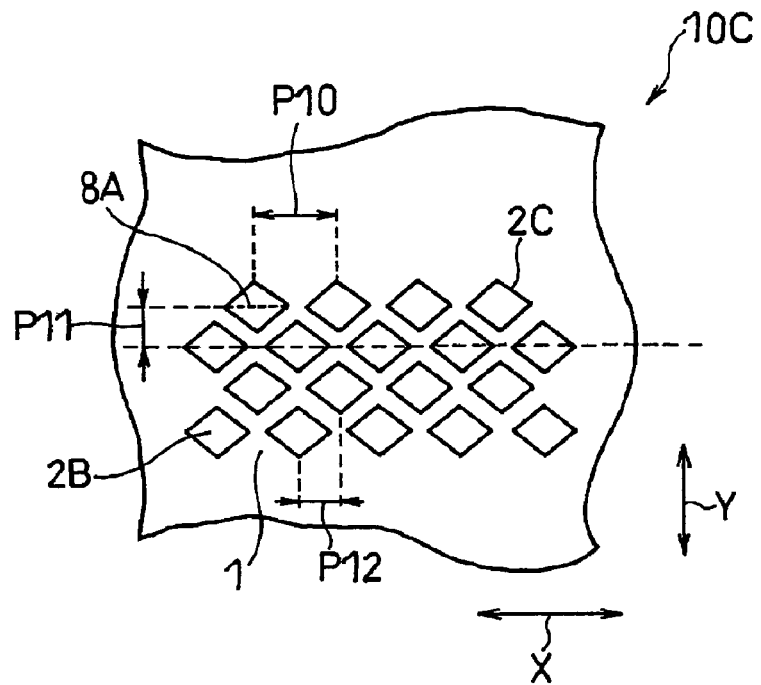
FIG. 7 is a plane view schematically showing the structure of a current collector according to Embodiment 4 of the invention.

Referring now to FIG. 7, Embodiment 4 of the invention is described. FIG. 7 is a plane view schematically showing the structure of a current collector for a non-aqueous secondary battery according to Embodiment 4 of the invention.

As illustrated in FIG. 7, a current collector 10C of Embodiment 4 is different from that of Embodiment 1 in the shape of protrusions 2C formed on a metal foil 1, and the tops and cross-sections thereof are substantially rhombic. The arrangement pattern of the protrusions 2C formed on the surface of the metal foil 1 is the same as that of Embodiment 1.

Specifically, the protrusions 2C are aligned linearly at an equal pitch P10 in the row direction X. A group of the protrusions 2C aligned in the row direction X constitute a row unit, and such row units are aligned in parallel at an equal pitch P11 in the column direction Y. Also, the respective protrusions 2C of such a row unit are displaced in the row direction X from the protrusions 2C of another row unit that is adjacent in the column direction Y, and the amount of displacement is a pitch P12 which is ½ of the pitch P10. The amount of the pitch displaced is not limited to ½ of the pitch P10 and can be increased or decreased if necessary.

In addition, in the arrangement pattern of this embodiment, the protrusions 2C whose tops and cross-sections are substantially rhombic are disposed so that the longer diagonal line of the rhombus agrees with the row direction X.

The processing method of forming the protrusions 2C on the surfaces of the current collector 10C is the same as that of Embodiment 1 shown in FIG. 3. Also, the protrusions 2C can be formed by using dies, etc. in place of the rollers in the same manner. The method of producing an electrode plate by using the current collector 10C is also the same as that of Embodiment 1. Further, the method of producing a non-aqueous secondary battery by using the electrode plate prepared in the above manner is also the same as that of Embodiment 1 shown in FIG. 4.

Embodiment 5

Figure 8:
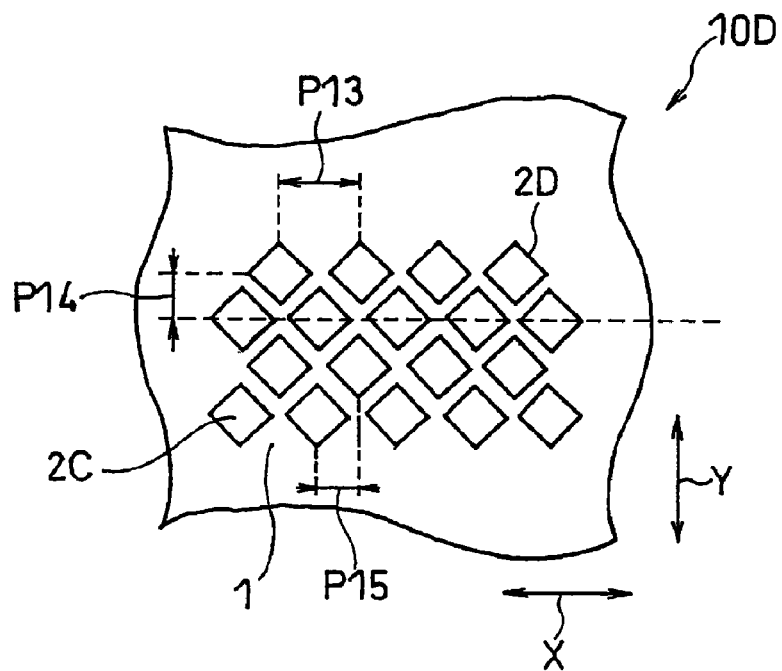
FIG. 8 is a plane view schematically showing the structure of a current collector according to Embodiment 5 of the invention.

Referring now to FIG. 8, Embodiment 5 of the invention is described. FIG. 8 is a plane view schematically showing the structure of a current collector for a non-aqueous secondary battery according to Embodiment 5 of the invention.

As illustrated in FIG. 8, a current collector 10D of Embodiment 5 is different from that of Embodiment 1 in the shape of protrusions 2D formed on a metal foil 1, and the tops and cross-sections thereof are substantially square. The arrangement pattern of the protrusions 2D formed on the surface of the metal foil 1 is the same as that of Embodiment 1.

Specifically, the protrusions 2D are aligned linearly at an equal pitch P13 in the row direction X. A group of the protrusions 2D aligned in the row direction X constitute a row unit, and such row units are aligned in parallel at an equal pitch P14 in the column direction Y. Also, the respective protrusions 2D of such a row unit are displaced in the row direction X from the protrusions 2D of another row unit that is adjacent in the column direction Y, and the amount of displacement is a pitch P15 which is ½ of the pitch P13. The amount of the pitch displaced is not limited to ½ of the pitch P13 and can be increased or decreased if necessary.

In addition, in the arrangement pattern of this embodiment, the protrusions 2D whose tops and cross-sections are substantially square are disposed so that the direction of one diagonal line of the square agrees with the row direction X.

The processing method of forming the protrusions 2D on the surfaces of the current collector 10D is the same as that of Embodiment 1 shown in FIG. 3. Also, the protrusions 2D can be formed by using dies, etc. in place of the rollers in the same manner. The method of producing an electrode plate by using the current collector 10D is also the same as that of Embodiment 1. Further, the method of producing a non-aqueous secondary battery by using the electrode plate prepared in the above manner is also the same as that of Embodiment 1 shown in FIG. 4.

Embodiment 6

Figure 9:
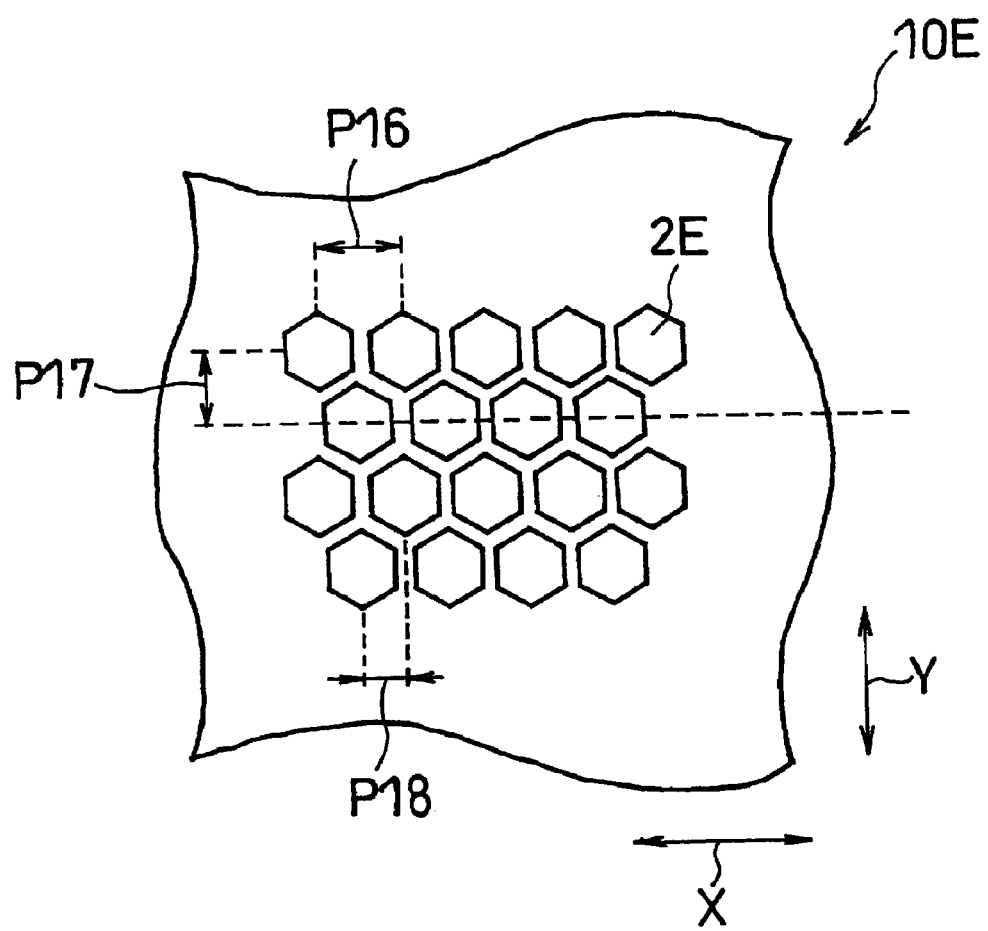
FIG. 9 is a plane view schematically showing the structure of a current collector according to Embodiment 6 of the invention.

Referring now to FIG. 9, Embodiment 6 of the invention is described. FIG. 9 is a plane view schematically showing the structure of a current collector for a non-aqueous secondary battery according to Embodiment 6 of the invention.

As illustrated in FIG. 9, a current collector 10E of Embodiment 6 is different from that of Embodiment 1 in the shape of protrusions 2E formed on a metal foil 1, and the tops and cross-sections thereof are substantially equilateral hexagonal. The arrangement pattern of the protrusions 2E formed on the surface of the metal foil 1 is the same as that of Embodiment 1.

Specifically, the protrusions 2E are aligned linearly at an equal pitch P16 in the row direction X. A group of the protrusions 2E aligned in the row direction X constitute a row unit, and such row units are aligned in parallel at an equal pitch P17 in the column direction Y. Also, the respective protrusions 2E of such a row unit are displaced in the row direction X from the protrusions 2E of another row unit that is adjacent in the column direction Y, and the amount of displacement is a pitch P18 which is ½ of the pitch P16. The amount of the pitch displaced is not limited to ½ of the pitch P16 and can be increased or decreased if necessary.

In addition, in the arrangement pattern of this embodiment, the protrusions 2E whose tops and cross-sections are substantially equilateral hexagonal are disposed so that a straight line perpendicular to a pair of opposite sides of the equilateral hexagon agrees with the row direction X.

Also, the shape of the protrusions is not limited to the substantially equilateral hexagon, and it is possible to form protrusions that are in the shape of a substantially equilateral polygon having an even number of eight or more angles on the current collector in the same arrangement pattern as that of this embodiment.

The processing method of forming the protrusions 2E on the surfaces of the current collector 10E is the same as that of Embodiment 1 shown in FIG. 3. Also, the protrusions 2E can be formed by using dies, etc. in place of the rollers in the same manner. The method of producing an electrode plate by using the current collector 10E is also the same as that of Embodiment 1. Further, the method of producing a non-aqueous secondary battery by using the electrode plate prepared in the above manner is also the same as that of Embodiment 1 shown in FIG. 4.

Example 1

Examples of the invention are hereinafter described. Examples 1 to 6 show examples of electrode plates of the invention, and Example 7 shows an example of a non-aqueous secondary battery of the invention.

A 15-µm thick aluminum foil was used as a current collector for a positive electrode plate of the invention. A pair of rollers (ceramic rollers) were produced in order to form a large number of protrusions whose tops and cross-sections are substantially circular, as illustrated in FIG. 1 of Embodiment 1, on the surfaces of this aluminum foil in the aforementioned arrangement pattern. On the surface of each roller, depressions (depth 4 µm) having a shape corresponding to that of the protrusions were formed in the aforementioned arrangement pattern. The pitch P3 was ½ of the pitch P1. The aluminum foil was passed between the pair of rollers while being pressed. In this way, a current collector for a positive electrode plate having 3-µm-high protrusions on both faces and having a total thickness of 18 µm was produced.

Subsequently, a positive electrode mixture paint was prepared by stirring and kneading 100 parts by weight of lithium cobaltate in which part of the cobalt was replaced with nickel and manganese, serving as a positive electrode active material, 2 parts by weight of an acetylene black conductive agent per 100 parts by weight of the active material, 2 parts by weight of a polyvinylidene difluoride binder per 100 parts by weight of the active material, and a suitable amount of N-methyl-2-pyrrolidone with a double-arm kneader. This positive electrode mixture paint was applied onto both faces of the current collector prepared in the above manner, dried, and pressed. The current collector was then slit to a predetermined width and length to produce a long-strip like positive electrode plate. At this time, the slitting was made so that the column direction Y agreed with the longitudinal direction of the positive electrode plate and that the row direction X agreed with the width direction of the positive electrode plate.

In the current collector thus produced, the substantially circular protrusions are formed in a close-packed arrangement pattern. Thus, it exhibits a large resistance to the tensile stress exerted on the longitudinal direction (the column direction Y) of the current collector or positive electrode plate during the production of the current collector and positive electrode plate. Hence, when the positive electrode mixture layers were formed on the current collector to produce the positive electrode plate, or when the positive electrode plate was slit in the above manner, it was possible to prevent the current collector from becoming locally deformed or warped and prevent the positive electrode mixture layers from separating therefrom.

Example 2

A 20-µm thick copper foil was used as a current collector for a negative electrode plate of the invention. A pair of rollers (ceramic rollers) were produced in order to form a large number of protrusions whose tops and cross-sections are substantially oval, as illustrated in FIG. 5 of Embodiment 2, on the surfaces of this copper foil in the aforementioned arrangement pattern. On the surface of each roller, depressions (depth 13 µm) having a shape corresponding to that of the protrusions were formed in the aforementioned arrangement pattern. The pitch P6 was ½ of the pitch P4. The copper foil was passed between the pair of rollers while being pressed. In this way, a current collector for a negative electrode plate having 9-µm-high protrusions on both faces and having a total thickness of 29 µm was produced.

Subsequently, using purity 99.9999% silicon (negative electrode active material) as the sputtering target, a deposition process was performed on both faces of the current collector prepared in the above manner by means of a deposition device equipped with an electron beam heating means while purity 99.7% oxygen was being introduced, so that a SiO0.5 film with a thickness of 23 µm was formed on each of the protrusions. This was then slit to a predetermined width and length to obtain a long-strip like negative electrode plate. At this time, the slitting was made so that the column direction Y agreed with the longitudinal direction of the negative electrode plate and that the row direction X agreed with the width direction of the negative electrode plate.

The current collector prepared in the above manner is formed so that the major axis of the substantially oval protrusions agrees with the width direction (row direction X) of the current collector, as described in Embodiment 2. Thus, when the negative electrode active material is deposited toward the longitudinal direction (column direction Y) of the current collector, the active material can be efficiently attached onto the protrusions and, in addition, the current collector can exhibit a large resistance to the tensile stress exerted on the longitudinal direction of the current collector. Hence, when the negative electrode mixture layers were deposited on the current collector to produce the negative electrode plate, or when the negative electrode plate was slit in the above manner, it was possible to prevent the current collector from becoming locally deformed or warped and prevent the negative electrode mixture layers from separating therefrom.

Example 3

A 15-µm thick copper foil was used as a current collector for a negative electrode plate of the invention. A pair of rollers (ceramic rollers) were produced in order to form a large number of protrusions whose tops and cross-sections are substantially rectangular, as illustrated in FIG. 6 of Embodiment 3, on the surfaces of this copper foil in the aforementioned arrangement pattern. On the surface of each roller, depressions (depth 7 μm) having a shape corresponding to that of the protrusions were formed in the aforementioned arrangement pattern. The pitch P9 was ½ of the pitch P7. The copper foil was passed between the pair of rollers while being pressed. In this way, a current collector for a negative electrode plate having 5-μm-high protrusions on both faces and having a total thickness of 20 μm was produced.

Subsequently, using purity 99.9999% silicon (negative electrode active material) as the sputtering target, a deposition process was performed on both faces of the current collector prepared in the above manner by means of a deposition device equipped with an electron beam heating means while purity 99.7% oxygen was being introduced, so that a SiO0.5 film with a thickness of 15 μm was formed on each of the protrusions. This was then slit to a predetermined width and length to obtain a long-strip like negative electrode plate. At this time, the slitting was made so that the column direction Y agreed with the longitudinal direction of the negative electrode plate and that the row direction X agreed with the width direction of the negative electrode plate.

The current collector prepared in the above manner is formed so that the longitudinal direction of the substantially rectangular protrusions agrees with the width direction (row direction X) of the current collector, as described in Embodiment 3. Thus, when the negative electrode active material is deposited toward the longitudinal direction (column direction Y) of the current collector, the active material can be efficiently attached onto the protrusions and, in addition, the current collector can exhibit a large resistance to the tensile stress exerted on the longitudinal direction of the current collector. Hence, when the negative electrode mixture layers were deposited on the current collector to produce the negative electrode plate, or when the negative electrode plate was slit in the above manner, it was possible to prevent the current collector from becoming locally deformed or warped and prevent the negative electrode mixture layers from separating therefrom.

Example 4

A 18-μm thick copper foil was used as a current collector for a negative electrode plate of the invention. A pair of rollers (ceramic rollers) were produced in order to form a large number of protrusions whose tops and cross-sections are substantially rhombic, as illustrated in FIG. 7 of Embodiment 4, on the surfaces of this copper foil in the aforementioned arrangement pattern. On the surface of each roller, depressions (depth 10 μm) having a shape corresponding to that of the protrusions were formed in the aforementioned arrangement pattern. The pitch P12 was ½ of the pitch P10. The copper foil was passed between the pair of rollers while being pressed. In this way, a current collector for a negative electrode plate having 8-μm-high protrusions on both faces and having a total thickness of 26 μm was produced.

Subsequently, using purity 99.9999% silicon (negative electrode active material) as the sputtering target, a deposition process was performed on both faces of the current collector prepared in the above manner by means of a deposition device equipped with an electron beam heating means while purity 99.7% oxygen was being introduced, so that a SiO0.5 film with a thickness of 20 μm was formed on each of the protrusions. This was then slit to a predetermined width and length to obtain a long-strip like negative electrode plate. At this time, the slitting was made so that the column direction Y agreed with the longitudinal direction of the negative electrode plate and that the row direction X agreed with the width direction of the negative electrode plate.

The current collector prepared in the above manner is formed so that the direction of the longer diagonal line of the substantially rhombic protrusions agrees with the width direction (row direction X) of the current collector, as described in Embodiment 4. Thus, when the negative electrode active material is deposited toward the longitudinal direction (column direction Y) of the current collector, the active material can be efficiently attached onto the protrusions and, in addition, the current collector can exhibit a large resistance to the tensile stress exerted on the longitudinal direction of the current collector. Hence, when the negative electrode mixture layers were deposited on the current collector to produce the negative electrode plate, or when the negative electrode plate was slit in the above manner, it was possible to prevent the current collector from becoming locally deformed or warped and prevent the negative electrode mixture layers from separating therefrom.

Example 5

A 10-μm thick copper foil was used as a current collector for a negative electrode plate of the invention. A pair of rollers (ceramic rollers) were produced in order to form a large number of protrusions whose tops and cross-sections are substantially square, as illustrated in FIG. 8 of Embodiment 5, on the surfaces of this copper foil in the aforementioned arrangement pattern. On the surface of each roller, depressions (depth 3 μm) having a shape corresponding to that of the protrusions were formed in the aforementioned arrangement pattern. The pitch P15 was ½ of the pitch P13. The copper foil was passed between the pair of rollers while being pressed. In this way, a current collector for a negative electrode plate having 2-μm-high protrusions on both faces and having a total thickness of 12 μm was produced.

Subsequently, a negative electrode mixture paint was prepared by stirring 100 parts by weight of artificial graphite, serving as a negative electrode active material, 2.5 parts by weight (1 part by weight when converted to the solid content of the binder) of a dispersion of styrene-butadiene copolymer rubber particles (solid content 40% by weight), serving as a binder, per 100 parts by weight of the active material, 1 part by weight of carboxymethylcellulose, serving as a thickener, per 100 parts by weight of the active material, and a suitable amount of water with a double-arm kneader. This negative electrode mixture paint was applied onto both faces of the current collector prepared in the above manner, dried, and pressed. The current collector was then slit to a predetermined width and length to produce a long-strip like negative electrode plate. At this time, the slitting was made so that the column direction Y agreed with the longitudinal direction of the negative electrode plate and that the row direction X agreed with the width direction of the negative electrode plate.

In the current collector produced in the above manner, the substantially square protrusions are formed in a close-packed arrangement pattern. Thus, it exhibits a large resistance to the tensile stress exerted on the longitudinal direction (the column direction Y) of the current collector or negative electrode plate during the production of the current collector and negative electrode plate. Hence, when the negative electrode mixture layers were formed on the current collector to produce the negative electrode plate, or when the negative electrode plate was slit in the above manner, it was possible to prevent the current collector from becoming locally deformed or warped and prevent the negative electrode mixture layers from separating therefrom.

Example 6

A 12-μm thick aluminum foil was used as a current collector for a positive electrode plate of the invention. A pair of rollers (ceramic rollers) were produced in order to form a large number of protrusions whose tops and cross-sections are substantially equilateral hexagonal, as illustrated in FIG. 9 of Embodiment 6, on the surfaces of this aluminum foil in the aforementioned arrangement pattern. On the surface of each roller, depressions (depth 3 μm) having a shape corresponding to that of the protrusions were formed in the aforementioned arrangement pattern. The pitch P18 was ½ of the pitch P16. The aluminum foil was passed between the pair of rollers while being pressed. In this way, a current collector for a positive electrode plate having 2-μm-high protrusions on both faces and having a total thickness of 14 μm was produced.

Subsequently, a positive electrode mixture paint was prepared by stirring and kneading 100 parts by weight of lithium cobaltate, serving as a positive electrode active material, 2 parts by weight of an acetylene black conductive agent per 100 parts by weight of the active material, 2 parts by weight of a polyvinylidene difluoride binder per 100 parts by weight of the active material, and a suitable amount of N-methyl-2-pyrrolidone with a double-arm kneader. This positive electrode mixture paint was applied onto both faces of the current collector prepared in the above manner, dried, and pressed. The current collector was then slit to a predetermined width and length to produce a long-strip like positive electrode plate. At this time, the slitting was made so that the column direction Y agreed with the longitudinal direction of the positive electrode plate and that the row direction X agreed with the width direction of the positive electrode plate.

In the current collector produced in the above manner, the substantially equilateral hexagonal protrusions are formed in the shape of a honeycomb in a close-packed arrangement pattern. Thus, it exhibits a large resistance to the tensile stress exerted on the longitudinal direction (the column direction Y) of the current collector or positive electrode plate during the production of the current collector and positive electrode plate. Hence, when the positive electrode mixture layers were formed on the current collector to produce the positive electrode plate, or when the positive electrode plate was slit in the above manner, it was possible to prevent the current collector from becoming locally deformed or warped and prevent the positive electrode mixture layers from separating therefrom.

Example 7

To produce a non-aqueous secondary battery of the invention, a positive electrode current collector having 3-μm-high protrusions on both faces in the aforementioned arrangement pattern and having a total thickness of 18 μm was produced in the same manner as in Example 1.

Subsequently, a positive electrode mixture paint was prepared by stirring and kneading 100 parts by weight of lithium cobaltate in which part of the cobalt was replaced with nickel and manganese, serving as a positive electrode active material, 2 parts by weight of an acetylene black conductive agent per 100 parts by weight of the active material, 2 parts by weight of a polyvinylidene difluoride binder per 100 parts by weight of the active material, and a suitable amount of N-methyl-2-pyrrolidone with a double-arm kneader. This positive electrode mixture paint was applied onto both faces of the current collector prepared in the above manner, dried, and pressed. The current collector was then slit to a predetermined width and length to produce a long-strip like positive electrode plate. At this time, the slitting was made so that the column direction Y agreed with the longitudinal direction of the positive electrode plate and that the row direction X agreed with the width direction of the positive electrode plate. In this way, a 57-μm-thick positive electrode mixture layer was formed on each face of the positive electrode current collector, and a positive electrode plate having a total thickness of 126 μm was produced.

Also, in the same manner as in Example 4, a negative electrode current collector having 8-μm-high protrusions on both faces thereof in the aforementioned arrangement pattern and having a total thickness of 26 μm was produced.

Subsequently, using purity 99.9999% silicon (negative electrode active material) as the sputtering target, a deposition process was performed on both faces of the current collector prepared in the above manner by means of a deposition device equipped with an electron beam heating means while purity 99.7% oxygen was being introduced. Herein, the negative electrode active material was deposited in columnar form on the tops of the protrusions so that they aligned continuously in a lateral direction to form a 25-μm-thick thin film of SiO0.5. This was then slit to a predetermined width and length to obtain a long-strip like negative electrode plate. At this time, the slitting was made so that the column direction Y agreed with the longitudinal direction of the negative electrode plate and that the row direction X agreed with the width direction of the negative electrode plate.

Using the positive electrode plate and the negative electrode plate prepared in the above manner, a lithium ion secondary battery illustrated in FIG. 4 was produced. More specifically, the positive electrode plate and the negative electrode plate were spirally wound with a separator interposed therebetween, to form an electrode assembly. This electrode assembly was housed in a cylindrical battery case with a bottom together with an insulator plate. A negative electrode lead attached to the lower part of the electrode assembly was connected to the bottom of the battery case. Subsequently, a positive electrode lead attached to the upper part of the electrode assembly was connected to a seal plate, and a predetermined amount of an electrolyte (not shown) comprising a non-aqueous solvent was injected into the battery case. Thereafter, the seal plate the circumference of which was fitted with a seal gasket was inserted in the opening of the battery case, and the opening of the battery case was bent inward and crimped for sealing. In this way, a lithium ion secondary battery was produced.

In the lithium ion secondary battery, after the production of the spirally wound electrode assembly, the electrode assembly was disassembled and observed. As a result, both the positive electrode plate and the negative electrode plate were found to have no problem such as breakage of the electrode plate or separation of the active material layer. Further, when the charge/discharge of this lithium ion secondary battery was repeated 300 cycles, no cycle deterioration occurred. Also, after the repetition of 300 charge/discharge cycles, the lithium ion secondary battery and the electrode assembly were disassembled. As a result, they were found to have no problem such as deposition of lithium or separation of the active material layer. This is probably because the formation of the thin film comprising the columnar active material on the uncompressed tops of the protrusions enabled a reduction in volume change due to expansion of the active material thin film upon lithium absorption and shrinkage of the active material thin film upon lithium desorption, so that good battery performance could be maintained.

As shown in the foregoing Examples 1 to 6, in the electrode plate for a non-aqueous secondary battery of the invention, protrusions at least the tops of which were not compressed were formed on the surfaces of a current collector in the aforementioned arrangement pattern, so that the arrangement pattern of the protrusions exhibits a large resistance to stress. Therefore, in the step of forming the protrusions on the surfaces of the current collector and the step of disposing the active material on the protrusions of the current collector, it is possible to prevent the current collector from becoming locally deformed or distorted. At the same time, in the step of disposing the active material on the protrusions of the current collector and the subsequent step such as slitting to a predetermined width and length, it is also possible to suppress separation of the active material.

Further, since the tops of the protrusions of the current collector are not compressed, no processing strain due to compression process remains thereon and the surface accuracy of the top of the protrusions is good, and it is thus possible to form an even thin film thereon. Also, since the surface roughness is not reduced by compression process and the original surface roughness is maintained, it is possible to heighten the adhesion between the protrusions and the active material thin film. In this respect, in order to further heighten the adhesion between the surface of the protrusions and the active material, it is very effective to roughen the current collector surface in advance before subjecting it to a process. The arrangement pattern of the protrusions in Examples 1 to 6 is such that the respective protrusions of the row units that are adjacent to one another in the column direction are displaced by ½ of the pitch of the row unit, but the invention is not limited to this, and the amount of displacement of the protrusions can be set freely.

Also, as shown in Example 7, it is preferable to dispose the active material mainly on the uncompressed tops of the protrusions in columnar form. In this case, when the non-aqueous secondary battery is charged and discharged, the volume change due to expansion of the active material upon lithium absorption and shrinkage of the active material upon lithium desorption is reduced. It is thus possible to obtain a high-capacity, high-reliability non-aqueous secondary battery that does not suffer such a problem as breakage of the electrode plate due to charge/discharge and separation of the active material layer.

Embodiment 7

Figure 10:
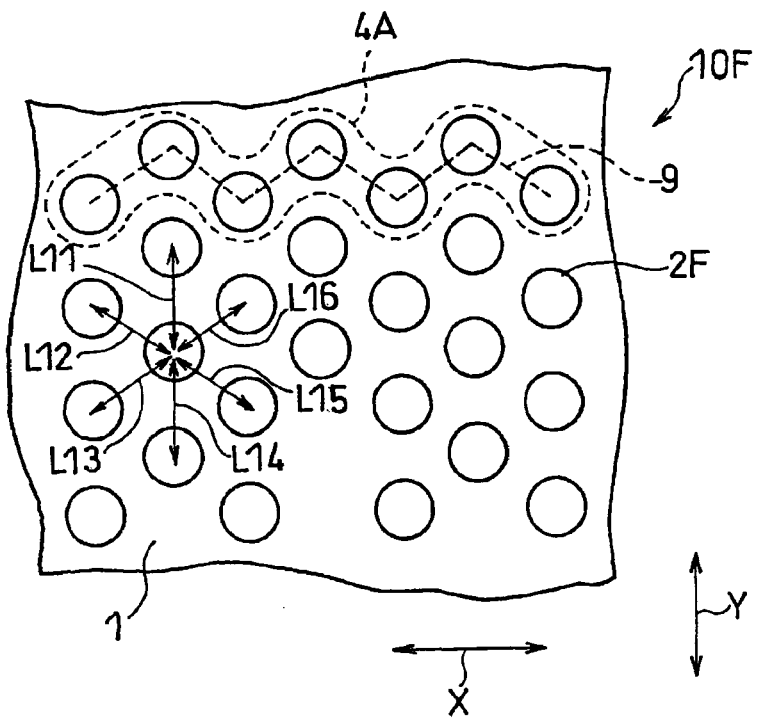
FIG. 10 is a plane view schematically showing the structure of a current collector according to Embodiment 7 of the invention.
Figure 11:
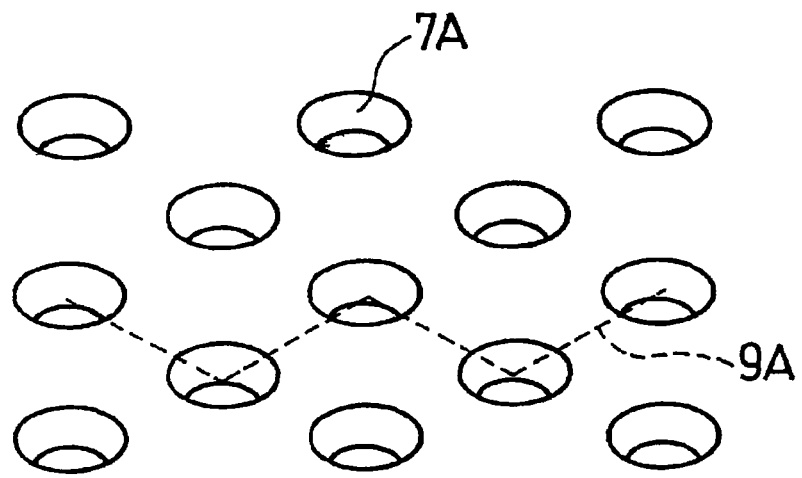
FIG. 11 is an enlarged perspective view of the surface of a roller used to produce the current collector of FIG. 10.

Referring now to FIG. 10 and FIG. 11, Embodiment 7 of the invention is described. FIG. 10 is a plane view schematically showing the structure of a current collector for a non-aqueous secondary battery according to Embodiment 7 of the invention.

In FIG. 10, a current collector 10F is a current collector for use in an electrode plate of a lithium ion secondary battery (hereinafter also referred to as simply a lithium secondary battery), which is an exemplary non-aqueous secondary battery. The current collector 10F is formed of a metal foil 1 at least one surface of which has a large number of columnar protrusions 2F in a predetermined arrangement pattern, and the tops and cross-sections of the columnar protrusions 2F are substantially circular. It should be noted that at least the tops of the protrusions 2F are not compressed.

In the arrangement pattern of FIG. 10, the protrusions 2F are aligned in the row direction X at an equal pitch in a zigzag, as shown by a polygonal broken line 9. A group of these protrusions 2F aligned in the row direction X in a zigzag constitute a row unit 4. The row units 4 are aligned in parallel at an equal pitch in the column direction Y, which is a direction perpendicular to the row direction X. Also, the respective protrusions 2F of such a row unit 4 are at the same positions in the row direction X with those of the protrusions 2F of another row unit 4 that is adjacent in the column direction Y. Also, a given protrusion 2F is disposed so that the intervals L11, L12, L13, L14, L15, and L16 between itself and all the adjacent protrusions 2F are equal.

FIG. 11 is an enlarged perspective view of the surface of a roller used to form protrusions on the current collector.

The roller of FIG. 11 is prepared by coating the surface of a metal roller material with a ceramic such as CrO, WC, or TiN and then forming depressions 7A corresponding to the protrusions 2F in an arrangement pattern corresponding to the aforementioned arrangement pattern by laser machining or the like.

That is, the depressions 7A are aligned in the axial direction of the roller at an equal pitch in a zigzag, as shown by a polygonal broken line 9A, thereby forming a row unit, and such row units are aligned in parallel in the circumferential direction of the roller at an equal pitch.

Also, the respective depressions 7A of the row units that are adjacent to one another in the circumferential direction of the roller are at the same positions in the axial direction of the roller. Also, a given depression 7A is disposed so that the intervals between itself and all the adjacent depressions 7A are equal.

The processing method of forming the protrusions 2F on the surfaces of the current collector 10F by using the rollers of FIG. 11 is the same as that of Embodiment 1 shown in FIG. 3. Also, the protrusions 2F can be formed by using dies, etc. in place of the rollers in the same manner. The method of producing an electrode plate by using the current collector 10F is also the same as that of Embodiment 1. Further, the method of producing a non-aqueous secondary battery by using the electrode plate prepared in the above manner is also the same as that of Embodiment 1 shown in FIG. 4.

Embodiment 8

Figure 12:
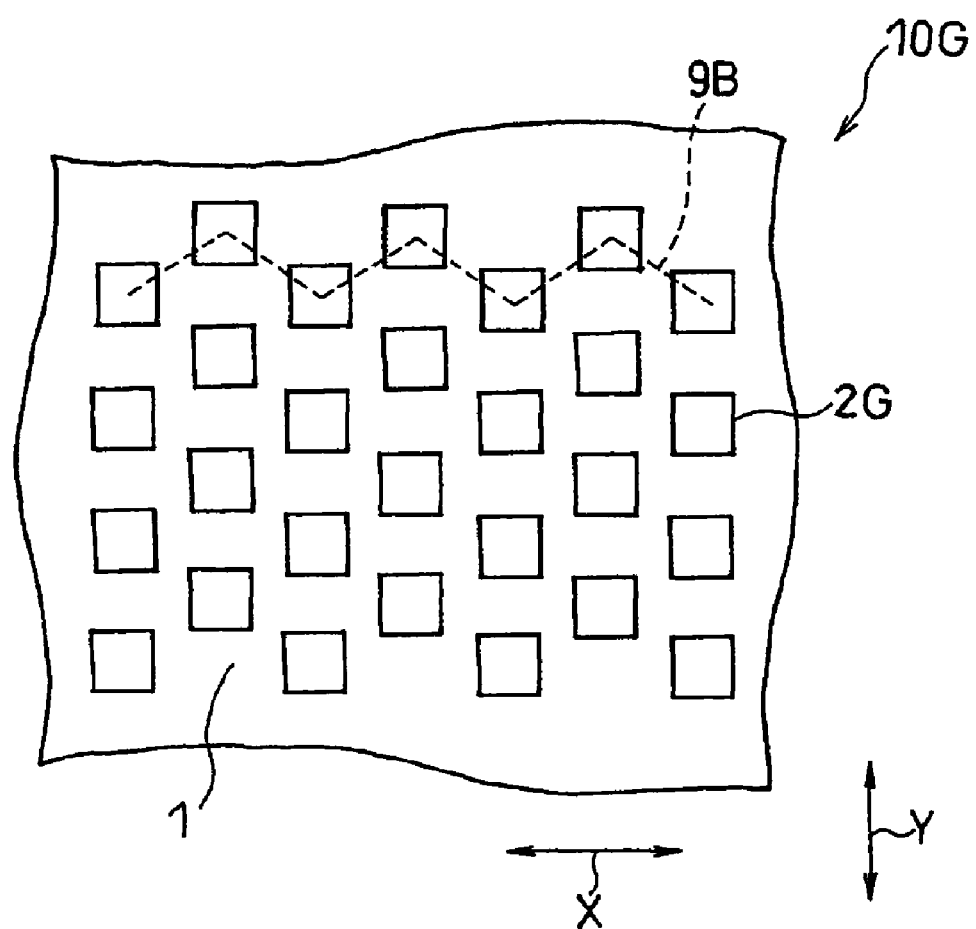
FIG. 12 is a plane view schematically showing the structure of a current collector according to Embodiment 8 of the invention.

Referring now to FIG. 12, Embodiment 8 of the invention is described. FIG. 12 is a plane view schematically showing the structure of a current collector for a non-aqueous secondary battery according to Embodiment 8 of the invention.

As shown in FIG. 12, in a current collector 10G of Embodiment 8, the arrangement pattern of protrusions 2G formed on a metal foil 1 is the same as that of Embodiment 7, but the shape of the protrusions 2G is different from that of Embodiment 7, and their tops and cross-sections are substantially square.

That is, the protrusions 2G are aligned in the row direction X at an equal pitch in a zigzag, as shown by a polygonal line 9B. A group of these protrusions 2G aligned in the row direction X in a zigzag constitute a row unit, and such row units are aligned in parallel at an equal pitch in the column direction Y. Also, the respective protrusions 2G of such a row unit are at the same positions in the row direction X with those of the protrusions 2G of another row unit that is adjacent in the column direction Y, and a given protrusion 2G is disposed so that the intervals between itself and all the adjacent protrusions 2G are equal.

In addition, in the arrangement pattern of this embodiment, the protrusions 2G whose tops and cross-sections are substantially square are disposed so that a straight line perpendicular to a pair of opposite sides of the square agrees with the row direction X.

The processing method of forming the protrusions 2G on the surfaces of the current collector 10G is the same as that of Embodiment 1 shown in FIG. 3. Also, the protrusions 2G can be formed by using dies, etc. in place of the rollers in the same manner. The method of producing an electrode plate by using the current collector 10G is also the same as that of Embodiment 1. Further, the method of producing a non-aqueous secondary battery by using the electrode plate prepared in the above manner is also the same as that of Embodiment 1 shown in FIG. 4.

Embodiment 9

Referring now to FIG. 13, Embodiment 9 of the invention is described. FIG. 13 is a plane view schematically showing the structure of a current collector for a non-aqueous secondary battery according to Embodiment 9 of the invention.

As shown in FIG. 13, in a current collector 10H of Embodiment 9, the arrangement pattern of protrusions 2H formed on a metal foil 1 is the same as that of Embodiment 7 and the shape of the protrusions 2H is substantially square in the same manner as in Embodiment 8, but the orientation of the protrusions 2H is different from that in Embodiment 8.

That is, the protrusions 2H are aligned in the row direction X at an equal pitch in a zigzag, as shown by a polygonal line 9C. A group of these protrusions 2H aligned in the row direction X in a zigzag constitute a row unit, and such row units are aligned in parallel at an equal pitch in the column direction Y. Also, the respective protrusions 2H of such a row unit are at the same positions in the row direction X with those of the protrusions 2H of another row unit that is adjacent in the column direction Y, and a given protrusion 2H is disposed so that the intervals between itself and all the adjacent protrusions 2H are equal.

In addition, in the arrangement pattern of this embodiment, the protrusions 2G whose tops and cross-sections are substantially square are disposed so that the direction of one diagonal line of the square agrees with the row direction X.

The processing method of forming the protrusions 2H on the surfaces of the current collector 10H is the same as that of Embodiment 1 shown in FIG. 3. Also, the protrusions 2H can be formed by using dies, etc. in place of the rollers in the same manner. The method of producing an electrode plate by using the current collector 10H is also the same as that of Embodiment 1. Further, the method of producing a non-aqueous secondary battery by using the electrode plate prepared in the above manner is also the same as that of Embodiment 1 shown in FIG. 4.

Embodiment 10

Figure 14:
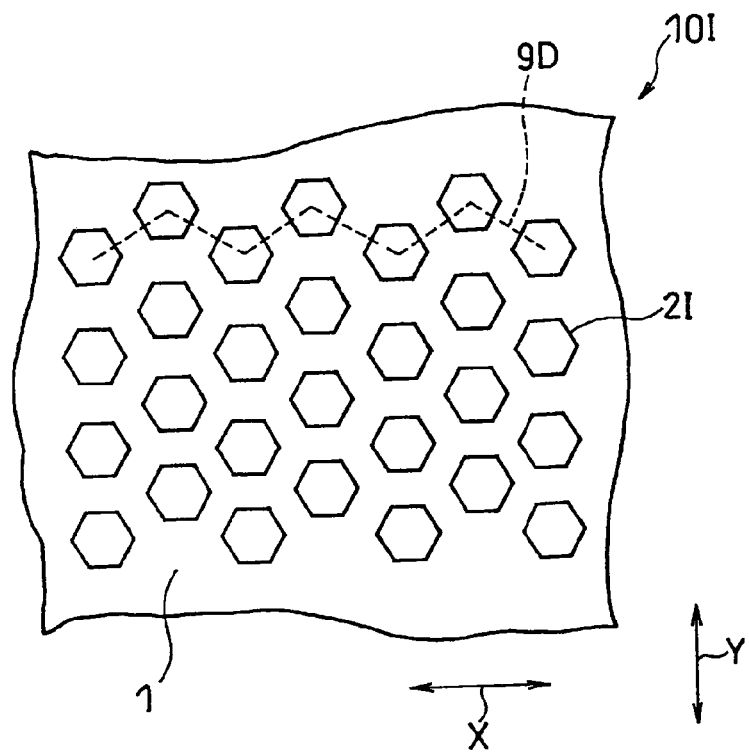
FIG. 14 is a plane view schematically showing the structure of a current collector according to Embodiment 10 of the invention.

Referring now to FIG. 14, Embodiment 10 of the invention is described. FIG. 14 is a plane view schematically showing the structure of a current collector for a non-aqueous secondary battery according to Embodiment 10 of the invention.

As shown in FIG. 14, in a current collector 10I of Embodiment 10, the arrangement pattern of protrusions 2I formed on a metal foil 1 is the same as that of Embodiment 7, but the shape of the protrusions 2I is different from that of Embodiment 7, and their tops and cross-sections are substantially equilateral hexagonal.

That is, the protrusions 2I are aligned in the row direction X at an equal pitch in a zigzag, as shown by a polygonal line 9D. A group of these protrusions 2I aligned in the row direction X in a zigzag constitute a row unit, and such row units are aligned in parallel at an equal pitch in the column direction Y. Also, the respective protrusions 2I of such a row unit are at the same positions in the row direction X with those of the protrusions 2I of another row unit that is adjacent in the column direction Y, and a given protrusion 2I is disposed so that the intervals between itself and all the adjacent protrusions 2I are equal.

In addition, in the arrangement pattern of this embodiment, the protrusions 2I whose tops and cross-sections are substantially equilateral hexagonal are disposed so that the direction of one diagonal line of the equilateral hexagon agrees with the row direction X.

The processing method of forming the protrusions 2I on the surfaces of the current collector 10I is the same as that of Embodiment 1 shown in FIG. 3. Also, the protrusions 2I can be formed by using dies, etc. in place of the rollers in the same manner. The method of producing an electrode plate by using the current collector 10I is also the same as that of Embodiment 1. Further, the method of producing a non-aqueous secondary battery by using the electrode plate prepared in the above manner is also the same as that of Embodiment 1 shown in FIG. 4.

In FIG. 14, the protrusions 2I are substantially equilateral hexagonal, but their shape is not limited to this; the shape of the protrusions can be a substantially equilateral polygon with N angles (N: N is an even number of 6 or more). In this case, also, the protrusions are formed so that one of the longest diagonal lines of the equilateral polygon with N angles agrees with the row direction X and that the intervals between a given protrusion and all the adjacent protrusions are equal.

Embodiment 11

Figure 15:
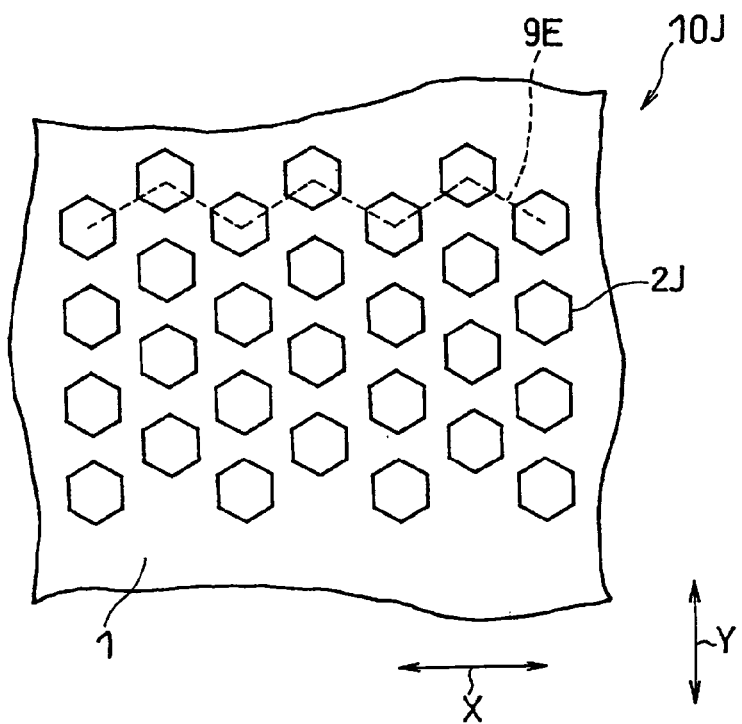
FIG. 15 is a plane view schematically showing the structure of a current collector according to Embodiment 11 of the invention.

Referring now to FIG. 15, Embodiment 11 of the invention is described. FIG. 15 is a plane view schematically showing the structure of a current collector for a non-aqueous secondary battery according to Embodiment 11 of the invention.

As shown in FIG. 15, in a current collector 10J of Embodiment 11, the arrangement pattern of protrusions 2J formed on a metal foil 1 is the same as that of Embodiment 7 and the shape of the protrusions 2J is equilateral hexagonal in the same manner as in Embodiment 10, but the orientation of the protrusions 2J is different from that in Embodiment 10.

That is, the protrusions 2J are aligned in the row direction X at an equal pitch in a zigzag, as shown by a polygonal line 9E. A group of these protrusions 2J aligned in the row direction X in a zigzag constitute a row unit, and such row units are aligned in parallel at an equal pitch in the column direction Y. Also, the respective protrusions 2J of such a row unit are at the same positions in the row direction X with those of the protrusions 2J of another row unit that is adjacent in the column direction Y, and a given protrusion 2J is disposed so that the intervals between itself and all the adjacent protrusions 2J are equal.

In addition, in the arrangement pattern of this embodiment, the protrusions 2J whose tops and cross-sections are substantially equilateral hexagonal are disposed so that a straight line perpendicular to a pair of opposite sides of the equilateral hexagon agrees with the row direction X.

The processing method of forming the protrusions 2J on the surfaces of the current collector 10J is the same as that of Embodiment 1 shown in FIG. 3. Also, the protrusions 2J can be formed by using dies, etc. in place of the rollers in the same manner. The method of producing an electrode plate by using the current collector 10J is also the same as that of Embodiment 1. Further, the method of producing a non-aqueous secondary battery by using the electrode plate prepared in the above manner is also the same as that of Embodiment 1 shown in FIG. 4.

In FIG. 15, the protrusions 2J are substantially equilateral hexagonal, but their shape is not limited to this; the shape of the protrusions can be a substantially equilateral polygon with N angles (N: N is an even number of 6 or more). In this case, also, the protrusions are formed so that the direction of a straight line perpendicular to a pair of opposite sides of the equilateral polygon with N angles agrees with the row direction X and that the intervals between a given protrusion and the adjacent protrusions are equal.

Example 8

A 20-μm thick copper foil was used as a current collector for a negative electrode plate. A pair of rollers (ceramic rollers) were produced in order to form a large number of protrusions whose tops and cross-sections are substantially circular, as illustrated in FIG. 10 of Embodiment 7, on the surfaces of this copper foil in the aforementioned arrangement pattern. On the surface of each roller, depressions (depth 13 μm) having a shape corresponding to that of the protrusions were formed in the aforementioned arrangement pattern. The copper foil was passed between the pair of rollers while being pressed. In this way, a current collector for a negative electrode plate having 9-μm-high protrusions on both faces and having a total thickness of 29 μm was produced.

Subsequently, using purity 99.9999% silicon (negative electrode active material) as the sputtering target, a deposition process was performed on both faces of the current collector prepared in the above manner by means of a deposition device equipped with an electron beam heating means while purity 99.7% oxygen was being introduced, so that a SiO0.5 film with a thickness of 23 μm was formed on each of the protrusions. This was then slit to a predetermined width and length to obtain a long-strip like negative electrode plate. At this time, the slitting was made so that the column direction Y agreed with the longitudinal direction of the negative electrode plate or the current collector and that the row direction X agreed with the width direction of the negative electrode plate.

In the current collector produced in the above manner, the protrusions are aligned in the width direction (row direction X) at an equal pitch in a zigzag to form a row unit, and the intervals between a given protrusion and all the adjacent protrusions are equal. Thus, when the negative electrode active material is deposited toward the longitudinal direction (column direction Y) of the current collector, the negative electrode active material can be efficiently attached onto the protrusions and, in addition, the current collector can exhibit a large resistance to the tensile stress exerted on the longitudinal direction of the current collector. Hence, when the negative electrode mixture layers were deposited on the current collector to produce the negative electrode plate, or when the negative electrode plate was slit in the above manner, it was possible to prevent the current collector from becoming locally deformed or warped and prevent the negative electrode mixture layers from separating therefrom.

Example 9

A 15-μm thick copper foil was used as a current collector for a negative electrode plate. A pair of rollers (ceramic rollers) were produced in order to form a large number of protrusions whose tops and cross-sections are substantially square, as illustrated in FIG. 12 of Embodiment 8, on the surfaces of this copper foil in the aforementioned arrangement pattern. On the surface of each roller, depressions (depth 7 μm) having a shape corresponding to that of the protrusions were formed in the aforementioned arrangement pattern. The copper foil was passed between the pair of rollers while being pressed. In this way, a current collector for a negative electrode plate having 5-μm-high protrusions on both faces and having a total thickness of 20 μm was produced.

Subsequently, using purity 99.9999% silicon (negative electrode active material) as the sputtering target, a deposition process was performed on both faces of the current collector prepared in the above manner by means of a deposition device equipped with an electron beam heating means while purity 99.7% oxygen was being introduced, so that a SiO0.5 film with a thickness of 15 μm was formed on each of the protrusions. This was then slit to a predetermined width and length to obtain a long-strip like negative electrode plate. At this time, the slitting was made so that the column direction Y agreed with the longitudinal direction of the negative electrode plate or the current collector and that the row direction X agreed with the width direction of the negative electrode plate.

In the current collector produced in the above manner, the protrusions are aligned in the width direction (row direction X) at an equal pitch in a zigzag to form a row unit, and the intervals between a given protrusion and all the adjacent protrusions are equal. Thus, when the negative electrode active material is deposited toward the longitudinal direction (column direction Y) of the current collector, the negative electrode active material can be efficiently attached onto the protrusions and, in addition, the current collector can exhibit a large resistance to the tensile stress exerted on the longitudinal direction of the current collector. Hence, when the negative electrode mixture layers were deposited on the current collector to produce the negative electrode plate, or when the negative electrode plate was slit in the above manner, it was possible to prevent the current collector from becoming locally deformed or warped and prevent the negative electrode mixture layers from separating therefrom.

Example 10

A 18-μm thick copper foil was used as a current collector for a negative electrode plate. A pair of rollers (ceramic rollers) were produced in order to form a large number of protrusions whose tops and cross-sections are substantially square, as illustrated in FIG. 13 of Embodiment 9, on the surfaces of this copper foil in the aforementioned arrangement pattern. On the surface of each roller, depressions (depth 10 μm) having a shape corresponding to that of the protrusions were formed in the aforementioned arrangement pattern. The copper foil was passed between the pair of rollers while being pressed. In this way, a current collector for a negative electrode plate having 8-μm-high protrusions on both faces and having a total thickness of 26 μm was produced.

Subsequently, using purity 99.9999% silicon (negative electrode active material) as the sputtering target, a deposition process was performed on both faces of the current collector prepared in the above manner by means of a deposition device equipped with an electron beam heating means while purity 99.7% oxygen was being introduced, so that a SiO0.5 film with a thickness of 20 μm was formed on each of the protrusions. This was then slit to a predetermined width and length to obtain a long-strip like negative electrode plate. At this time, the slitting was made so that the column direction Y agreed with the longitudinal direction of the negative electrode plate or the current collector and that the row direction X agreed with the width direction of the negative electrode plate.

In the current collector produced in the above manner, the substantially square protrusions are formed so that the direction of a diagonal line agrees with the width direction (row direction X) of the current collector. Thus, when the negative electrode active material is deposited toward the longitudinal direction (column direction Y) of the current collector, the active material can be efficiently attached onto the protrusions and, in addition, the current collector can exhibit a large resistance to the tensile stress exerted on the longitudinal direction of the current collector. Hence, when the negative electrode mixture layers were deposited on the current collector to produce the negative electrode plate, or when the negative electrode plate was slit in the above manner, it was possible to prevent the current collector from becoming locally deformed or warped and prevent the negative electrode mixture layers from separating therefrom.

Example 11

A 10-μm thick copper foil was used as a current collector for a negative electrode plate. A pair of rollers (ceramic rollers) were produced in order to form a large number of protrusions whose tops and cross-sections are substantially equilateral hexagonal, as illustrated in FIG. 14 of Embodiment 10, on the surfaces of this copper foil in the aforementioned arrangement pattern. On the surface of each roller, depressions (depth 3 μm) having a shape corresponding to that of the protrusions were formed in the aforementioned arrangement pattern. The copper foil was passed between the pair of rollers while being pressed. In this way, a current collector for a negative electrode plate having 2-μm-high protrusions on both faces and having a total thickness of 12 μm was produced.

Subsequently, a negative electrode mixture paint was prepared by stirring 100 parts by weight of artificial graphite, serving as a negative electrode active material, 2.5 parts by weight (1 part by weight when converted to the solid content of the binder) of a dispersion of styrene-butadiene copolymer rubber particles (solid content 40% by weight), serving as a binder, per 100 parts by weight of the active material, 1 part by weight of carboxymethylcellulose, serving as a thickener, per 100 parts by weight of the active material, and a suitable amount of water with a double-arm kneader. This negative electrode mixture paint was applied onto both faces of the current collector prepared in the above manner, dried, and pressed. The current collector was then slit to a predetermined width and length to produce a long-strip like negative electrode plate. At this time, the slitting was made so that the column direction Y agreed with the longitudinal direction of the negative electrode plate and that the row direction X agreed with the width direction of the negative electrode plate.

In the current collector produced in the above manner, the substantially equilateral hexagonal protrusions are formed so that the direction of one of the longest diagonal lines agrees with the width direction (row direction X) of the current collector. Thus, the current collector can exhibit a large resistance to the tensile stress exerted on the longitudinal direction of the current collector during the production of the current collector and the negative electrode plate. Hence, when the negative electrode mixture layers were deposited on the current collector to produce the negative electrode plate, or when the negative electrode plate was slit in the above manner, it was possible to prevent the current collector from becoming locally deformed or warped and prevent the negative electrode mixture layers from separating therefrom.

Example 12

A 12-μm thick aluminum foil was used as a current collector for a positive electrode plate. A pair of rollers (ceramic rollers) were produced in order to form a large number of protrusions whose tops and cross-sections are substantially equilateral hexagonal, as illustrated in FIG. 15 of Embodiment 11, on the surfaces of this aluminum foil in the aforementioned arrangement pattern. On the surface of each roller, depressions (depth 3 μm) having a shape corresponding to that of the protrusions were formed in the aforementioned arrangement pattern. The aluminum foil was passed between the pair of rollers while being pressed. In this way, a current collector for a positive electrode plate having 2-μm-high protrusions on both faces and having a total thickness of 14 μm was produced.

Subsequently, a positive electrode mixture paint was prepared by stirring and kneading 100 parts by weight of lithium cobaltate, serving as a positive electrode active material, 2 parts by weight of an acetylene black conductive agent per 100 parts by weight of the active material, 2 parts by weight of a polyvinylidene difluoride binder per 100 parts by weight of the active material, and a suitable amount of N-methyl-2-pyrrolidone with a double-arm kneader. This positive electrode mixture paint was applied onto both faces of the current collector prepared in the above manner, dried, and pressed. The current collector was then slit to a predetermined width and length to produce a long-strip like positive electrode plate. At this time, the slitting was made so that the column direction Y agreed with the longitudinal direction of the positive electrode plate and that the row direction X agreed with the width direction of the positive electrode plate.

In the current collector produced in the above manner, the direction of a straight line perpendicular to a pair of opposite sides of the substantially equilateral hexagon agrees with the width direction (row direction X) of the current collector. Thus, the current collector can exhibit a large resistance to the tensile stress exerted on the longitudinal direction of the current collector during the production of the current collector and positive electrode plate. Hence, when the positive electrode mixture layers were formed on the current collector to produce the positive electrode plate, or when the positive electrode plate was slit in the above manner, it was possible to prevent the current collector from becoming locally deformed or warped and prevent the positive electrode mixture layers from separating therefrom.

Example 13

To produce a non-aqueous secondary battery of the invention, a positive electrode current collector having 3-μm-high protrusions on both faces in the aforementioned arrangement pattern and having a total thickness of 18 μm was produced in the same manner as in Example 1.

Subsequently, a positive electrode mixture paint was prepared by stirring and kneading 100 parts by weight of lithium cobaltate in which part of the cobalt was replaced with nickel and manganese, serving as a positive electrode active material, 2 parts by weight of an acetylene black conductive agent per 100 parts by weight of the active material, 2 parts by weight of a polyvinylidene difluoride binder per 100 parts by weight of the active material, and a suitable amount of N-methyl-2-pyrrolidone with a double-arm kneader. This positive electrode mixture paint was applied onto both faces of the current collector prepared in the above manner, dried, and pressed. The current collector was then slit to a predetermined width and length to produce a long-strip like positive electrode plate. At this time, the slitting was made so that the column direction Y agreed with the longitudinal direction of the positive electrode plate and that the row direction X agreed with the width direction of the positive electrode plate. In this way, a 57-µm-thick positive electrode mixture layer was formed on each face of the positive electrode current collector, and a positive electrode plate having a total thickness of 126 µm was produced.

Also, in the same manner as in Example 4, a negative electrode current collector having 8-µm-high protrusions on both faces thereof in the aforementioned arrangement pattern and having a total thickness of 26 µm was produced.

Subsequently, using purity 99.9999% silicon (negative electrode active material) as the sputtering target, a deposition process was performed on both faces of the current collector prepared in the above manner by means of a deposition device equipped with an electron beam heating means while purity 99.7% oxygen was being introduced. Herein, the active material was deposited in columnar form on the tops of the protrusions so that they aligned continuously in a lateral direction to form a 25-µm-thick thin film of SiO0.5. This was then slit to a predetermined width and length to obtain a long-strip like negative electrode plate. At this time, the slitting was made so that the column direction Y agreed with the longitudinal direction of the negative electrode plate and that the row direction X agreed with the width direction of the negative electrode plate.

Using the positive electrode plate and the negative electrode plate prepared in the above manner, a lithium ion secondary battery illustrated in FIG. 4 was produced. More specifically, the positive electrode plate and the negative electrode plate were spirally wound with a separator interposed therebetween, to form an electrode assembly. This electrode assembly was housed in a cylindrical battery case with a bottom together with an insulator plate. A negative electrode lead attached to the lower part of the electrode assembly was connected to the bottom of the battery case. Subsequently, a positive electrode lead attached to the upper part of the electrode assembly was connected to a seal plate, and a predetermined amount of an electrolyte (not shown) comprising a non-aqueous solvent was injected into the battery case. Thereafter, the seal plate the circumference of which was fitted with a seal gasket was inserted in the opening of the battery case, and the opening of the battery case was bent inward and crimped for sealing. In this way, a lithium ion secondary battery was produced.

In the lithium ion secondary battery, after the production of the spirally wound electrode assembly, the electrode assembly was disassembled and observed. As a result, both the positive electrode plate and the negative electrode plate were found to have no problem such as breakage of the electrode plate or separation of the active material layer. Further, when the charge/discharge of this lithium ion secondary battery was repeated 300 cycles, no cycle deterioration occurred. Also, after the repetition of 300 charge/discharge cycles, the lithium ion secondary battery and the electrode assembly were disassembled. As a result, they were found to have no problem such as deposition of lithium or separation of the active material layer. This is probably because the formation of the thin film comprising the columnar active material on the uncompressed tops of the protrusions enabled a reduction in volume change due to expansion of the active material thin film upon lithium absorption and shrinkage of the active material thin film upon lithium desorption, so that good battery performance could be maintained.

As shown in the foregoing Examples 8 to 12, in the electrode plate for a non-aqueous secondary battery of the invention, protrusions at least the tops of which were not compressed were formed on the surfaces of a current collector in the aforementioned arrangement pattern, so that the arrangement pattern of the protrusions exhibits a large resistance to stress. Therefore, in the step of forming the protrusions on the surfaces of the current collector and the step of disposing the active material on the protrusions of the current collector, it is possible to prevent the current collector from becoming locally deformed or distorted. At the same time, in the step of disposing the active material on the protrusions of the current collector and the subsequent step such as slitting to a predetermined width and length, it is also possible to suppress separation of the active material.

Further, since the tops of the protrusions of the current collector are not compressed, no processing strain due to compression process remains thereon and the surface accuracy of the protrusions is good, and it is thus possible to form an even thin film thereon. Also, since the surface roughness is not reduced by compression process and the original surface roughness is maintained, it is possible to heighten the adhesion between the protrusions and the active material thin film. In this respect, in order to further heighten the adhesion between the surface of the protrusions and the active material, it is very effective to roughen the current collector surface in advance before subjecting it to a process.

Also, as shown in Example 13, it is preferable to dispose the active material mainly on the uncompressed tops of the protrusions in columnar form. In this case, when the non-aqueous secondary battery is charged and discharged, the volume change due to expansion of the active material upon lithium absorption and shrinkage of the active material upon lithium desorption is reduced. It is thus possible to obtain a high-capacity, high-reliability non-aqueous secondary battery that does not suffer such a problem as breakage of the electrode plate due to charge/discharge and separation of the active material layer.

Embodiment 12

Referring now to FIG. 16 and FIG. 17, Embodiment 12 of the invention is described. In FIG. 16, (a) is a plane view schematically showing the structure of a current collector for a non-aqueous secondary battery according to Embodiment 12 of the invention and (b) is a Z-Z cross-sectional view thereof.

In FIG. 16, a current collector 10K is a current collector for use in an electrode plate of a lithium ion secondary battery (hereinafter also referred to as simply a lithium secondary battery), which is an exemplary non-aqueous secondary battery. The current collector 10K is formed of a metal foil 1 at least one surface of which has a large number of columnar protrusions 2K in a predetermined arrangement pattern, and the tops and cross-sections of the columnar protrusions 2K are substantially circular. It should be noted that at least the tops of the protrusions 2K are not compressed. Also, the protrusions 2K do not need to be substantially circular, and their shape may be, for example, substantially oval, substantially rectangular, substantially rhombic, substantially square, and substantially equilateral polygonal with N angles (N: N is an even number of 6 or more).

In the arrangement pattern of FIG. 16, the protrusions 2K are aligned linearly at an equal pitch P19 in the row direction X, and a group of these protrusions 2K aligned in the row direction X constitute a row unit. Such row units are aligned in parallel in the column direction Y, which is a direction perpendicular to the row direction X, at predetermined pitches P20, P21, P22, P23, P24, . . . . Also, the respective protrusions 2K of such a row unit are displaced in the row direction X from the protrusions 2K of another row unit that is adjacent in the column direction Y, and the amount of displacement is a pitch that is ½ of the pitch P19. The amount of the pitch displaced is not limited to ½ of the pitch P19 and can be increased or decreased if necessary.

Also, as illustrated in FIG. 16(b), the protrusions 2K formed on one face of the current collector 10K are in phase with those on the other face in the row direction X.

It should be noted that the pitches P20, P21, . . . at which the row units are aligned in the column direction Y are set, for example, so as to satisfy the following inequality 1. That is, in the arrangement pattern of the protrusions 2K of the current collector 10K, the pitches in the column direction Y are changed, and the column direction Y corresponds to the longitudinal direction of the long-strip like positive electrode plate 31 and negative electrode plate 32 that are spirally wound to form the electrode assembly 34 as illustrated in FIG. 4. The positive electrode plate 31, the negative electrode plate 32, and the electrode assembly 34 are produced so that the largest pitch P20 is positioned at the innermost part of the electrode assembly 34 and that the pitch gradually decreases and becomes smallest at the outermost part of the electrode assembly 34.

$$P20 > P21 > P22 > P23 > P24 > \quad (1)$$

FIG. 17 is an enlarged perspective view of the surface of a roller used to form the protrusions 2K on the current collector 10K.

The roller of FIG. 17 is prepared by coating the surface of a metal roller material with a ceramic such as CrO, WC, or TiN and then forming depressions 7B corresponding to the protrusions 2K in an arrangement pattern corresponding to the aforementioned arrangement pattern by laser machining or the like.

That is, the depressions 7B are aligned linearly in the axial direction of the roller at a pitch P19', which is equal to the pitch P19, thereby forming a row unit, and such row units are aligned in parallel in the circumferential direction of the roller at pitches P20', P21', . . . , which are equal to the predetermined pitches P20, P21, . . . .

Also, the respective depressions 7B of the row units that are adjacent in the circumferential direction of the roller are displaced from one another in the axial direction of the roller, and the amount of displacement is a pitch that is ½ of the pitch P19'. The amount of the pitch displaced is not limited to ½ of the pitch P19' and can be increased or decreased if necessary.

The processing method of forming the protrusions 2K on the surfaces of the current collector 10K by using the rollers of FIG. 17 is the same as that of Embodiment 1 shown in FIG. 3. Also, the protrusions 2K can be formed by using dies, etc. in place of the rollers in the same manner. The method of producing an electrode plate by using the current collector 10K is also the same as that of Embodiment 1. Further, the method of producing a non-aqueous secondary battery by using the electrode plate prepared in the above manner is also the same as that of Embodiment 1 shown in FIG. 4.

Embodiment 13

Referring now to FIG. 18, Embodiment 13 of the invention is described. FIG. 18 has a plane view (a) schematically showing the structure of a current collector for a non-aqueous secondary battery according to Embodiment 13 of the invention and a Z1-Z1 cross-sectional view thereof.

As illustrated in FIG. 18, in a current collector 10L of Embodiment 13, protrusions 2L are formed on both faces in the same arrangement pattern as that of Embodiment 12, but Embodiment 13 is different from Embodiment 12 in that the protrusions 2L formed on one face of the current collector 10L are out of phase with those on the other face.

That is, in the current collector 10L of FIG. 18, the substantially circular protrusions 2L are aligned linearly in the row direction X at an equal pitch P25, thereby forming a row unit, and such row units are aligned in parallel in the column direction Y at predetermined pitches P26, P27, . . . , which decrease gradually. Also, the respective protrusions 2L of such row units that are adjacent in the column direction Y are displaced from one another in the row direction X, and the amount of displacement is a pitch that is ½ of the pitch P25. The protrusions 2L do not need to be substantially circular, and their shape may be, for example, substantially oval, substantially rectangular, substantially rhombic, substantially square, and substantially equilateral polygonal with N angles (N: N is an even number of 6 or more). Also, the amount of the pitch of the protrusions 2L displaced in the row direction X is not limited to ½ of the pitch P25 and can be increased or decreased if necessary.

In the current collector 10L, the protrusions 2L formed on one face are out of phase with those on the other face in the row direction X by 180°. The phase difference does not need to be 180° and can be increased or decreased if necessary.

The processing method of forming the protrusions 2L on the surfaces of the current collector 10L is the same as that of Embodiment 1 shown in FIG. 3. Also, the protrusions 2L can be formed by using dies, etc. in place of the rollers in the same manner. The method of producing an electrode plate by using the current collector 10L is also the same as that of Embodiment 1. Further, the method of producing a non-aqueous secondary battery by using the electrode plate prepared in the above manner is also the same as that of Embodiment 1 shown in FIG. 4.

Embodiment 14

Referring now to FIG. 19, Embodiment 14 of the invention is described. FIG. 19 has a plane view (a) schematically showing the structure of a current collector for a non-aqueous secondary battery according to Embodiment 14 of the invention and a Z2-Z2 cross-sectional view thereof.

As illustrated in FIG. 19, in a current collector 10M of Embodiment 14, protrusions 2M are formed on both faces in the same arrangement pattern as that of Embodiment 12, but Embodiment 14 is different from Embodiment 12 in that the pitch of the protrusions 2M on one face of the current collector 10M is different from that on the other face.

That is, on each face of the current collector 10M of FIG. 19, the substantially circular protrusions 2M are aligned linearly in the row direction X at an equal pitch P61, thereby forming a row unit, and such row units are aligned in parallel in the column direction Y at predetermined pitches P62, P63, . . . , which decrease gradually. Also, the respective protrusions 2M of such row units that are adjacent in the column direction Y are displaced from one another in the row direction X, and the amount of displacement is a pitch that is ½ of the pitch P61. The protrusions 2M do not need to be substantially circular, and their shape may be, for example, substantially oval, substantially rectangular, substantially rhombic, substantially square, and substantially equilateral polygonal with N angles (N: N is an even number of 6 or more). Also, the amount of the pitch of the protrusions 2M displaced in the row direction X is not limited to ½ of the pitch P61 and can be increased or decreased if necessary.

In the current collector 10M, pitches P32, P33, P34, P35, and P36 of the row units on one face (the face on the upper side in the figure) in the column direction Y are different from pitches P37, P38, P39, P40, and P41 of the row units on the other face (the face on the lower side in the figure) in the column direction Y. That is, as shown in the following inequalities 2, the pitches on "the other face" are greater than those on "one face". It should be noted that "one face" corresponds to the face positioned on the outer side of the electrode assembly 34 of FIG. 4, while "the other face" corresponds to the face positioned on the inner side of the electrode assembly 34. This can reduce the influence of the difference in curvature between the faces on the outer and inner sides of the electrode assembly 34.

$$P41>P36, P40>P35, P39>P34, P38>P33, P37>P32 \qquad (2)$$

The processing method of forming the protrusions 2M on the surfaces of the current collector 10M is the same as that of Embodiment 1 shown in FIG. 3. Also, the protrusions 2M can be formed by using dies, etc. in place of the rollers in the same manner. The method of producing an electrode plate by using the current collector 10M is also the same as that of Embodiment 1. Further, the method of producing a non-aqueous secondary battery by using the electrode plate prepared in the above manner is also the same as that of Embodiment 1 shown in FIG. 4.

Embodiment 15

Referring now to FIG. 20, Embodiment 15 of the invention is described. FIG. 20 has a plane view (a) schematically showing the structure of a current collector for a non-aqueous secondary battery according to Embodiment 15 of the invention and a Z3-Z3 cross-sectional view thereof.

As illustrated in FIG. 20, in a current collector 10N of Embodiment 15, protrusions 2N are formed on both faces in the same arrangement pattern as that of Embodiment 14, but Embodiment 15 is different from Embodiment 14 in the shape of the protrusions.

That is, on each face of the current collector 10N of FIG. 20, the substantially rhombic protrusions 2N are aligned linearly in the row direction X at an equal pitch P42, thereby forming a row unit, and such row units are aligned in parallel in the column direction Y at predetermined pitches P43, P44, . . . , which decrease gradually. Also, the respective protrusions 2N of such row units that are adjacent in the column direction Y are displaced from one another in the row direction X, and the amount of displacement is a pitch that is ½ of the pitch P42. The amount of the pitch of the protrusions 2N displaced in the row direction X is not limited to ½ of the pitch P42 and can be increased or decreased if necessary.

In the current collector 10N, pitches P48, P49, P50, P51, and P52 of the row units on one face (the face on the upper side in the figure) in the column direction Y are different from pitches P53, P54, P55, P56, and P57 of the row units on the other face (the face on the lower side in the figure) in the column direction Y. That is, as shown in the following inequalities 3, the pitches on "the other face" are greater than those on "one face". It should be noted that "one face" corresponds to the face positioned on the outer side of the electrode assembly 34 of FIG. 4, while "the other face" corresponds to the face positioned on the inner side of the electrode assembly 34. This can reduce the influence of the difference in curvature between the faces on the outer and inner sides of the electrode assembly 34.

$$P57>P52, P56>P51, P55>P50, P54>P49, P53>P48 \qquad (3)$$

The processing method of forming the protrusions 2N on the surfaces of the current collector 10N is the same as that of Embodiment 1 shown in FIG. 3. Also, the protrusions 2N can be formed by using dies, etc. in place of the rollers in the same manner. The method of producing an electrode plate by using the current collector 10N is also the same as that of Embodiment 1. Further, the method of producing a non-aqueous secondary battery by using the electrode plate prepared in the above manner is also the same as that of Embodiment 1 shown in FIG. 4.

Example 14

A 15-μm thick aluminum foil was used as a current collector for a positive electrode plate. A pair of rollers (ceramic rollers) were produced in order to form a large number of protrusions whose tops and cross-sections are substantially circular, as illustrated in FIG. 16 of Embodiment 12, on the surfaces of this aluminum foil in the aforementioned arrangement pattern. On the surface of each roller, depressions (depth 4 μm) having a shape corresponding to that of the protrusions were formed in the aforementioned arrangement pattern. The aluminum foil was passed between the pair of rollers while being pressed. In this way, a current collector for a positive electrode plate having 3-μm-high protrusions on both faces and having a total thickness of 18 μm was produced.

Subsequently, a positive electrode mixture paint was prepared by stirring and kneading 100 parts by weight of lithium cobaltate, serving as a positive electrode active material, 2 parts by weight of an acetylene black conductive agent per 100 parts by weight of the active material, 2 parts by weight of a polyvinylidene difluoride binder per 100 parts by weight of the active material, and a suitable amount of N-methyl-2-pyrrolidone with a double-arm kneader. This positive electrode mixture paint was applied onto both faces of the current collector prepared in the above manner, dried, and pressed. The current collector was then slit to a predetermined width and length to produce a long-strip like positive electrode plate. At this time, the slitting was made so that the column direction Y agreed with the longitudinal direction of the positive electrode plate and that the row direction X agreed with the width direction of the positive electrode plate.

In the current collector produced in the above manner, the substantially circular protrusions are formed in a close-packed arrangement pattern. Thus, it exhibits a large resistance to the tensile stress exerted on the longitudinal direction (the column direction Y) of the current collector or positive electrode plate during the production of the current collector and positive electrode plate. Hence, when the positive electrode mixture layers were formed on the current collector to produce the positive electrode plate, or when the positive electrode plate was slit in the above manner, it was possible to prevent the current collector from becoming locally deformed or warped and prevent the positive electrode mixture layers from separating therefrom.

Example 15

A 10-μm thick copper foil was used as a current collector for a negative electrode plate. A pair of rollers (ceramic rollers) were produced in order to form a large number of protrusions whose tops and cross-sections are substantially circular, as illustrated in FIG. 18 of Embodiment 13, on the surfaces of this copper foil in the aforementioned arrangement pattern. On the surface of each roller, depressions (depth 3 μm) having a shape corresponding to that of the protrusions were formed in the aforementioned arrangement pattern. The copper foil was passed between the pair of rollers while being pressed. In this way, a current collector for a negative electrode plate having 2-μm-high protrusions on both faces and having a total thickness of 12 μm was produced.

Subsequently, a negative electrode mixture paint was prepared by stirring 100 parts by weight of artificial graphite, serving as a negative electrode active material, 2.5 parts by weight (1 part by weight when converted to the solid content of the binder) of a dispersion of styrene-butadiene copolymer rubber particles (solid content 40% by weight), serving as a binder, per 100 parts by weight of the active material, 1 part by weight of carboxymethylcellulose, serving as a thickener, per 100 parts by weight of the active material, and a suitable amount of water with a double-arm kneader. This negative electrode mixture paint was applied onto both faces of the current collector prepared in the above manner, dried, and pressed. The current collector was then slit to a predetermined width and length to produce a long-strip like negative electrode plate. At this time, the slitting was made so that the column direction Y agreed with the longitudinal direction of the negative electrode plate and that the row direction X agreed with the width direction of the negative electrode plate.

In the current collector produced in the above manner, the substantially circular protrusions are formed in a close-packed arrangement pattern. Thus, the current collector exhibits a large resistance to the tensile stress exerted on the longitudinal direction (the column direction Y) of the current collector or negative electrode plate during the production of the current collector and the negative electrode plate. Hence, when the negative electrode mixture layers were formed on the current collector to produce the negative electrode plate, or when the negative electrode plate was slit in the above manner, it was possible to prevent the current collector from becoming locally deformed or warped and prevent the negative electrode mixture layers from separating therefrom.

Example 16

A 15-μm thick copper foil was used as a current collector for a negative electrode plate. A pair of rollers (ceramic rollers) were produced in order to form a large number of protrusions whose tops and cross-sections are substantially circular, as illustrated in FIG. 19 of Embodiment 14, on the surfaces of this copper foil in the aforementioned arrangement pattern. On the surface of each roller, depressions (depth 8 μm) having a shape corresponding to that of the protrusions were formed in the aforementioned arrangement pattern. The copper foil was passed between the pair of rollers while being pressed. In this way, a current collector for a negative electrode plate having 6-μm-high protrusions on both faces and having a total thickness of 21 μm was produced.

Subsequently, using purity 99.9999% silicon (negative electrode active material) as the sputtering target, a deposition process was performed on both faces of the current collector prepared in the above manner by means of a deposition device equipped with an electron beam heating means while purity 99.7% oxygen was being introduced, so that a SiO0.5 film with a thickness of 18 μm was formed on each of the protrusions. This was then slit to a predetermined width and length to obtain a long-strip like negative electrode plate. At this time, the slitting was made so that the column direction Y agreed with the longitudinal direction of the negative electrode plate or the current collector and that the row direction X agreed with the width direction of the negative electrode plate.

In the current collector produced in the above manner, the substantially circular protrusions are formed in a close-packed arrangement pattern. Thus, when the negative electrode active material is deposited toward the longitudinal direction (column direction Y) of the current collector, the active material can be efficiently attached onto the protrusions and, in addition, the current collector can exhibit a large resistance to the tensile stress exerted on the longitudinal direction of the current collector. Hence, when the negative electrode mixture layers were deposited on the current collector to produce the negative electrode plate, or when the negative electrode plate was slit in the above manner, it was possible to prevent the current collector from becoming locally deformed or warped and prevent the negative electrode mixture layers from separating therefrom.

Example 17

To produce a non-aqueous secondary battery of the invention, a positive electrode current collector having 3-μm-high protrusions on both faces in the aforementioned arrangement pattern and having a total thickness of 18 μm was produced in the same manner as in Example 14 as shown in FIG. 16.

Subsequently, a positive electrode mixture paint was prepared by stirring and kneading 100 parts by weight of lithium cobaltate, serving as a positive electrode active material, 2 parts by weight of an acetylene black conductive agent per 100 parts by weight of the active material, 2 parts by weight of a polyvinylidene difluoride binder per 100 parts by weight of the active material, and a suitable amount of N-methyl-2-pyrrolidone with a double-arm kneader. This positive electrode mixture paint was applied onto both faces of the current collector prepared in the above manner, dried, and pressed. The current collector was then slit to a predetermined width and length to produce a long-strip like positive electrode plate. At this time, the slitting was made so that the column direction Y agreed with the longitudinal direction of the positive electrode plate and that the row direction X agreed with the width direction of the positive electrode plate.

Also, in the same manner as in Example 16 shown in FIG. 19, a negative electrode current collector having 6-μm-high protrusions on both faces thereof in the aforementioned arrangement pattern and having a total thickness of 21 μm was produced.

Subsequently, using purity 99.9999% silicon (negative electrode active material) as the sputtering target, a deposition process was performed on both faces of the current collector prepared in the above manner by means of a deposition device equipped with an electron beam heating means while purity 99.7% oxygen was being introduced. Herein, the negative electrode active material was deposited in columnar form on the tops of the protrusions so that they aligned continuously in a lateral direction to form a 25-μm-thick thin film of SiO0.5. This was then slit to a predetermined width and length to obtain a long-strip like negative electrode plate. At this time, the slitting was made so that the column direction Y agreed with the longitudinal direction of the negative electrode plate and that the row direction X agreed with the width direction of the negative electrode plate.

Figure 28:
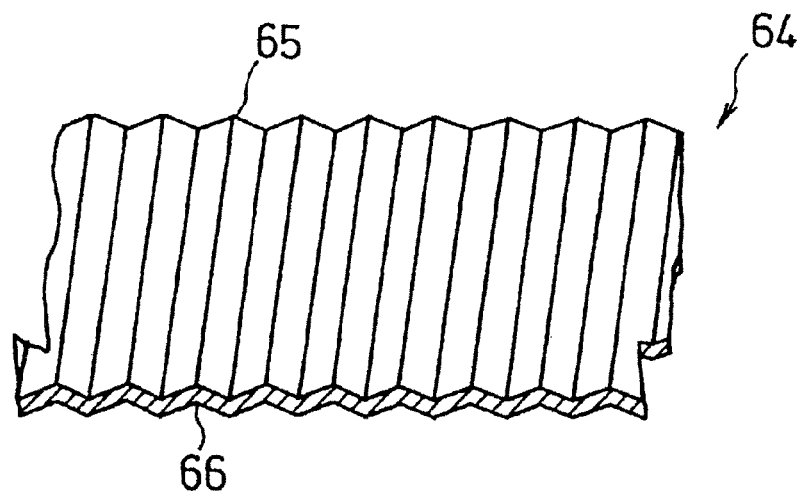
FIG. 28 is a perspective view schematically showing the structure of a conventional current collector according to Patent Document 4.
Figure 29:
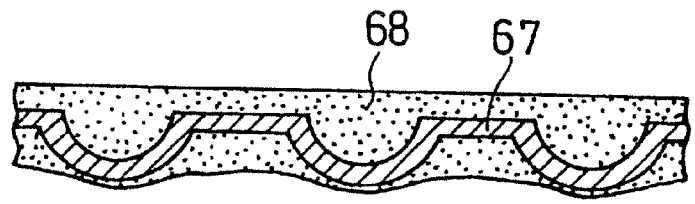
FIG. 29 is a sectional view schematically showing the structure of a conventional current collector according to Patent Document 5.
Figure 30:
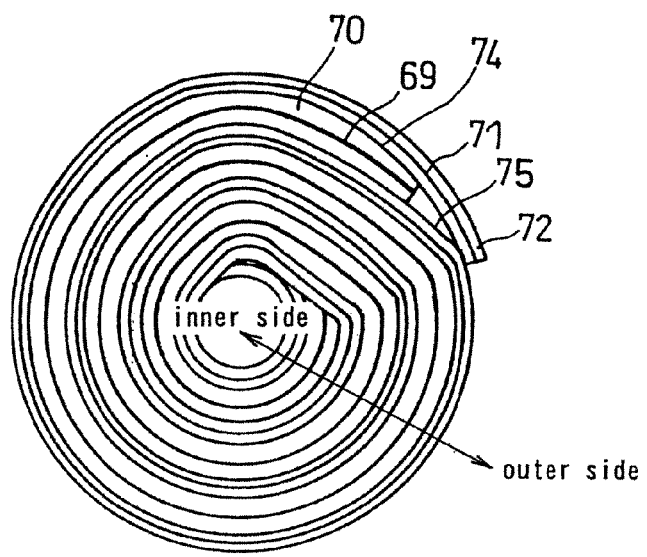
FIG. 30 is a transverse sectional view of an electrode assembly for describing a problem with conventional current collectors.
Figure 31:
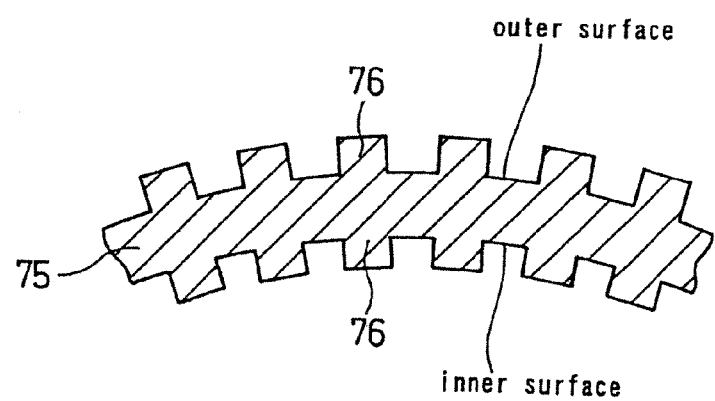
FIG. 31 is a sectional view of a current collector for describing another problem with conventional current collectors.

Using the positive electrode plate and the negative electrode plate prepared in the above manner, an electrode assembly 34 illustrated in FIG. 4 was produced (also see FIG. 28).

More specifically, the positive electrode plate and the negative electrode plate were spirally wound with a separator interposed therebetween, to form a cylindrical electrode assembly. At this time, the two electrode plates were wound so that the side of each current collector with a larger pitch (upper side in the figure) in the longitudinal direction (column direction Y) was positioned on the inner side of the electrode assembly and that the side with a smaller pitch (lower side in the figure) was positioned on the outer side of the electrode assembly.

The electrode assembly prepared in the above manner was found to have no displacement in the wound electrode assembly or no separation of the positive electrode active material and the negative electrode active material in the process of winding the electrode assembly. Also, after the preparation of the electrode assembly, this electrode assembly was disassembled and the positive electrode plate and the negative electrode plate were observed. As a result, they were found to have no problem such as separation of the positive electrode mixture layer and negative electrode mixture layer.

Further, as illustrated in FIG. 4, this electrode assembly was housed in a cylindrical battery case with a bottom together with an insulator plate. A negative electrode lead attached to the lower part of the electrode assembly was connected to the bottom of the battery case. Subsequently, a positive electrode lead attached to the upper part of the electrode assembly was connected to a seal plate, and a predetermined amount of an electrolyte (not shown) comprising a non-aqueous solvent was injected into the battery case. Thereafter, the seal plate the circumference of which was fitted with a seal gasket was inserted in the opening of the battery case 80, and the opening of the battery case was bent inward and crimped for sealing. In this way, a lithium secondary battery was produced as a non-aqueous secondary battery.

After the charge/discharge of this lithium secondary battery was repeated 500 cycles, the electrode assembly was taken out and disassembled. As a result, it was found to have no problem such as deposition of lithium and separation of the positive electrode mixture layer and negative electrode mixture layer.

Example 18

A 18-μm thick copper foil was used as a current collector for a negative electrode plate. A pair of rollers (ceramic rollers) were produced in order to form a large number of protrusions whose tops and cross-sections are substantially rhombic, as illustrated in FIG. 20 of Embodiment 15, on the surfaces of this copper foil in the aforementioned arrangement pattern. On the surface of each roller, depressions (depth 10 μm) having a shape corresponding to that of the protrusions were formed in the aforementioned arrangement pattern. The copper foil was passed between the pair of rollers while being pressed. In this way, a current collector for a negative electrode plate having 8-μm-high protrusions on both faces and having a total thickness of 26 μm was produced.

Subsequently, using purity 99.9999% silicon (negative electrode active material) as the sputtering target, a deposition process was performed on both faces of the current collector prepared in the above manner by means of a deposition device equipped with an electron beam heating means while purity 99.7% oxygen was being introduced, so that a SiO0.5 film with a thickness of 25 μm was formed on each of the protrusions. This was then slit to a predetermined width and length to obtain a long-strip like negative electrode plate. At this time, the slitting was made so that the column direction Y agreed with the longitudinal direction of the negative electrode plate or the current collector and that the row direction X agreed with the width direction of the negative electrode plate.

In the current collector produced in the above manner, the substantially circular protrusions are formed in a close-packed arrangement pattern. Thus, when the negative electrode active material is deposited toward the longitudinal direction (column direction Y) of the current collector, the active material can be efficiently attached onto the protrusions and, in addition, the current collector can exhibit a large resistance to the tensile stress exerted on the longitudinal direction of the current collector. Hence, when the negative electrode mixture layers were deposited on the current collector to produce the negative electrode plate, or when the negative electrode plate was slit in the above manner, it was possible to prevent the current collector from becoming locally deformed or warped and prevent the negative electrode mixture layers from separating therefrom.

Example 19

To produce a non-aqueous secondary battery of the invention, a positive electrode current collector having 3-μm-high protrusions on both faces in the aforementioned arrangement pattern and having a total thickness of 18 μm was produced in the same manner as in Example 14 as shown in FIG. 16.

Subsequently, a positive electrode mixture paint was prepared by stirring and kneading 100 parts by weight of lithium cobaltate, serving as a positive electrode active material, 2 parts by weight of an acetylene black conductive agent per 100 parts by weight of the active material, 2 parts by weight of a polyvinylidene difluoride binder per 100 parts by weight of the active material, and a suitable amount of N-methyl-2-pyrrolidone with a double-arm kneader. This positive electrode mixture paint was applied onto both faces of the current collector prepared in the above manner, dried, and pressed. The current collector was then slit to a predetermined width and length to produce a long-strip like positive electrode plate. At this time, the slitting was made so that the column direction Y agreed with the longitudinal direction of the positive electrode plate and that the row direction X agreed with the width direction of the positive electrode plate.

Also, in the same manner as in Example 18 shown in FIG. 20, a negative electrode current collector having 8-μm-high protrusions on both faces thereof in the aforementioned arrangement pattern and having a total thickness of 26 μm was produced.

Subsequently, using purity 99.9999% silicon (negative electrode active material) as the sputtering target, a deposition process was performed on both faces of the current collector prepared in the above manner by means of a deposition device equipped with an electron beam heating means while purity 99.7% oxygen was being introduced. Herein, the active material was deposited in columnar form on the tops of the protrusions so that they aligned continuously in a lateral direction to form a 25-μm-thick thin film of SiO0.5. This was then slit to a predetermined width and length to obtain a long-strip like negative electrode plate. At this time, the slitting was made so that the column direction Y agreed with the longitudinal direction of the negative electrode plate and that the row direction X agreed with the width direction of the negative electrode plate.

Using the positive electrode plate and the negative electrode plate prepared in the above manner, an electrode assembly 34 illustrated in FIG. 4 was produced (also see FIG. 28).

More specifically, the positive electrode plate and the negative electrode plate were spirally wound with a separator interposed therebetween, to form a cylindrical electrode assembly. At this time, the two electrode plates were wound so that the side of each current collector with a larger pitch (upper side in the figure) in the longitudinal direction (column direction Y) was positioned on the inner side of the electrode assembly and that the side with a smaller pitch (lower side in the figure) was positioned on the outer side of the electrode assembly.

The electrode assembly prepared in the above manner was found to have no displacement in the wound electrode assembly or no separation of the positive electrode mixture layer and the negative electrode mixture layer in the process of winding the electrode assembly. Also, after the preparation of the electrode assembly, this electrode assembly was disassembled and the positive electrode plate and the negative electrode plate were observed. As a result, they were found to have no problem such as separation of the positive electrode mixture layer and negative electrode mixture layer.

Further, as illustrated in FIG. 4, this electrode assembly was housed in a cylindrical battery case with a bottom together with an insulator plate. A negative electrode lead attached to the lower part of the electrode assembly was connected to the bottom of the battery case. Subsequently, a positive electrode lead attached to the upper part of the electrode assembly was connected to a seal plate, and a predetermined amount of an electrolyte (not shown) comprising a non-aqueous solvent was injected into the battery case. Thereafter, the seal plate the circumference of which was fitted with a seal gasket was inserted in the opening of the battery case 80, and the opening of the battery case was bent inward and crimped for sealing. In this way, a lithium secondary battery was produced as a non-aqueous secondary battery.

After the charge/discharge of this lithium secondary battery was repeated 500 cycles, the electrode assembly was taken out and disassembled. As a result, it was found to have no problem such as deposition of lithium and separation of the positive electrode mixture layer and negative electrode mixture layer.

As shown in the foregoing Examples 14 to 16 and 18, in the electrode plate for a non-aqueous secondary battery of the invention, protrusions at least the tops of which were not compressed were formed on the surfaces of a current collector in the aforementioned arrangement pattern, so that the arrangement pattern of the protrusions exhibits a large resistance to stress. Therefore, in the step of forming the protrusions on the surfaces of the current collector and the step of disposing the active material on the protrusions of the current collector, it is possible to prevent the current collector from becoming locally deformed or distorted. At the same time, in the step of disposing the active material on the protrusions of the current collector and the subsequent step such as slitting to a predetermined width and length, it is also possible to suppress separation of the active material.

Also, as shown in Examples 17 and 19, it is possible to reduce the difference in bending stress exerted on the electrode plate resulting from the difference in curvature between the inner side and the outer side of the electrode assembly and the difference in curvature between the face positioned on the inner side and the face positioned on the outer side. Also, when the non-aqueous secondary battery is charged and discharged, the volume change due to expansion of the active material upon lithium absorption and shrinkage of the active material upon lithium desorption is reduced. It is thus possible to obtain a high-capacity, high-reliability non-aqueous secondary battery that does not suffer such a problem as breakage of the electrode plate due to charge/discharge and separation of the active material layer.

Embodiment 16

Figure 21:
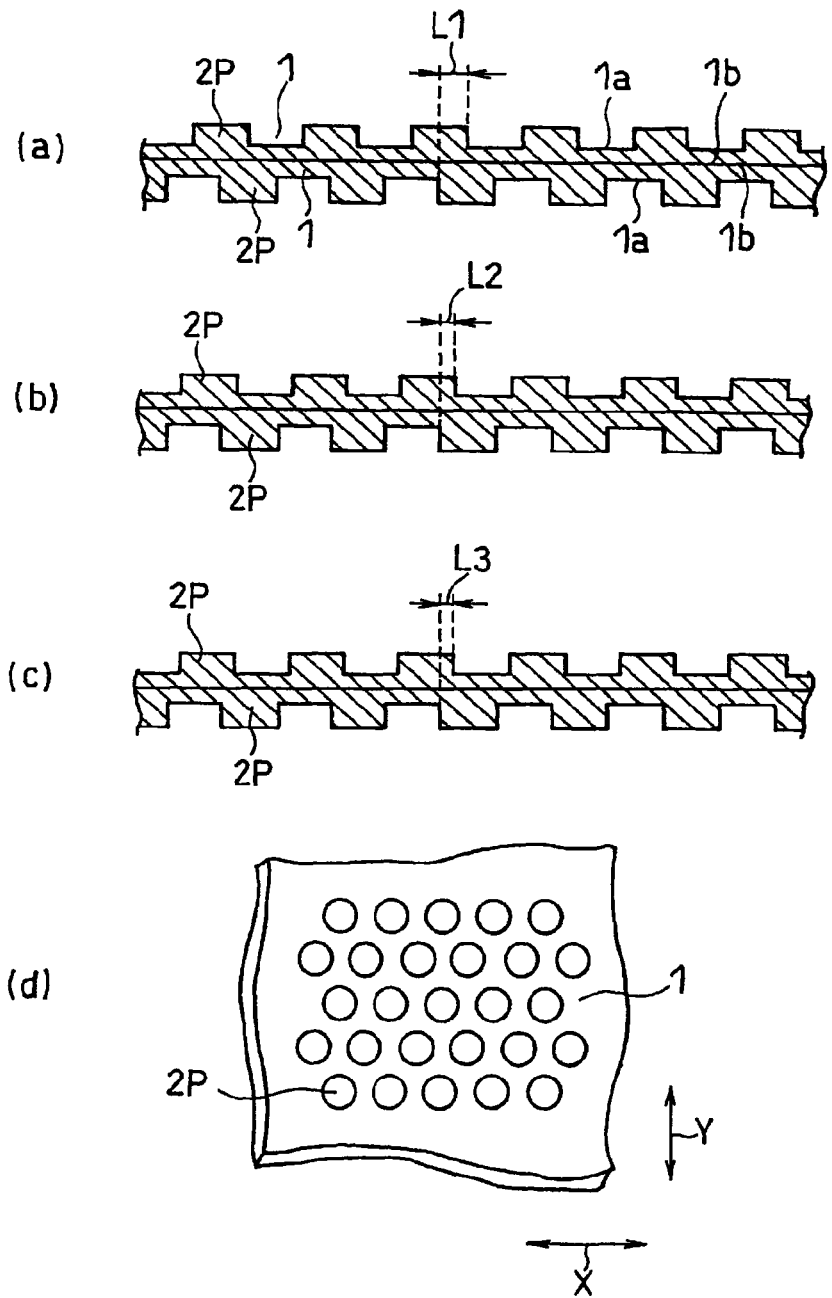
FIG. 21 is plane views schematically showing the structure of a current collector according to Embodiment 16 of the invention.
Figure 22:
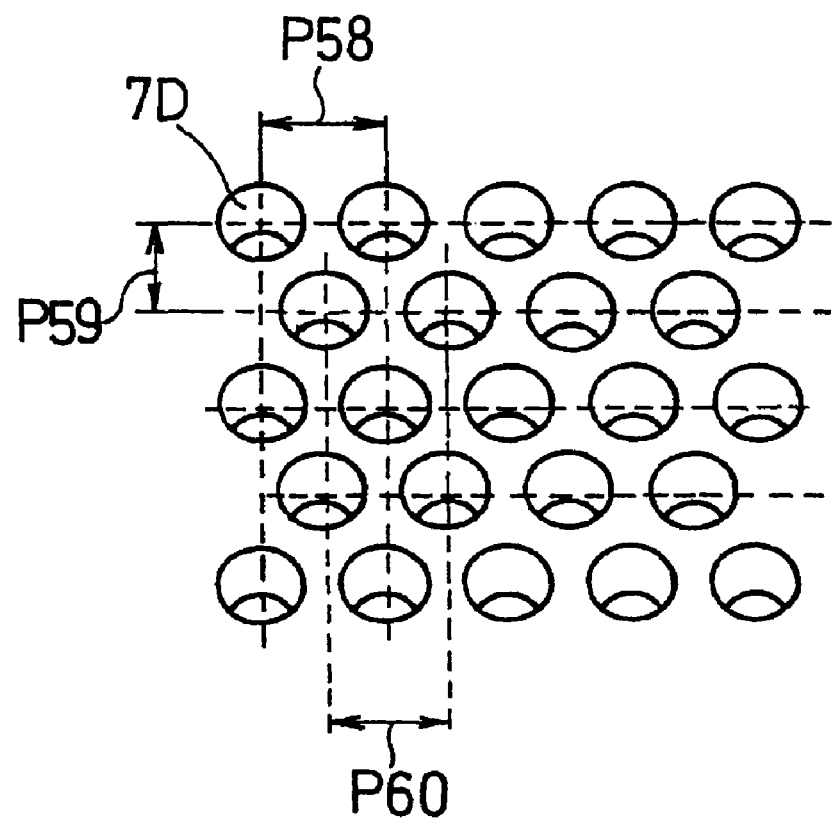
FIG. 22 is an enlarged perspective view of the surface of a roller used to produce the current collector of FIG. 21.

Referring now to FIG. 21 and FIG. 22, Embodiment 16 of the invention is described. In FIG. 21, (a), (b), and (c) are three sectional views schematically showing the structures of a current collector for a non-aqueous secondary battery according to Embodiment 16 of the invention, and (d) is a plan view.

In FIG. 21, a current collector 10P is a current collector for use in an electrode plate of a lithium ion secondary battery (hereinafter also referred to as simply a lithium secondary battery), which is an exemplary non-aqueous secondary battery. The current collector 10P is prepared by forming a large number of columnar protrusions 2P, the tops and cross-sections of which are substantially circular and at least the tops of which are not compressed, on one surface of a metal foil 1 in a predetermined arrangement pattern, making the other surface of the metal foil 1 a flat surface, and bonding the flat surfaces of two metal foils 1 together.

In the arrangement pattern of FIG. 21(d), the protrusions 2P are aligned linearly in the row direction X at an equal pitch, and a group of the protrusions 2P aligned in the row direction X constitute a row unit. Such row units are aligned in parallel at an equal pitch in the column direction Y, which is a direction perpendicular to the row direction X. Also, the respective protrusions 2P of such a row unit are displaced in the row direction X from the protrusions 2P of another row unit that is adjacent in the column direction Y.

As shown in FIGS. 21(a), (b), and (c), the current collector 10P is formed by bonding the flat surfaces of two metal foils 1 in such a manner that the phase of the protrusions 2P is varied. That is, in FIG. 21(a), the protrusions 2P are out of phase in the row direction X or column direction Y by a length L1, which is ½ of the diameter of the protrusions 2P. In FIG. 21(b), the protrusions 2P are out of phase by a length L2, which is ⅓ of the diameter of the protrusions 2P. In FIG. 21(c), the protrusions 2P are out of phase by a length L3, which is ¼ of the diameter of the protrusions 2P.

FIG. 22 is an enlarged perspective view of the surface of a roller used to form protrusions on the current collector.

The roller of FIG. 22 is prepared by coating the surface of a metal roller material with a ceramic such as CrO, WC, or TiN and then forming depressions 7D corresponding to the protrusions 2P in an arrangement pattern corresponding to the aforementioned arrangement pattern by laser machining or the like.

That is, the depressions 7D are aligned linearly in the axial direction of the roller at an equal pitch P58 to form a row unit, and such row units are aligned in parallel in the circumferential direction of the roller at an equal pitch P59.

Also, the respective depressions 7D of the row units that are adjacent in the circumferential direction of the roller are displaced from one another in the axial direction of the roller, and the amount of displacement is a pitch P60, which is ½ of the pitch P58. The amount of the pitch displaced is not limited to ½ of the pitch P58 and can be increased or decreased if necessary.

The roller with the depressions 7D formed on the surface in the arrangement pattern of FIG. 22 and a flat roller with a surface roughness Ra (center line average roughness) of 25 μm or less are disposed with a predetermined space therebetween, and the long metal foil 1 is passed through the space to press both faces of the metal foil 1 with the two rollers. By this, a large number of the protrusions 2P are formed on one face of the metal foil 1 in the aforementioned arrangement pattern, while the other face of the metal foil 1 is made a flat surface. In this way, the current collector 10P is produced.

The method of producing the current collector 10P is not limited to the method described above. For example, instead of the rollers, dies etc. can be used, and the current collector 10P can also be produced by placing the metal foil 1 between an upper die with the depressions 7D formed in the aforementioned arrangement pattern and a lower die with a flat surface, and compressing it. Also, the flat surfaces of the two metal foils 1 can be bonded together by high temperature roll pressure welding, ultrasonic welding, diffusion bonding, brazing, conductive bonding, etc. At this time, with the temperature of the metal foils 1 set to 350° C., a plane pressure of 400 Mpa or higher is applied for bonding.

The method of producing an electrode plate by using the current collector 10P is the same as that of Embodiment 1. Also, the method of producing a non-aqueous secondary battery by using the electrode plate prepared in the above manner is also the same as that of Embodiment 1 shown in FIG. 4.

Embodiment 17

Referring now to FIG. 23, Embodiment 17 of the invention is described. In FIG. 23, (a) is a sectional view schematically showing the structure of a current collector for a non-aqueous secondary battery according to Embodiment 17 of the invention, and (b) is a plane view.

As illustrated in FIG. 23, a current collector 10Q of Embodiment 17 is produced in the same manner as the current collector 10P of Embodiment 16, but is different from that of Embodiment 16 in that protrusions 2Q formed on both faces of the current collector 10Q are in phase with one another.

The method of bonding the flat surfaces of metal foils 1 together is the same as that of Embodiment 16. The processing method of forming the protrusions 2Q on the surface of the current collector 10Q is also the same as that of Embodiment 16. Also, the protrusions 2Q can be formed by using dies, etc. in place of the rollers in the same manner. The method of producing an electrode plate by using the current collector 10Q is also the same as that of Embodiment 1. Further, the method of producing a non-aqueous secondary battery by using the electrode plate prepared in the above manner is also the same as that of Embodiment 1 shown in FIG. 4.

Embodiment 18

Referring now to FIG. 24, Embodiment 18 of the invention is described. FIG. 24 schematically shows the structure of a current collector for a non-aqueous secondary battery according to Embodiment 18 of the invention; (a) is a sectional view in a process of production and (b) is a sectional view upon completion of the production.

As illustrated in FIG. 24, a current collector 10R of Embodiment 18 is the same as that of Embodiment 16 in that it is composed of a metal foil 1 one face of which has protrusions and the other face of which is a flat surface, but is different from that of Embodiment 16 in that it is produced by folding one metal foil 1 and bonding the flat surfaces thereof.

In the example illustrated in the figure, protrusions 2R on both faces of the current collector 10R are in phase with one another; however, by adjusting the folding position of the metal foil 1, the protrusions 2R on both faces of the current collector 10R can be made out of phase with one another, as in FIGS. 21(*a*), (*b*), and (*c*) of Embodiment 16.

However, as illustrated in FIG. 24, by causing the protrusion 2R to be positioned at the folded end of the metal foil 1, it is possible to prevent the folded end from becoming cracked and enhance the strength of the current collector 10R.

The method of bonding the flat surfaces of the metal foil 1 together is the same as that of Embodiment 16. The processing method of forming the protrusions 2Q on a surface of the current collector 10Q is also the same as that of Embodiment 16. Also, the protrusions 2Q can be formed by using dies, etc. in place of the rollers in the same manner. The method of producing an electrode plate by using the current collector 10Q is also the same as that of Embodiment 1. Further, the method of producing a non-aqueous secondary battery by using the electrode plate prepared in the above manner is also the same as that of Embodiment 1 shown in FIG. 4.

Example 20

A 7.5-μm thick aluminum foil was used as a current collector for a positive electrode plate. A roller (ceramic roller) was produced in order to form a large number of protrusions whose tops and cross-sections are substantially circular, as illustrated in FIG. 21(*d*) of Embodiment 16, on a surface of this aluminum foil in the aforementioned arrangement pattern. On the surface of the roller, depressions (depth 4 μm) having a shape corresponding to that of the protrusions were formed in the aforementioned arrangement pattern. The aluminum foil was passed between the roller with the protrusions on the surface and a flat roller with a surface roughness Ra (center line average roughness) of 25 μm or less while being pressed. As a result, 3-μm high protrusions were formed on one face of a metal foil 1. The metal foil 1 was folded at a predetermined position, and the flat surfaces of the metal foil 1 were bonded together. In this way, three kinds of current collectors for positive electrode plates corresponding to FIGS. 21(*a*), (*b*), and (*c*) and having 3-μm-high protrusions on both faces and a total thickness of 18 μm were produced.

Subsequently, a positive electrode mixture paint was prepared by stirring and kneading 100 parts by weight of lithium cobaltate, serving as an active material, 2 parts by weight of an acetylene black conductive agent per 100 parts by weight of the active material, 2 parts by weight of a polyvinylidene difluoride binder per 100 parts by weight of the active material, and a suitable amount of N-methyl-2-pyrrolidone with a double-arm kneader. This positive electrode mixture paint was applied onto both faces of the current collector prepared in the above manner, dried, and pressed. The current collector was then slit to a predetermined width and length to produce a long-strip like positive electrode plate. At this time, the slitting was made so that the column direction Y agreed with the longitudinal direction of the positive electrode plate and that the row direction X agreed with the width direction of the positive electrode plate.

Using the current collectors produced in Example 20, electrode assemblies were produced. As a result, the portions with large cross sectional areas where the protrusions on one face and the other face overlapped one another received the stress created by the winding of the electrode plate and the other portions bent flexibly. It was thus possible to prevent these current collectors from becoming corrugated, wrinkled or warped.

Figure 25:
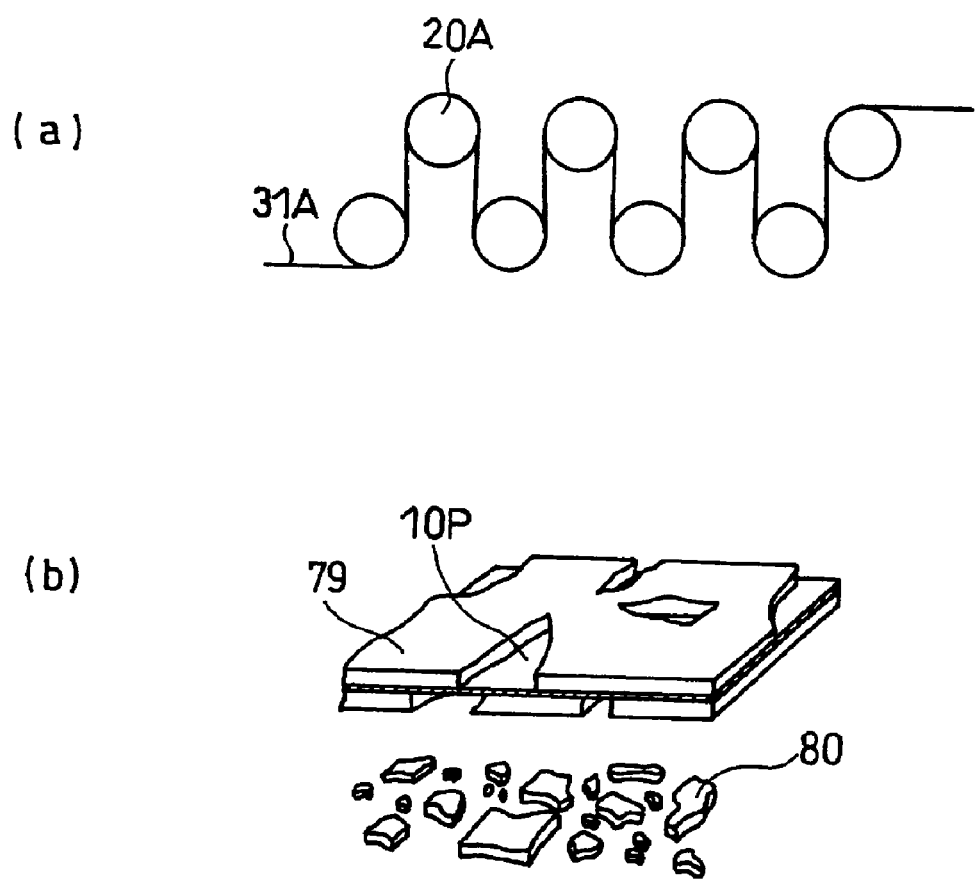
FIG. 25(a) is a schematic view of a device for evaluating a positive electrode plate using a current collector according to Example 20 of the invention and FIG. 25(b) is a perspective view of the evaluation result.

To evaluate the positive electrode plates using these current collectors, rollers 20A were arranged so as to cause a positive electrode plate 31A to meander, as illustrated in FIG. 25(*a*), and a transport test was conducted to simulate winding onto rollers in a production process of a positive electrode plate.

With the positive electrode plate 31A wound onto the eight rollers 20A, it was transported at a speed of 20 m/min. As illustrated in FIG. 25(b), by the weight of a positive electrode mixture layer 80 that fell off from positive electrode mixture layers 79 carried on the current collector 10P, the state of falling-off of the positive electrode mixture layers was compared.

As a result, when the positive electrode plates using the current collectors produced in Example 20 were compared with a positive electrode plate composed of a flat current collector with a surface roughness of 100 μm or less (both faces) and positive electrode mixture layers carried thereon, the amount of the positive electrode mixture layers that fell off was 5% or less. This indicates that the adhesion between the current collector and the positive electrode mixture layers is good.

Also, in the step of forming protrusions 2P on the surface of the current collector, the step of disposing the active material on the protrusions 2P of the current collector, and the subsequent step such as slitting to a predetermined width, due to sufficient resistance to stress, it was possible to reduce local deformation or distortion by 30% or more, reduce falling-off of the positive electrode mixture layers, and reduce the amount of the positive electrode mixture layers that fell off to not more than 8% of that for the conventional positive electrode plate. This is because work hardening involving recrystallization occurred 2 to 4 μm from the protrusion surface and the size of the crystal grains in the surface of the current collector became very small.

Also, according to the method in which an electrode plate was produced by forming rhombic protrusions on both faces of a current collector at a pitch of 30 μm and depositing active material layers on the tops of the protrusions, by executing a deposition process at an angle relative to the surface of the current collector, the active material layers can be partially deposited. Because, the active material layers were not deposited on areas of the surface under the shadow of the protrusions. Due to the not-deposited areas created intentionally, a contact between the adjacent active material layers could be avoided. Even when the active material expanded and contracted due to repeated charge/discharge, a contact between the adjacent active materials and deformation or distortion of the current collector could be prevented. It was thus possible to reduce the amount of the positive electrode mixture layers that fell off to 12% or less.

Further, the relation between the electrode plates using the above-described current collectors and the sizes to which they were wound was examined. When these electrode plates were used in cylindrical secondary batteries with diameters of 18 mm and less, the electrode plate using the current collector illustrated in FIG. 21(a), in which the phase displacement is ½, was most effective in reducing the amount of the positive electrode mixture layers that fell off. In the case of cylindrical secondary batteries with diameters of 18 mm to 32 mm, the electrode plate using the current collector illustrated in FIG. 21(b), in which the phase displacement is ⅓, was most effective in reducing the amount of the positive electrode mixture layers that fell off. When these electrode plates were used in cylindrical secondary batteries with diameters of 32 mm and more, the electrode plate using the current collector illustrated in FIG. 21(c), in which the phase displacement is ¼, was most effective in reducing the amount of the positive electrode mixture layers that fell off.

Figure 26:
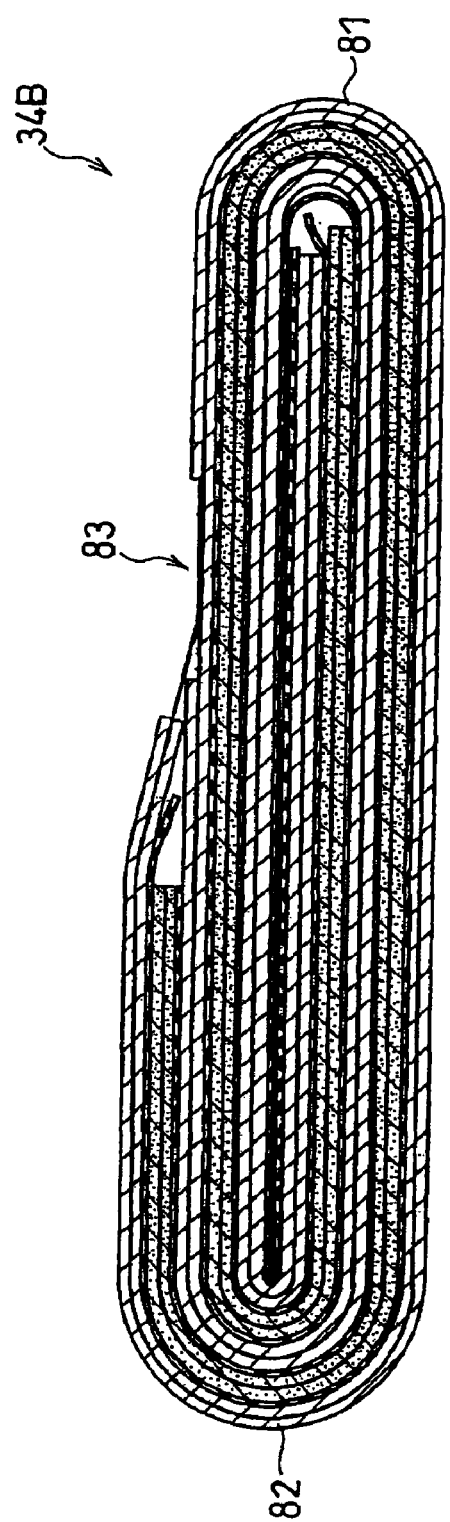
FIG. 26 is a front view schematically showing the structure of an electrode assembly of a prismatic battery which is an exemplary non-aqueous secondary battery of the invention.
Figure 27:
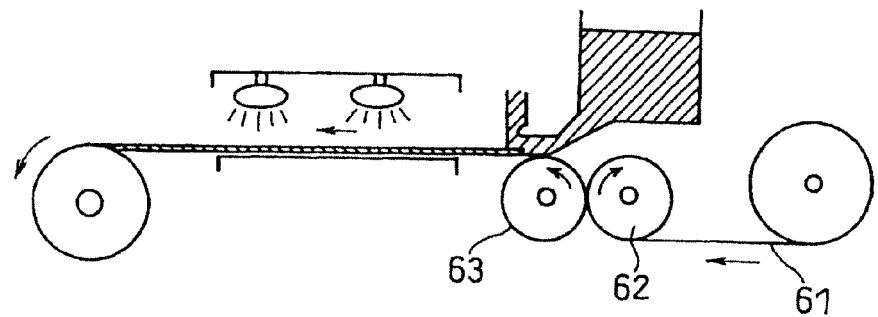
FIG. 27 is a schematic view of a device for producing a conventional current collector according to Patent Document 3.

Also, as illustrated in FIG. 26, an electrode assembly 34B of a prismatic battery has two ends 81 and 82 at which the electrode plates have a large curvature. In prismatic batteries of every size, the amount of falling-off of the positive electrode mixture layers is greatest at the ends 81 and 82. Thus, the use of a highly flexible current collector 43 illustrated in FIG. 23, in which the protrusions on both faces are in phase with one another, permitted a reduction in the amount of falling-off of the positive electrode mixture layers, and enabled an approximately 26% reduction in the amount of falling-off of the positive electrode mixture layers in comparison with the current collector of FIG. 21(a), in which the phase displacement is ½.

Example 21

A 10-μm thick copper foil was used as a current collector for a negative electrode plate. A roller (ceramic roller) was produced in order to form a large number of protrusions whose tops and cross-sections are substantially circular, as illustrated in FIG. 21(d) of Embodiment 16, on a surface of this copper foil in the aforementioned arrangement pattern. On the surface of the roller, depressions (depth 13 μm) having a shape corresponding to that of the protrusions were formed in the aforementioned arrangement pattern. The copper foil was passed between the roller with the protrusions on the surface and a roller with a flat surface while being pressed. As a result, 9-μm high protrusions were formed on one face of a metal foil 1. The metal foil 1 was folded at a predetermined position, and the flat surfaces of the metal foil 1 were bonded together to obtain a current collector for a negative electrode plate having 9-μm-high protrusions on both faces and having a total thickness of 29 μm, which corresponds to FIG. 23 in which the protrusions are not out of phase.

Subsequently, using purity 99.9999% silicon (negative electrode active material) as the sputtering target, a deposition process was performed on both faces of the current collector prepared in the above manner by means of a deposition device equipped with an electron beam heating means while purity 99.7% oxygen was being introduced, so that a SiO0.5 film with a thickness of 23 μm was formed on each of the protrusions. This was then slit to a predetermined width and length to obtain a long-strip like negative electrode plate. At this time, the slitting was made so that the column direction Y agreed with the longitudinal direction of the negative electrode plate or the current collector and that the row direction X agreed with the width direction of the negative electrode plate.

In the current collector produced in the above manner, the substantially circular protrusions are formed in a close-packed arrangement pattern. Thus, when the negative electrode active material was deposited toward the longitudinal direction (column direction Y) of the current collector, the active material could be efficiently attached onto the protrusions.

Also, in the compressed base plane 1a of the metal foil 1 and the surface (2 to 4 μm) of the protrusions 11, work hardening occurs at symmetrical positions on the surface side and the back side. Hence, both faces of the metal foil 1 could exhibit an equal resistance to the tensile stress exerted on the longitudinal direction (column direction Y) of the current collector. Thus, when the negative electrode mixture layers were deposited on the current collector to form the negative electrode plate, or when the negative electrode plate was slit to a predetermined width, it was possible to prevent the current collector from becoming locally deformed or distorted and to suppress separation of the negative electrode mixture layers.

Also, as illustrated in FIG. 26, the electrode assembly 34B of the prismatic battery has straight portions 83. After this battery was charged and discharged 500 times, the electrode assembly 34B was taken out from the battery case, and the electrode plates were unwound to stretch the electrode plates.

As a result, even when the straight portions 83 of the negative electrode plate receive the tensile stress exerted on the longitudinal direction (column direction Y), the current collector of the negative electrode plate stretches mainly at the areas of the thin compressed base planes 1a. Thus, the shearing stress created by the stretching of the current collector at the interface between the current collector and the negative electrode mixture layer could be exerted only on the compressed base planes 1a. This is effective for reducing the shearing stress at the interface between the protrusions of the current collector and the negative electrode mixture layer. As a result, the shearing stress in approximately half of the whole area of the negative electrode plate could be reduced, and the separation at the interface between the current collector and the negative electrode mixture layer could be suppressed.

Also, the current collector could exhibit a sufficient resistance to the tensile stress exerted on the longitudinal direction (column direction Y) of the current collector. In the step of forming the protrusions 11 on the surface of the current collector, the step of disposing the negative electrode active material on the protrusions 11 of the current collector, and the subsequent step such as slitting to a predetermined width, it was also possible to prevent deformation or distortion such as local corrugation, wrinkles or warpage.

Example 22

In order to produce a non-aqueous secondary battery of the invention, a 8-μm thick copper foil was used as a current collector for a negative electrode plate. A roller (ceramic roller) was produced in order to form a large number of protrusions whose tops and cross-sections are substantially circular, as illustrated in FIG. 21(d), on a surface of this copper foil in the aforementioned arrangement pattern. On the surface of the roller, depressions (depth 13 μm) having a shape corresponding to that of the protrusions were formed in the aforementioned arrangement pattern. The copper foil was passed between the roller with the protrusions on the surface and a flat roller with a surface roughness Ra (center line average roughness) of 25 μm or less while being pressed. As a result, 4-μm high protrusions were formed on one face of a metal foil 1, and the surface roughness Ra of the other face was made 6.3 μm. The metal foil 1 was folded at a predetermined position, and the flat surfaces of the metal foil 1 were bonded together to obtain a current collector for a negative electrode plate having 4-μm-high protrusions on both faces and having a total thickness of 18 μm, which corresponds to FIG. 21(a) in which the phase displacement of the protrusions is ½.

Subsequently, using purity 99.9999% silicon (negative electrode active material) as the sputtering target, a deposition process was performed on both faces of the current collector prepared in the above manner by means of a deposition device equipped with an electron beam heating means while purity 99.7% oxygen was being introduced, so that a SiO0.5 film with a thickness of 23 μm was formed on each of the protrusions. This was then slit to a predetermined width and length to obtain a long-strip like negative electrode plate. At this time, the slitting was made so that the column direction Y agreed with the longitudinal direction of the negative electrode plate or the current collector and that the row direction X agreed with the width direction of the negative electrode plate.

Also, a positive electrode current collector having 3-μm-high protrusions on both faces in the aforementioned arrangement pattern and having a total thickness of 18 μm was produced in the same manner as in Example 1 as a current collector for a positive electrode plate.

Subsequently, a positive electrode mixture paint was prepared by stirring and kneading 100 parts by weight of lithium cobaltate in which part of the cobalt was replaced with nickel and manganese, serving as a positive electrode active material, 2 parts by weight of an acetylene black conductive agent per 100 parts by weight of the active material, 2 parts by weight of a polyvinylidene difluoride binder per 100 parts by weight of the active material, and a suitable amount of N-methyl-2-pyrrolidone with a double-arm kneader. This positive electrode mixture paint was applied onto both faces of the current collector prepared in the above manner, dried, and pressed. The current collector was then slit to a predetermined width and length to produce a long-strip like positive electrode plate. At this time, the slitting was made so that the column direction Y agreed with the longitudinal direction of the positive electrode plate and that the row direction X agreed with the width direction of the positive electrode plate. In this way, a 57-μm-thick positive electrode mixture layer was formed on each face of the positive electrode current collector, and a positive electrode plate having a total thickness of 126 μm was produced.

Using the positive electrode plate and the negative electrode plate prepared in the above manner, a lithium ion secondary battery illustrated in FIG. 4 was produced. More specifically, the positive electrode plate and the negative electrode plate were spirally wound with a separator interposed therebetween, to form an electrode assembly. This electrode assembly was housed in a cylindrical battery case with a bottom together with an insulator plate. A negative electrode lead attached to the lower part of the electrode assembly was connected to the bottom of the battery case. Subsequently, a positive electrode lead attached to the upper part of the electrode assembly was connected to a seal plate, and a predetermined amount of an electrolyte (not shown) comprising a non-aqueous solvent was injected into the battery case. Thereafter, the seal plate the circumference of which was fitted with a seal gasket was inserted in the opening of the battery case, and the opening of the battery case was bent inward and crimped for sealing. In this way, a lithium ion secondary battery was produced.

In the lithium ion secondary battery, after the production of the spirally wound electrode assembly, the electrode assembly was disassembled and observed. As a result, both the positive electrode plate and the negative electrode plate were found to have no problem such as breakage of the electrode plate or separation of the active material layer. Further, when the charge/discharge of this lithium ion secondary battery was repeated 300 cycles, no cycle deterioration occurred. Also, after the repetition of 300 charge/discharge cycles, the lithium ion secondary battery and the electrode assembly were disassembled. As a result, they were found to have no problem such as deposition of lithium or separation of the active material layer. This is probably because the formation of the thin film comprising the columnar active material on the protrusions at least the tops of which were not compressed enabled a reduction in volume change due to expansion of the active material thin film upon lithium absorption and shrinkage of the active material thin film upon lithium desorption, so that good battery performance could be maintained.

As shown in the foregoing Examples 22 to 23, in the electrode plate for a non-aqueous secondary battery of the invention, protrusions at least the tops of which were not compressed were formed on the surfaces of a current collector in the aforementioned arrangement pattern, so that the arrangement pattern of the protrusions exhibits a large resistance to stress. Therefore, in the step of forming the protrusions on the surface of the current collector and the step of disposing the active material on the protrusions of the current collector, it is possible to prevent the current collector from becoming locally deformed or distorted. At the same time, in the step of disposing the active material on the protrusions of the current collector and the subsequent step such as slitting to a predetermined width and length, it is also possible to suppress separation of the active material.

Further, since the tops of the protrusions of the current collector are not compressed, no processing strain due to compression process remains thereon and the surface accuracy of the protrusions is good, and it is thus possible to form an even thin film thereon. Also, since the surface roughness is not reduced by compression process and the original surface roughness is maintained, it is possible to heighten the adhesion between the protrusions and the active material thin film. In this respect, in order to further heighten the adhesion between the surface of the protrusions and the active material, it is very effective to roughen the current collector surface in advance before subjecting it to a process. The arrangement pattern of the protrusions in Examples 1 to 6 is such that the respective protrusions of the row units that are adjacent to one another in the column direction are displaced by ½ of the pitch of the row unit, but the invention is not limited to this, and the amount of displacement of the protrusions can be set freely.

Also, as shown in Example 23, it is preferable to dispose the active material mainly on the uncompressed tops of the protrusions in columnar form. In this case, when the non-aqueous secondary battery is charged and discharged, the volume change due to expansion of the active material upon lithium absorption and shrinkage of the active material upon lithium desorption is reduced. It is thus possible to obtain a high-capacity, high-reliability non-aqueous secondary battery that does not suffer such a problem as breakage of the electrode plate due to charge/discharge and separation of the active material layer.

INDUSTRIAL APPLICABILITY

The current collector for a non-aqueous secondary battery according to the invention, and the electrode plate for a non-aqueous secondary battery and the non-aqueous secondary battery using the same are useful, for example, as a portable power source that is required to provide higher capacity due to the increase in functionality of electronic devices and communications devices.

The invention claimed is:

1. A current collector for a non-aqueous secondary battery, the current collector comprising a strip-shaped metal foil for carrying at least a positive electrode active material or negative electrode active material, wherein:
protrusions are formed in a pattern on at least one face of the metal foil,
wherein the protrusions extend along a longitudinal direction and along a width direction, said width direction being shorter than the longitudinal direction,
the pattern comprises: rows in which the protrusions are aligned linearly at an equal pitch in the width direction, wherein row units comprising a group of the protrusions aligned in the width direction are aligned in parallel, wherein adjacent row units have an interval in the longitudinal direction,
the respective protrusions of any one of the row units are displaced in the width direction from the protrusions of another row unit that is adjacent in the longitudinal direction, and
the interval for the aligned row units decreases gradually in a direction from one longitudinal current collector end toward the other longitudinal end.

2. A current collector for a non-aqueous secondary battery, the current collector comprising a strip-shaped metal foil for carrying at least a positive electrode active material or negative electrode active material, wherein:
protrusions are formed in a predetermined arrangement pattern on at least one face of the metal foil,
the protrusions are formed by a pressing process in which at least tops of the protrusions are not compressed while at least a base portion other than portions to be the protrusions is compressed,
the arrangement pattern comprises: a row direction in which the protrusions are aligned in a zigzag at an equal pitch; and a column direction in which row units comprising a group of the protrusions aligned in the row direction are aligned in parallel at a predetermined interval, and
the intervals between each of the protrusions and all the protrusions adjacent to said each of the protrusions are equal.

3. The current collector for a non-aqueous secondary battery in accordance with claim 1,
wherein the protrusions are formed on both faces of the metal foil, and
the protrusions on one face of the metal foil are in phase with the protrusions on the other face of the metal foil.

4. The current collector for a non-aqueous secondary battery in accordance with claim 1,
wherein the protrusions are formed on both faces of the metal foil, and
the protrusions on one face of the metal foil are out of phase with the protrusions on the other face of the metal foil in the row direction.

5. The current collector for a non-aqueous secondary battery in accordance with claim 1,
wherein the protrusions are formed on both faces of the metal foil, and
the interval at which the row units are aligned in the column direction on one face of the metal foil is greater than the interval at which the row units are aligned on the other face of the metal foil.

6. The current collector for a non-aqueous secondary battery in accordance with claim 1, wherein:
the current collector comprises a first metal foil and a second metal foil, one face of the first metal foil having the protrusions while the other face is a flat surface, and one face of the second metal foil having the protrusions while the other face is a flat surface, and
the flat surfaces of the first and second metal foils are bonded together to form the current collector.

7. The current collector for a non-aqueous secondary battery in accordance with claim 1,
wherein one face of the metal foil has the protrusions in the arrangement pattern while the other face is a flat surface,
the metal foil is folded so that the flat surfaces of the folded metal foil are bonded together, to form the current collector.

8. The current collector for a non-aqueous secondary battery in accordance with claim 1,
wherein the tops of the protrusions are substantially circular.

9. The current collector for a non-aqueous secondary battery in accordance with claim 1, wherein:
the tops of the protrusions are in the shape of a substantial oval, and
a direction of the major axis of the oval and the width direction of the current collector are parallel.

10. The current collector for a non-aqueous secondary battery in accordance with claim 1, wherein:
the tops of the protrusions are in the shape of a substantial rectangle, and
the longitudinal direction of the rectangle and the width direction of the current collector are parallel.

11. The current collector for a non-aqueous secondary battery in accordance with claim 1, wherein: the current collector is shaped like a long strip,
the tops of the protrusions are in the shape of a substantial rhombus, and
a direction of the longer diagonal line of the rhombus and the width direction of the current collector are parallel.

12. The current collector for a non-aqueous secondary battery in accordance with claim 1, wherein:
the tops of the protrusions are in the shape of a substantial square, and
a direction of one diagonal line of the square and the width direction of the current collector are parallel.

13. The current collector for a non-aqueous secondary battery in accordance with claim 1, wherein:
the tops of the protrusions are in the shape of a substantial square, and
a pair of opposite sides of the square are perpendicular to the width direction of the current collector.

14. The current collector for a non-aqueous secondary battery in accordance with claim 1, wherein:
the tops of the protrusions are in the shape of a substantially equilateral hexagon, and
a direction of one of the longest diagonal lines of the equilateral hexagon and the width direction of the current collector are parallel.

15. The current collector for a non-aqueous secondary battery in accordance with claim 1, wherein:
the tops of the protrusions are in the shape of a substantially equilateral hexagon, and
a pair of opposite sides of the equilateral hexagon are perpendicular to the width direction of the current collector.

16. The current collector for a non-aqueous secondary battery in accordance with claim 1, wherein:
the tops of the protrusions are in the shape of a substantially equilateral polygon having an even number of eight or more angles, and
a direction of one of the longest diagonal lines of the equilateral polygon and the width direction of the current collector are parallel.

17. The current collector for a non-aqueous secondary battery in accordance with claim 1, wherein:
the tops of the protrusions are in the shape of a substantially equilateral polygon having an even number of eight or more angles, and
a pair of opposite sides of the equilateral polygon are perpendicular to the width direction of the current collector.

18. An electrode plate for a non-aqueous secondary battery comprising at least a positive electrode active material or negative electrode active material carried on the current collector for a non-aqueous secondary battery according to claim 1.

19. A non-aqueous secondary battery comprising:
an electrode assembly comprising a positive electrode plate and a negative electrode plate according to the electrode plate for a non-aqueous secondary battery of claim 18, the positive and negative electrode plates being wound or laminated with a separator interposed therebetween;
a non-aqueous type electrolyte; and
a battery case for sealing the electrode assembly and the non-aqueous type electrolyte therein.

20. The current collector for a non-aqueous secondary battery in accordance with claim 1, wherein the protrusions are formed by a pressing process in which at least tops of the protrusions are not compressed while at least a base portion other than portions to be the protrusions is compressed.

* * * * *